US012563281B2

(12) United States Patent
Oh et al.

(10) Patent No.: US 12,563,281 B2
(45) Date of Patent: Feb. 24, 2026

(54) CAMERA DEVICE CONFIGURED TO PERFORM OPTICAL IMAGE STABILIZATION BY MOVING AN IMAGE SENSOR

(71) Applicant: LG INNOTEK CO., LTD., Seoul (KR)

(72) Inventors: Jung Seok Oh, Seoul (KR); Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 27 days.

(21) Appl. No.: 18/562,097

(22) PCT Filed: May 20, 2022

(86) PCT No.: PCT/KR2022/007203
§ 371 (c)(1),
(2) Date: Nov. 17, 2023

(87) PCT Pub. No.: WO2022/245168
PCT Pub. Date: Nov. 24, 2022

(65) Prior Publication Data
US 2024/0236452 A1    Jul. 11, 2024

(30) Foreign Application Priority Data

May 21, 2021    (KR) ........................ 10-2021-0065817
Jun. 16, 2021    (KR) ........................ 10-2021-0078191

(51) Int. Cl.
*H04N 23/52*    (2023.01)
*G03B 13/36*    (2021.01)
*H04N 23/68*    (2023.01)
(52) U.S. Cl.
CPC ............. *H04N 23/52* (2023.01); *G03B 13/36* (2013.01); *H04N 23/687* (2023.01)

(58) Field of Classification Search
CPC ........ G02B 27/646; G02B 7/005; G02B 7/08; G02B 7/09; G03B 13/36; G03B 17/02;
(Continued)

(56) References Cited

U.S. PATENT DOCUMENTS 12,382,583 B2 *    8/2025    Angier ................... H04N 23/54
2006/0082658 A1 *   4/2006   Lee ...................... H04N 23/687
                                                   348/208.7
(Continued)

FOREIGN PATENT DOCUMENTS

EP          3 817 362 A1     5/2021
JP          2020-170170 A    10/2020
(Continued)

OTHER PUBLICATIONS

Supplementary European Search Report dated Oct. 28, 2024 in European Application No. 22805021.7.
(Continued)

*Primary Examiner* — Antoinette T Spinks
(74) *Attorney, Agent, or Firm* — Saliwanchik, Lloyd & Eisenschenk

(57) ABSTRACT

A first embodiment of the present invention relates to a camera device comprising: a fixed part; a first moving part located inside the fixed part and comprising a lens; a second moving part comprising an image sensor; a first driving part for moving the first moving part relative to the fixed part; a second driving part for moving the second moving part relative to the fixed part; a connecting member for movably connecting the second moving part to the fixed part; and a ball located between the fixed part and the second moving part. The connecting member presses the second moving part toward the ball.

20 Claims, 42 Drawing Sheets

(58) Field of Classification Search
CPC . G03B 30/00; G03B 5/00; G03B 5/04; H04N
23/52; H04N 23/54; H04N 23/57; H04N
23/6812; H04N 23/687
See application file for complete search history.

(56) References Cited

U.S. PATENT DOCUMENTS

| | | | | |
|---|---|---|---|---|
| 2014/0036116 | A1 | 2/2014 | Peng et al. | |
| 2018/0171991 | A1* | 6/2018 | Miller | G02B 7/023 |
| 2021/0258491 | A1* | 8/2021 | Park | H04N 23/57 |
| 2022/0286591 | A1 | 9/2022 | Seo et al. | |
| 2023/0328890 | A1* | 10/2023 | Angier | H05K 1/147 |
| | | | | 348/148 |

FOREIGN PATENT DOCUMENTS

| | | |
|---|---|---|
| KR | 10-0594150 B1 | 6/2006 |
| KR | 10-2015-0042690 A | 4/2015 |
| KR | 10-2019-0097113 A | 8/2019 |
| KR | 10-2021-0034205 A | 3/2021 |
| WO | 2021/040341 A1 | 3/2021 |

OTHER PUBLICATIONS

International Search Report dated Aug. 26, 2022 in International
Application No. PCT/KR2022/007203.

* cited by examiner

FIG. 13(a)                    FIG. 13(b)
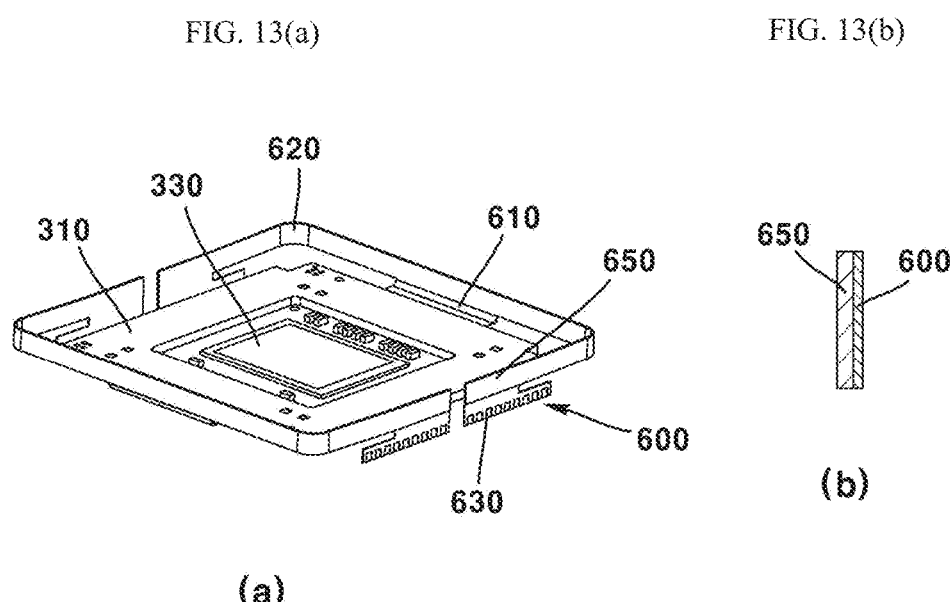
(a)                          (b)
FIG. 14
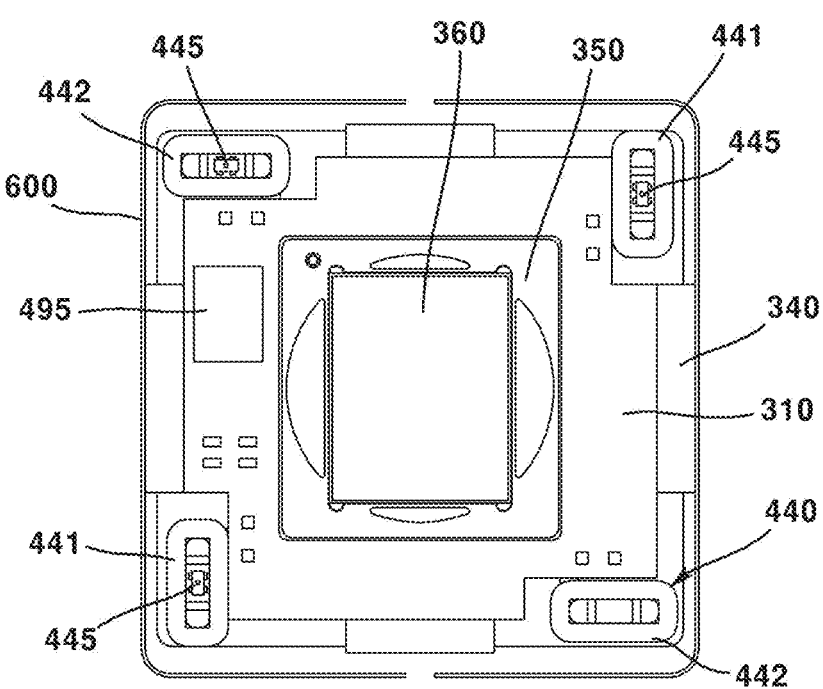

<u>1010</u>

1010

FIG. 49
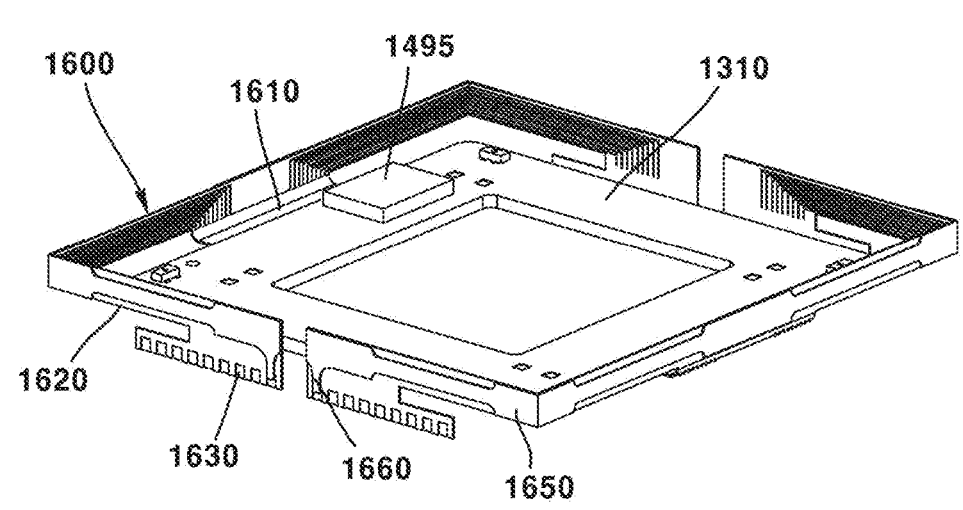
FIG. 50(a)                                    FIG. 50(b)
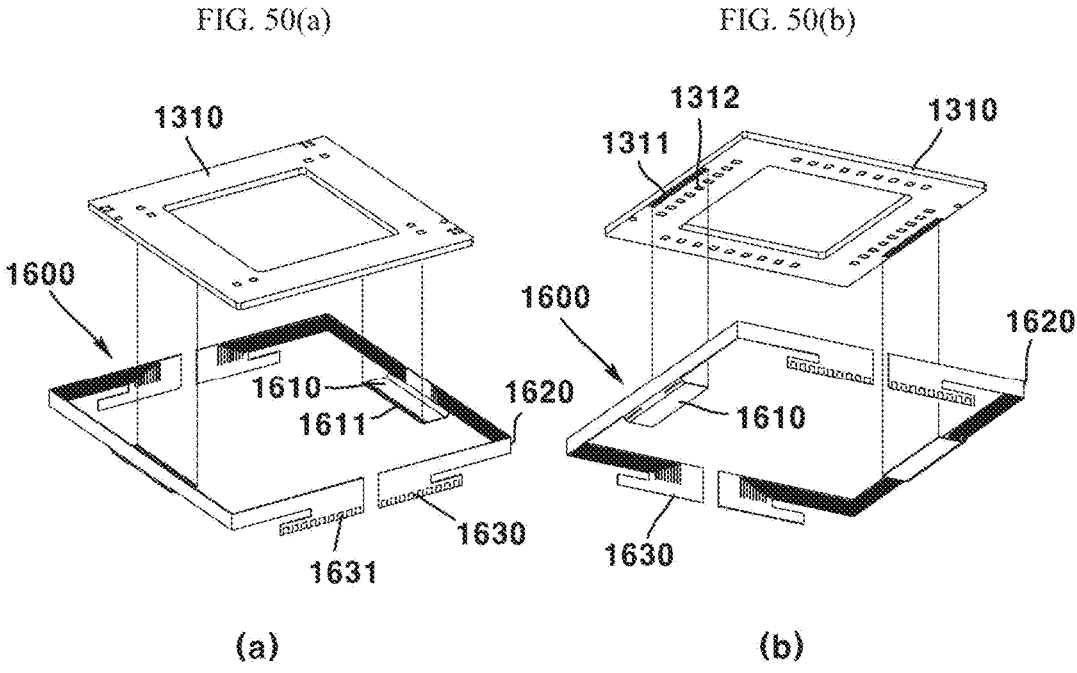
(a)                                                (b)

FIG. 54
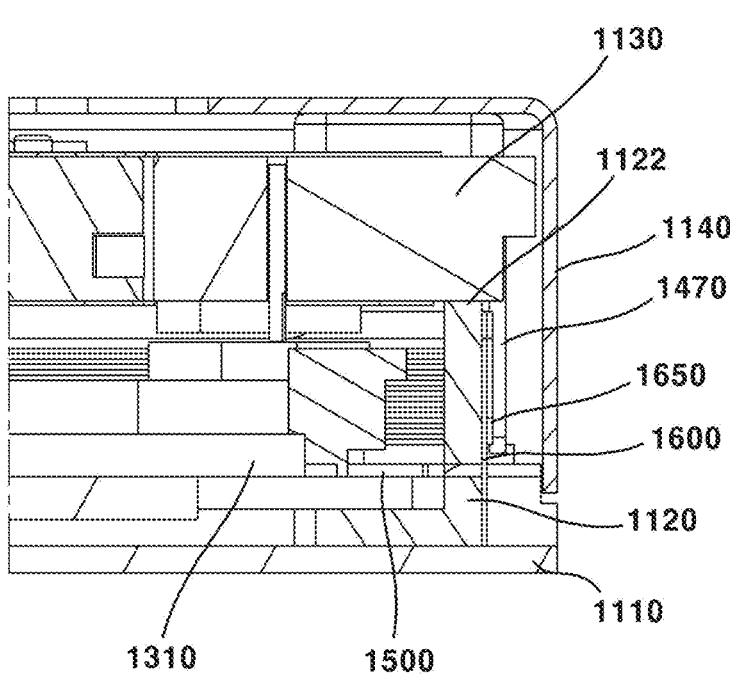
FIG. 55(a)                       FIG. 55(b)
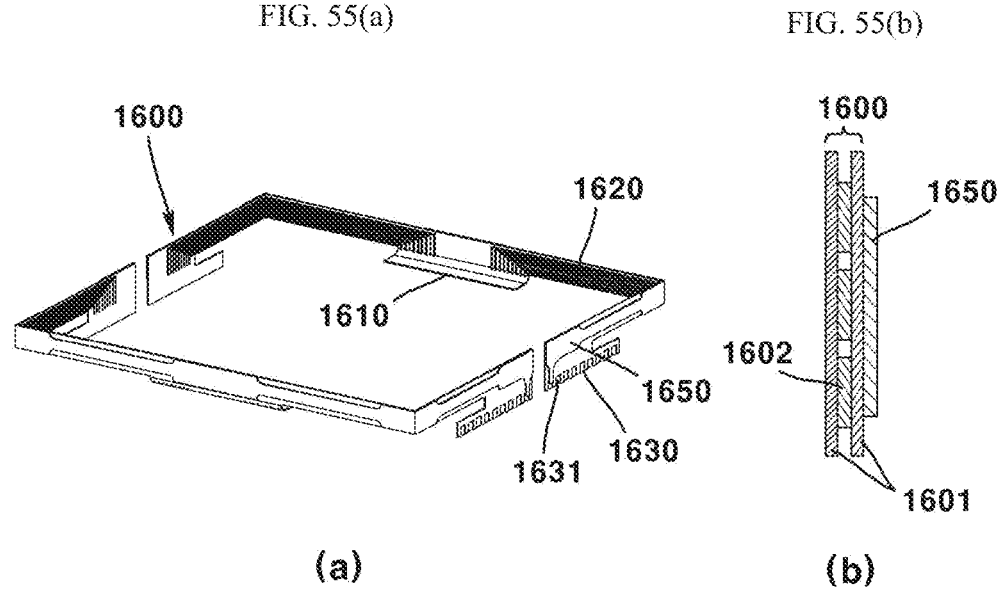
(a)                                 (b)

FIG. 57(a)            FIG. 57(b)
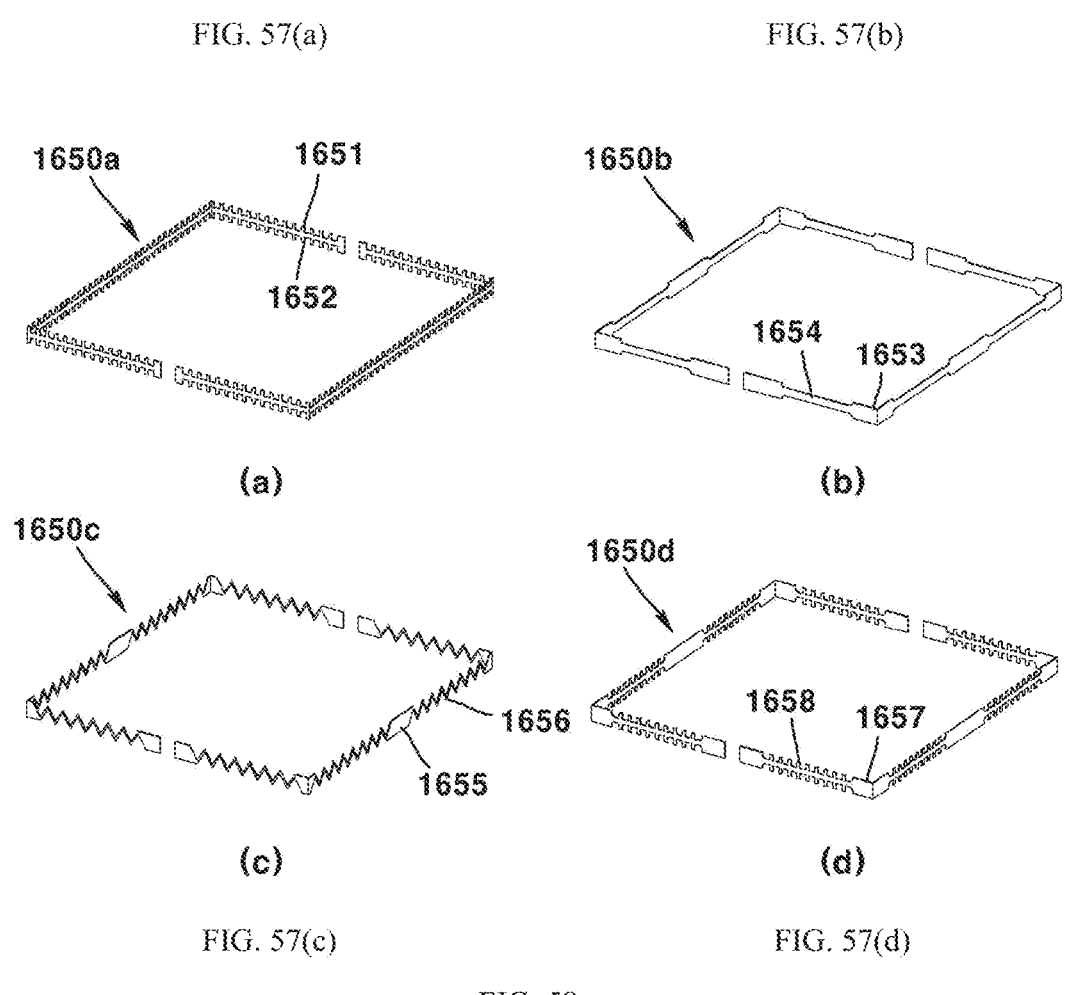
(a)          (b)
(c)          (d)
FIG. 57(c)            FIG. 57(d)
FIG. 58
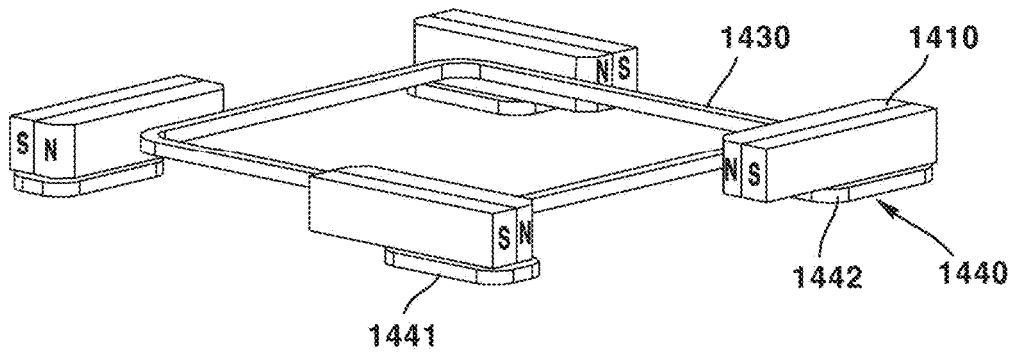

CAMERA DEVICE CONFIGURED TO PERFORM OPTICAL IMAGE STABILIZATION BY MOVING AN IMAGE SENSOR

CROSS-REFERENCE TO RELATED APPLICATIONS

This application is the U.S. national stage application of International Patent Application No. PCT/KR2022/007203, filed May 20, 2022, which claims the benefit under 35 U.S.C. § 119 of Korean Application Nos. 10-2021-0065817, filed May 21, 2021; and 10-2021-0078191, filed Jun. 16, 2021; the disclosures of each of which are incorporated herein by reference in their entirety.

TECHNICAL FIELD

The present embodiment relates to a camera device.

BACKGROUND ART

A camera device is a device that photographs a picture or video of a subject, and is installed in optical apparatuses such as smartphones, drones, and vehicles.

In camera devices, there is a demand for handshake correction (OIS) function for correcting image shake caused by user's movement to improve image quality.

In a camera device, the handshake correction function is performed by moving the lens in a direction perpendicular to the optical axis. However, in accordance with the recent trend of high pixelation, the diameter of the lens increases, and the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that moves an image sensor to perform a handshake correction function.

The present embodiment is intended to provide a camera device that drives the image sensor in two axes: x-axis shift and y-axis shift.

The present embodiment is intended to provide a camera device that drives the image sensor in three axes: x-axis shift, y-axis shift, and z-axis rolling.

Technical Solution

A camera device according to a first embodiment of the present invention comprises: a fixed part; a first moving part being disposed inside the fixed part and comprising a lens; a second moving part comprising an image sensor; a first driving part for moving the first moving part against the fixed part; a second driving part for moving the second moving part against the fixed part; a connecting member for movably connecting the second moving part to the fixed part; and a ball being disposed between the fixed part and the second moving part, wherein the connecting member can press the second moving part toward the ball.

The fixed part comprises a first substrate, the second moving part comprises a second substrate being electrically connected to the image sensor, and the connecting member may comprise a connecting substrate connecting the first substrate and the second substrate.

The camera device may comprise a metal plate being coupled to the connecting substrate and having elasticity.

The thickness of metal plate is equal to the thickness of the connecting substrate or may be greater than the thickness of the connecting substrate.

The connecting substrate comprises: a connecting portion connected to the second moving part; an extension portion being extended from the connecting portion, and a terminal portion connected to the extension portion and comprising a terminal, wherein at least a portion of the metal plate may be disposed on the extension portion of the connecting substrate.

At least a portion of the metal plate may have the same length as the extension portion in an optical axis direction.

The extension portion may comprise a bending region being bent in a direction perpendicular to an optical axis direction, and the metal plate may be disposed in the bending region.

The metal plate may comprise a hole, and at least a portion of the hole of the metal plate may be disposed in the bending region.

The metal plate may comprise a first portion and a second portion shorter than the first portion in an optical axis direction, and at least a portion of the second portion of the metal plate may be disposed in the bending region.

The metal plate may comprise a plurality of grooves being formed concavely in an optical axis direction, and the plurality of grooves of the metal plate may not be disposed in the bending region.

The extension portion may comprise a bending region being bent in a direction perpendicular to an optical axis direction, and the metal plate may not be disposed in the bending region.

The terminal portion of the connecting substrate is fixed to the first substrate, and an upper end of the extension portion is disposed lower than a region adjacent to the connecting portion in a region adjacent to the terminal portion.

The second moving part may comprise a holder being coupled to the second substrate, and the ball may be disposed between the holder and the first substrate.

The image sensor may be disposed between the first moving part and the first substrate.

The first driving part comprises a magnet being disposed in the fixed part and a first coil being disposed in a position corresponding to the magnet in the first moving part, and the second driving part may comprise a second coil disposed at a position corresponding to the magnet in the second moving part.

The second coil may be disposed in the holder, and the holder may comprise a portion disposed between the second coil and the ball in an optical axis direction.

An optical device according to a first embodiment of the present invention comprises a main body; a camera device being disposed on the main body; and a display being disposed on the main body and outputting a video or image photographed by the camera device.

A camera device according to the first embodiment of the present invention may comprise: a fixed part; a first moving part being disposed inside the fixed part and comprising a lens; a second moving part comprising an image sensor; a first driving part which moves the first moving part against the fixed part; a second driving part which moves the second moving part against the fixed part; a connecting member movably connecting the second moving part to the fixed part; and a ball being disposed between the fixed part and the second moving part.

The fixed part comprises a first substrate, and the connecting member may comprise a connecting substrate electrically connecting the first substrate and the second moving part.

The image sensor may be disposed between the first moving part and the first substrate.

The first driving part comprises: a magnet being disposed in the fixed part; and a first coil being disposed at a position corresponding to the magnet in the first moving part, wherein the second driving part may comprise a second coil being disposed at a position corresponding to the magnet in the second moving part.

The connecting substrate can press the second moving part toward the ball.

The connecting substrate comprises: a terminal portion comprising a connecting portion being connected to the second moving part; an extension portion being extended from the connecting portion; and a terminal portion being connected to the extension portion and comprising a terminal, wherein the terminal portion of the connecting substrate is fixed to the first substrate, and wherein an upper end of the extension portion may be disposed lower in a region adjacent to the terminal portion than a region adjacent to the connecting portion.

The camera device may comprise a metal plate being coupled to the connecting substrate and having elasticity.

A camera device according to a first embodiment of the present invention comprises: a first substrate; a housing being disposed on the first substrate; a bobbin being disposed inside the housing; a lens being coupled to the bobbin; a second substrate being disposed below the bobbin; an image sensor being electrically connected to the second substrate; a holder being coupled to the second substrate; a first driving part which moves the lens against the first substrate; a second driving part which moves the image sensor against the first substrate; a connecting substrate connecting the first substrate and the second substrate; a metal plate being coupled to the connecting substrate; and a ball being disposed between the first substrate and the holder, wherein the metal plate can press the holder toward the first substrate.

A camera device according to a second embodiment of the present invention comprises: a fixed part comprising a first substrate; a first moving part comprising a lens; a second moving part comprising a second substrate being spaced apart from the first substrate and an image sensor being electrically connected to the second substrate; a first driving part which moves the first moving part in an optical axis direction; a second driving part which moves the second moving part in a direction perpendicular to the optical axis direction; and a connecting substrate electrically connecting the first substrate and the second moving part, wherein the connecting substrate comprises a first coupling portion being coupled to the second substrate, a second coupling portion being coupled to the first substrate, and a connecting portion connecting the first coupling portion and the second coupling portion, wherein the second substrate comprises a first terminal being disposed on a lower surface of the second substrate, and wherein the first coupling part of the connecting substrate may comprise a terminal being coupled to the first terminal of the second substrate.

At least a portion of the first coupling portion of the connecting substrate is overlapped with the second substrate in an optical axis direction and may be disposed below the second substrate.

The connecting substrate is formed separately from the second substrate and may be coupled through a conducting member.

The lower surface of the second substrate may comprise a first region and a second region disposed opposite to the first region, and 18 each of the first terminal of the second substrate may be disposed in the first region and the second region.

The second moving part comprises a third substrate coupled to the lower surface of the second substrate, and the first coupling portion of the connecting substrate may be overlapped with the third substrate in a direction perpendicular to the optical axis direction.

The image sensor is disposed on an upper surface of the third substrate, and the first coupling portion of the connecting substrate may be disposed lower than the image sensor.

The second substrate comprises a second terminal being disposed spaced apart from the first terminal on a lower surface of the second substrate, the third substrate comprises a terminal being coupled to the second terminal of the second substrate, the first terminal of the second substrate comprises a plurality of first terminals, the second terminal of the second substrate comprises a plurality of second terminals, and a distance between the plurality of first terminals may be narrower than a distance between the plurality of second terminals.

The lower surface of the second substrate comprises: third and fourth regions being disposed opposite to each other; and fifth and sixth regions being disposed opposite to each other, wherein nine each of the second terminal of the second substrate may be disposed in the third to sixth regions.

The first coupling portion of the second substrate may be disposed perpendicular to the optical axis direction.

The second coupling portion and the connecting portion of the second substrate may be disposed parallel to an optical axis direction, and the connecting portion may comprise a portion being bent in a direction perpendicular to the optical axis direction.

The second moving part comprises a holder being disposed on the second substrate, the holder comprises a groove being formed on a lower surface of the holder and a protrusion being protruded from an upper surface of the holder, a portion of the connecting substrate may be disposed in the groove of the holder, and another portion of the connecting substrate may be attached to an outer surface of the protrusion of the holder with an adhesive.

The fixed part comprises a base disposed on the first substrate, the base comprises a protrusion being protruded from an upper surface of the base, and at least a portion of the second coupling portion of the connecting substrate may be attached to an outer surface of the protruded portion of the base with an adhesive.

The camera device may comprise an elastic member connecting the base and the holder, and the first coupling portion of the connecting substrate may be disposed between the elastic member and the holder.

The first coupling portion of the connecting substrate may be disposed higher than the upper surface of the base.

The terminal of the connecting substrate may be coupled to the first terminal of the second substrate through an anisotropic conductive film (ACF).

A camera device according to a second embodiment of the present invention comprises: a fixed part comprising the first substrate; a lens being disposed inside the fixed part; a moving part comprising an image sensor being disposed at a position corresponding to the lens; a driving part that moves the moving part in a direction perpendicular to the optical axis direction; and a connecting member connecting the first substrate and the moving part, wherein the connecting member comprises a first coupling portion being coupled to the moving part, a second coupling portion being coupled to the first substrate, and a connecting portion connecting the first coupling portion and the second coupling portion, and wherein at least a portion of the first coupling portion of the connecting member may be overlapped with the moving part in an optical axis direction and may be disposed below the moving part.

The moving part comprises a second substrate electrically connected to the image sensor, the connecting member comprises a flexible connecting substrate electrically connecting the first substrate and the second substrate, the second substrate comprises a first terminal disposed on a lower surface of the second substrate, and the connecting substrate may comprise a terminal being coupled to the first terminal of the second substrate.

The moving part may comprise a third substrate being coupled to a lower surface of the second substrate, and the first coupling portion of the connecting substrate may be overlapped with the third substrate in a direction perpendicular to the optical axis direction.

The second substrate comprises a second terminal being disposed spaced apart from the first terminal on a lower surface of the second substrate, the third substrate comprises a terminal being coupled to the second terminal of the second substrate, the first terminal of the second substrate comprises a plurality of first terminals, the second terminal of the second substrate comprises a plurality of second terminals, and the distance between the plurality of first terminals may be narrower than the distance between the plurality of second terminals.

An optical device according to a second embodiment of the present invention may comprise: a main body; a camera device being disposed in the main body; and a display being disposed in the main body and outputting a video or image photographed by the camera device.

Advantageous Effects

Through the present embodiment, the handshake correction function can be performed by moving the image sensor.

In addition, as the ball contact structure is applied through a first embodiment of the present invention, an effect of improving the assembly balance of an image sensor can be expected. That is, the initial tilt of the image sensor can be improved. Through this, it has an advantage in the process of aligning the lens when assembling the camera.

In addition, the phenomenon of unfolding of the bent portion of the connecting substrate can be inhibited.

In addition, through the second embodiment of the present invention, as the connecting substrate is manufactured separately from the second substrate and bonded to a lower surface of the second substrate, the height of the first coupling portion of the connecting substrate is lowered so that the length of the connecting portion of the connecting substrate in an optical axis direction can be increased. Through this, the rigidity of the connecting substrate in an optical axis direction is increased, and more conductive lines can be disposed in a connecting portion of the connecting substrate.

Alternatively, the protruding height of the camera device from the smartphone can be minimized by reducing the shoulder height of the camera device without increasing the length of the connecting portion of the connecting substrate in an optical axis direction.

In addition, as the connecting substrate is manufactured separately from the second substrate and bonded, the manufacturing cost of the connecting substrate can be reduced.

BRIEF DESCRIPTION OF DRAWINGS

Figure 10:
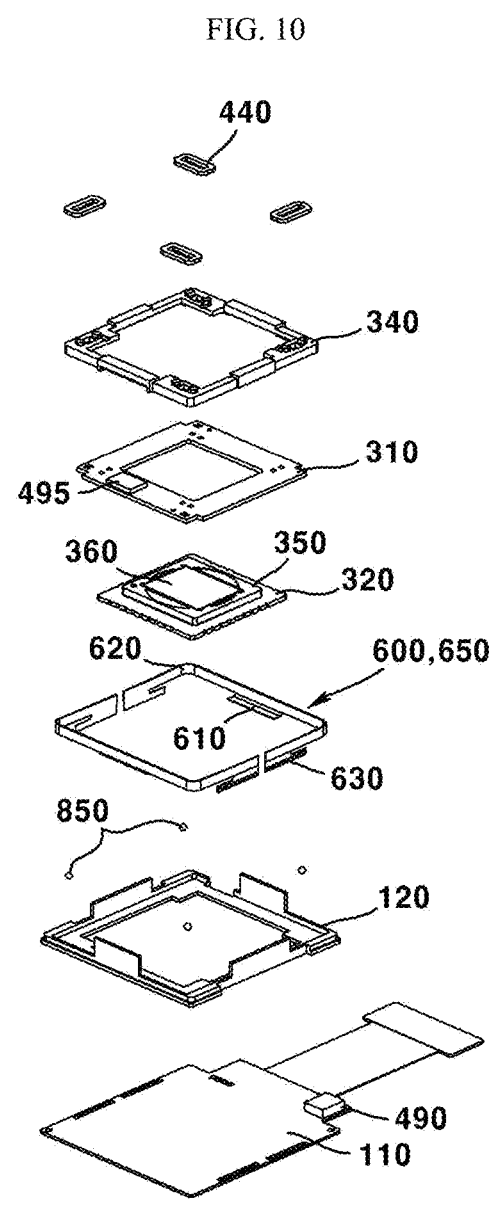

FIG. 10 is an exploded perspective view of a second moving part and related components of a camera device according to the present embodiment.

FIG. 13(a) is a perspective view illustrating the appearance of a second moving part, a connecting substrate, and a metal plate of a camera device according to a first embodiment of the present invention; and FIG. 13(b) is a cross-sectional view of a state in which the connecting substrate and the metal plate are coupled.

FIG. 14 is a plan view illustrating a second moving part and a connecting substrate of a camera device according to a first embodiment of the present invention.

FIG. 26 is a diagram for explaining driving in which an image sensor of a camera device according to a first embodiment of the present invention is shifted along the x-axis. FIG. 27 is a diagram for explaining driving in which an image sensor of a camera device according to a first embodiment of the present invention is shifted along the y-axis. FIG. 28 is a diagram for explaining driving in which an image sensor of a camera device according to a first embodiment of the present invention rolls about the z-axis.

FIG. 49 is a perspective view illustrating a part of a second moving part and a connecting substrate of a camera device according to a second embodiment of the present invention.

FIGS. 50($a$) and 50($b$) are perspective views of a connecting substrate and a second substrate of a camera device according to a second embodiment of the present invention.

FIG. 54 is a cross-sectional view illustrating a coupling state between a connecting substrate and a base of a camera device according to a second embodiment of the present invention.

FIG. 55($a$) is a perspective view of a connecting substrate and a metal plate of a camera device according to a second embodiment of the present invention, and FIG. 55($b$) is a cross-sectional view of a connecting substrate and a metal plate of a camera device according to a second embodiment of the present invention.

FIGS. 57($a$)-57($d$) are views illustrating various embodiments of a metal plate of a camera device according to a second embodiment of the present invention.

FIG. 58 is a perspective view of a magnet and a coil of a camera device according to a second embodiment of the present invention.

Wires of the camera device according to a second embodiment of the present invention may be omitted in some drawings.

Figure 60:
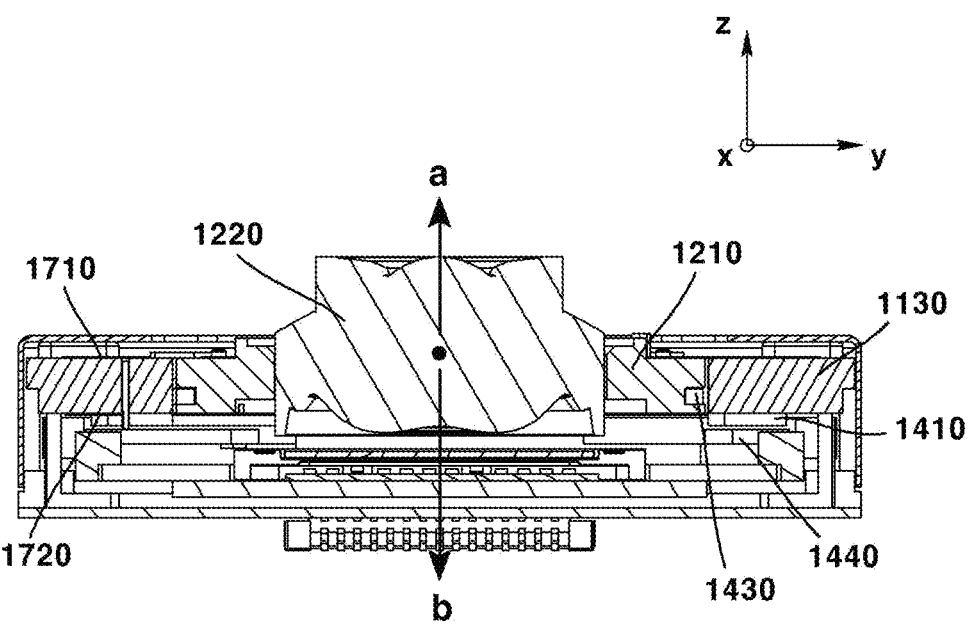

FIG. 60 is a diagram for explaining driving of an auto focus function of a camera device according to a second embodiment of the present invention.

Figure 61:
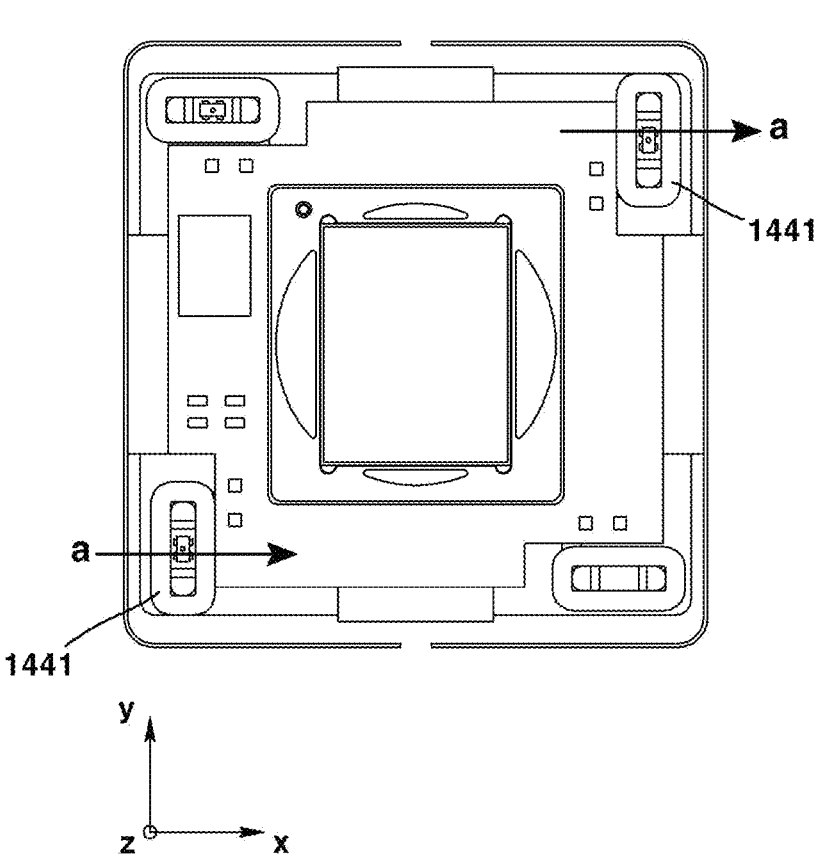
Figure 62:
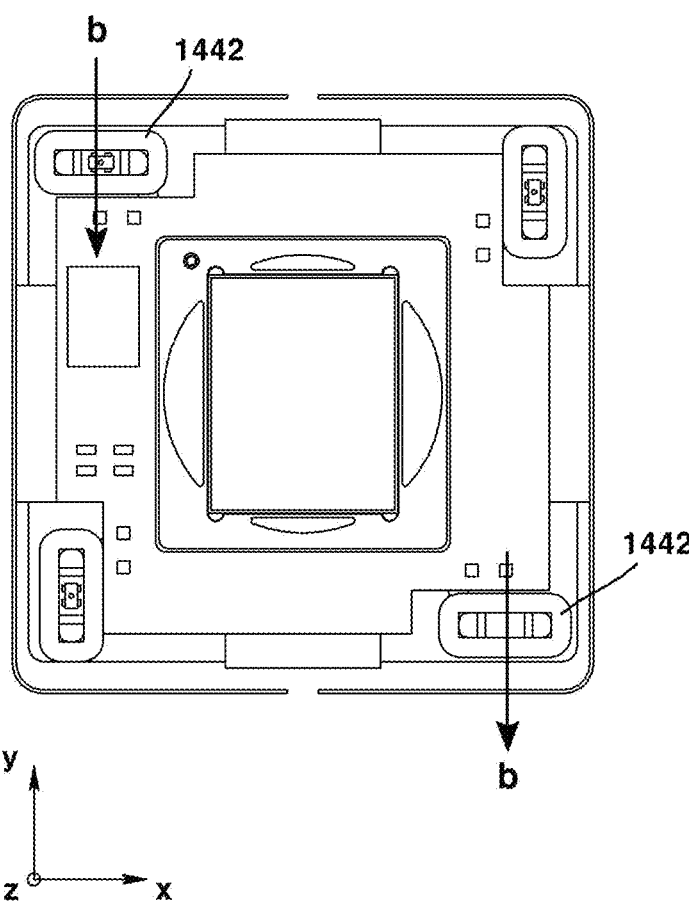
Figure 63:
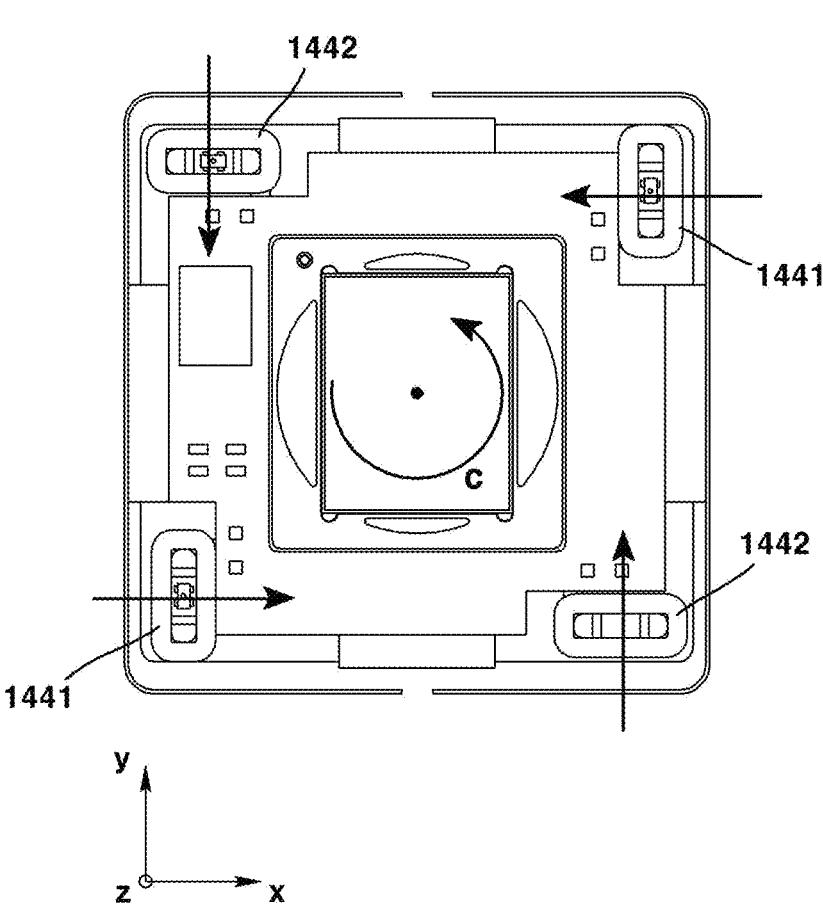

FIGS. 61 to 63 are diagrams for explaining the driving of the hand shake correction function of a camera device according to a second embodiment of the present invention. In more detail, FIG. 61 is a diagram for explaining driving in which an image sensor of a camera device according to a second embodiment of the present invention is shifted along the x-axis. FIG. 62 is a diagram for explaining driving in which an image sensor of a camera device according to a second embodiment of the present invention is shifted along the y-axis. FIG. 63 is a view for explaining driving in which an image sensor of a camera device according to a second embodiment of the present invention rolls about the z-axis.

Figure 64:
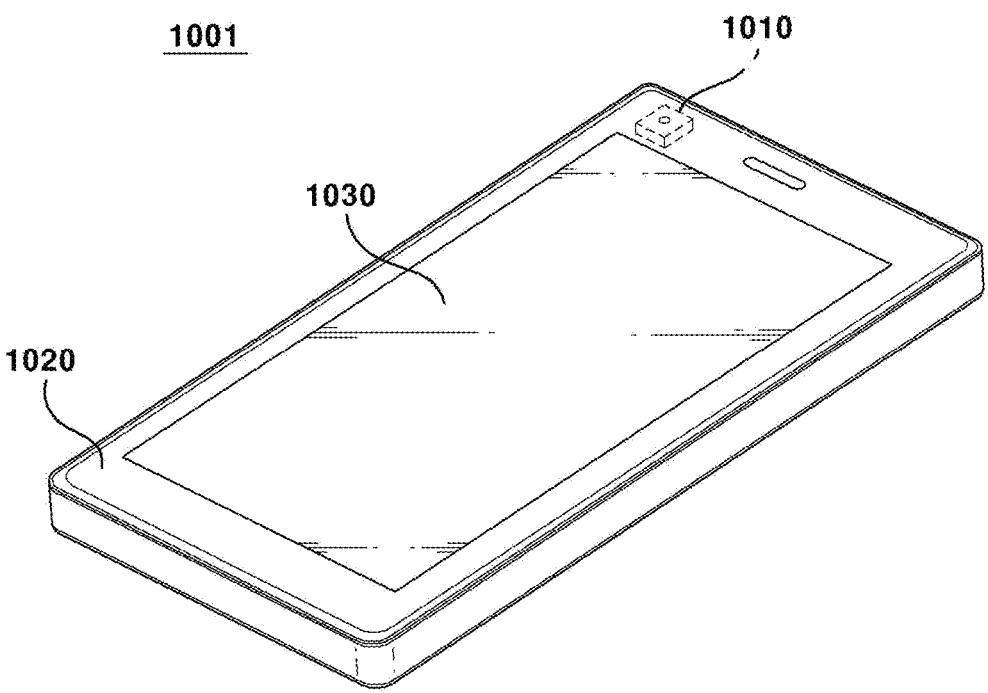

FIG. 64 is a perspective view of an optical device according to a second embodiment of the present invention.

Figure 65:
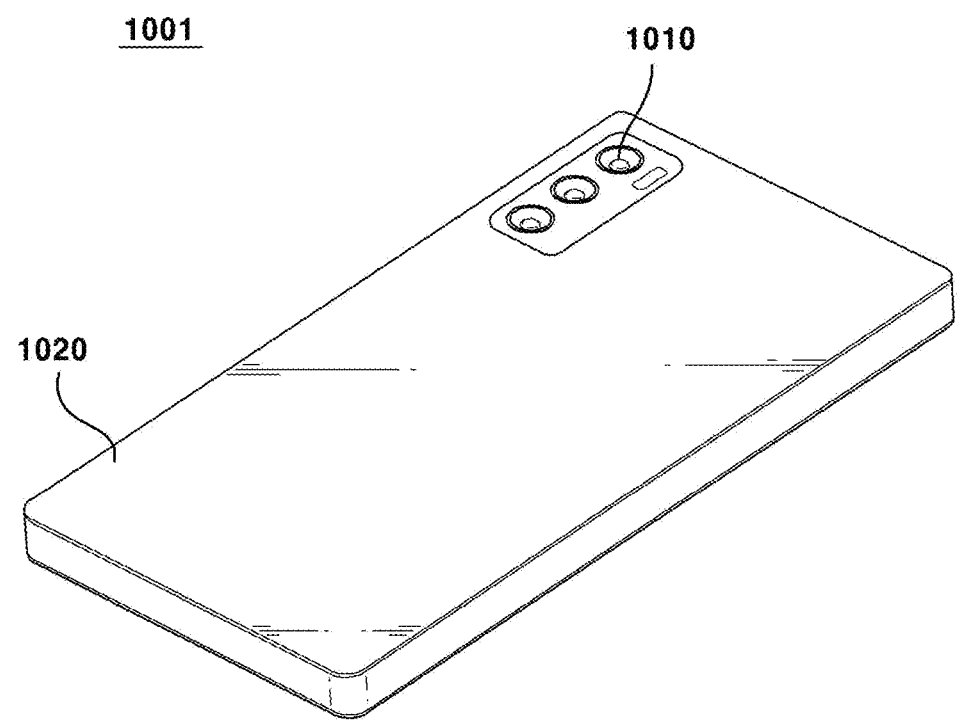

FIG. 65 is a perspective view of an optical device according to a second embodiment of the present invention viewed from a direction different from that of FIG. 64.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a camera device according to a first embodiment of the present invention will be described with reference to the drawings.

Figure 1:
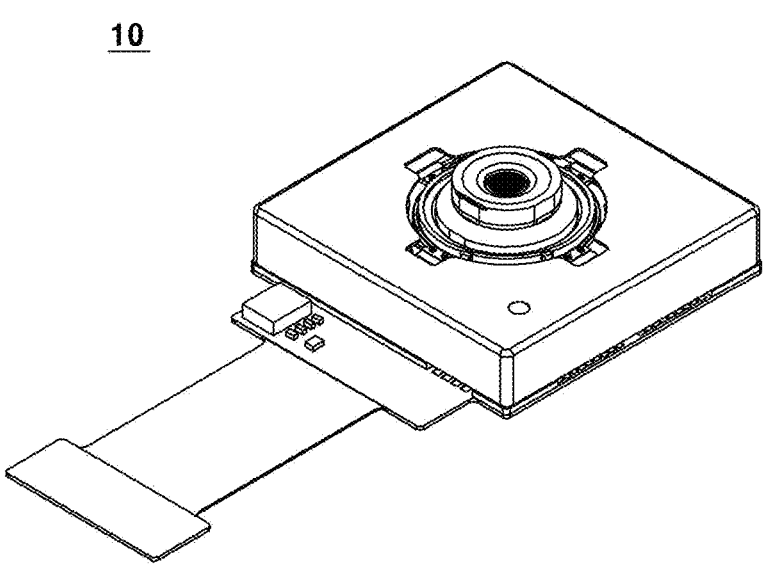
FIG. 1 is a perspective view of a camera device according to the present embodiment.
Figure 2:
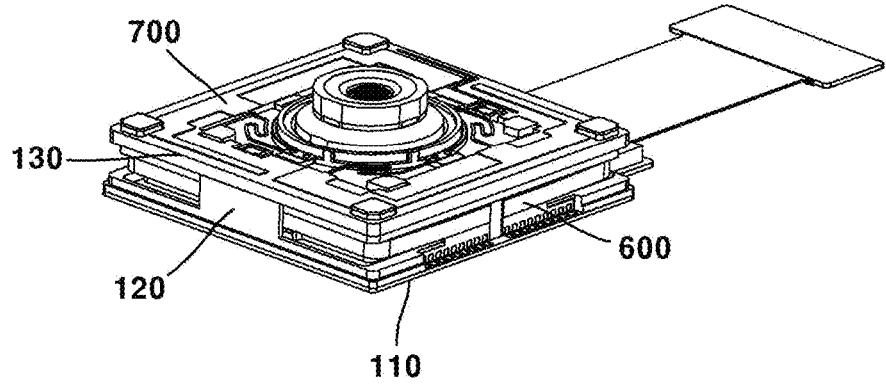
FIG. 2 is a perspective view of a state in which a cover member is omitted from a camera device according to the present embodiment.
Figure 3:
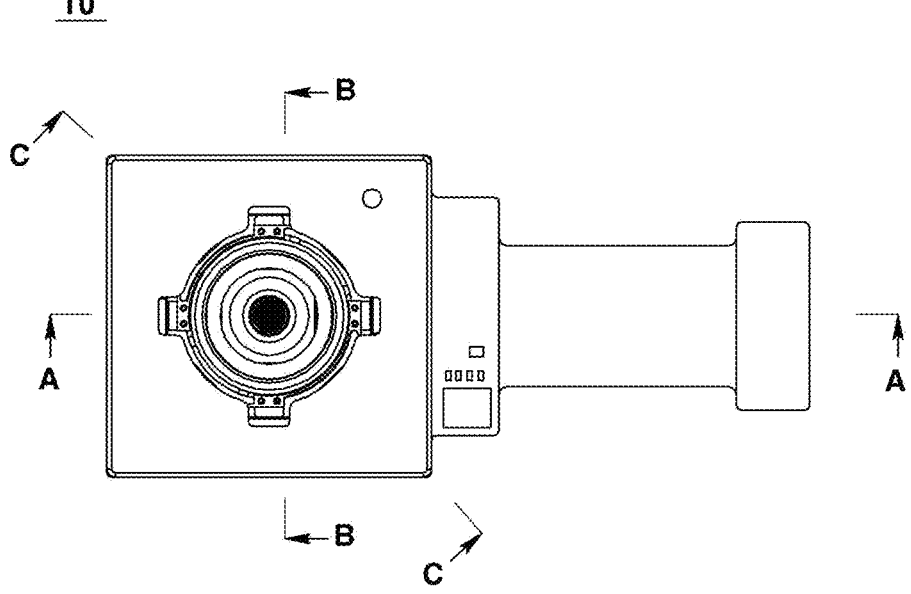
FIG. 3 is a plan view of a camera device according to a first embodiment of the present embodiment.
Figure 4:
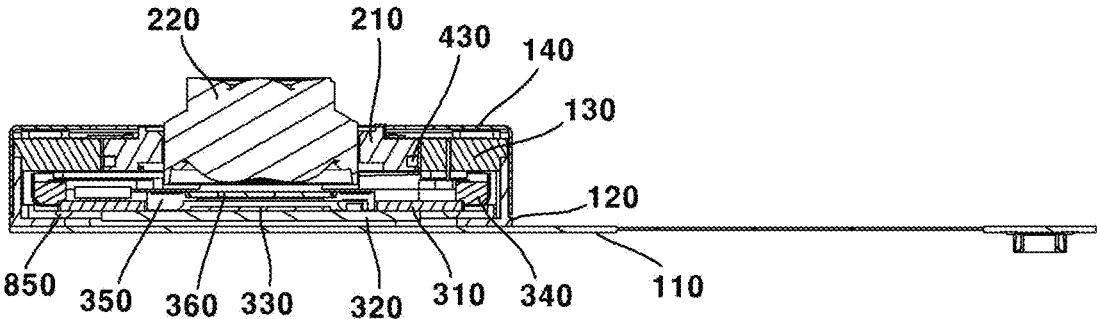
FIG. 4 is a cross-sectional view taken along line A-A in FIG. 3.
Figure 5:
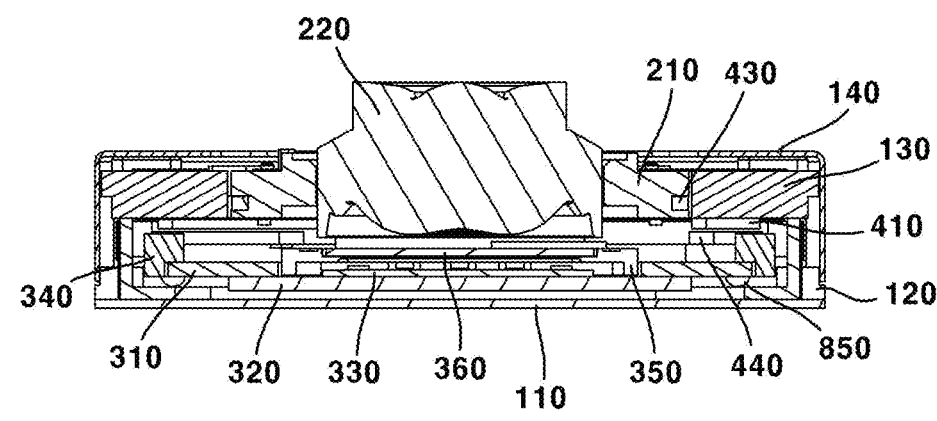
FIG. 5 is a cross-sectional view taken along line B-B in FIG. 3.
Figure 6:
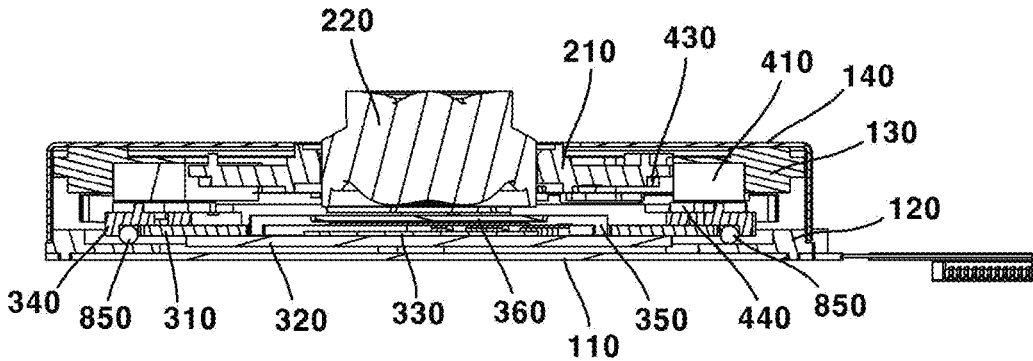
FIG. 6 is a cross-sectional view taken along line C-C in FIG. 3.
Figure 7:
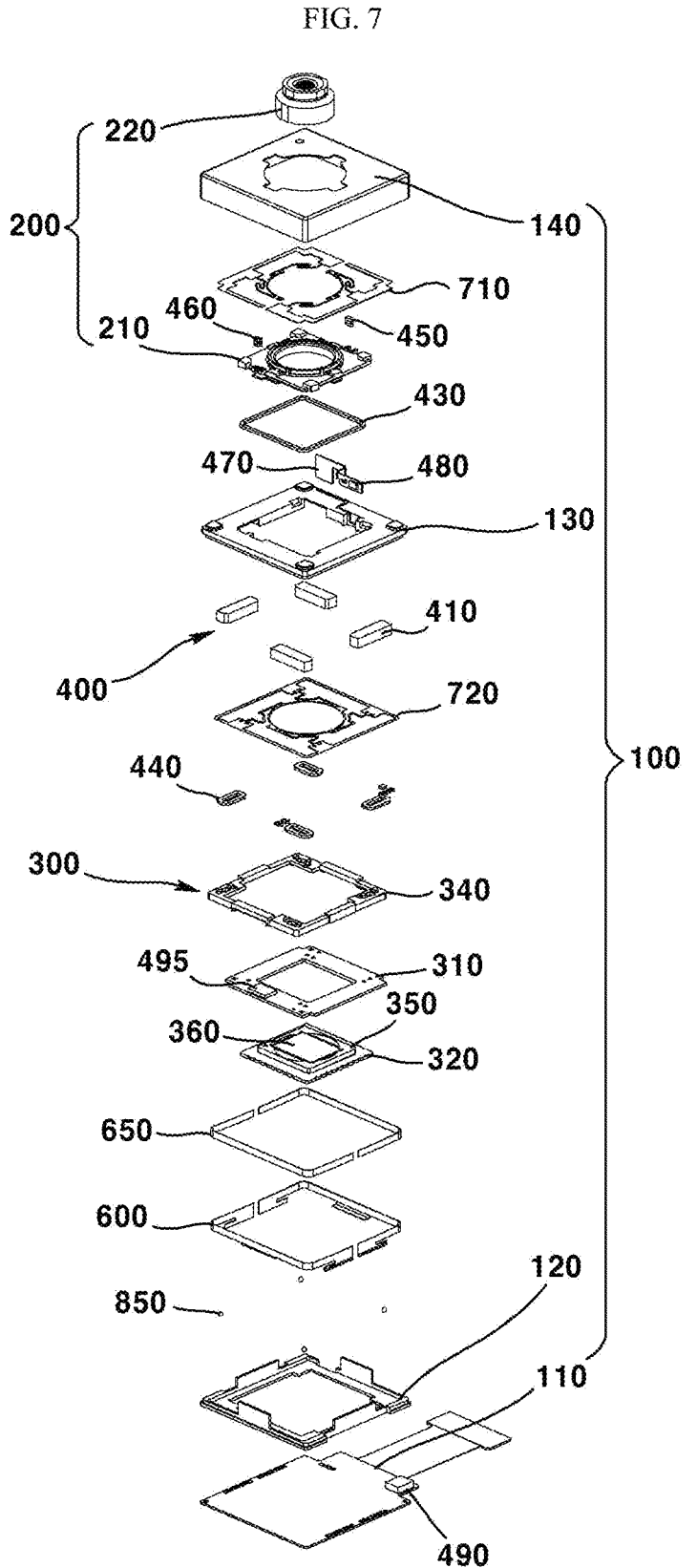
FIG. 7 is an exploded perspective view of a camera device according to a first embodiment of the present embodiment.
Figure 8:
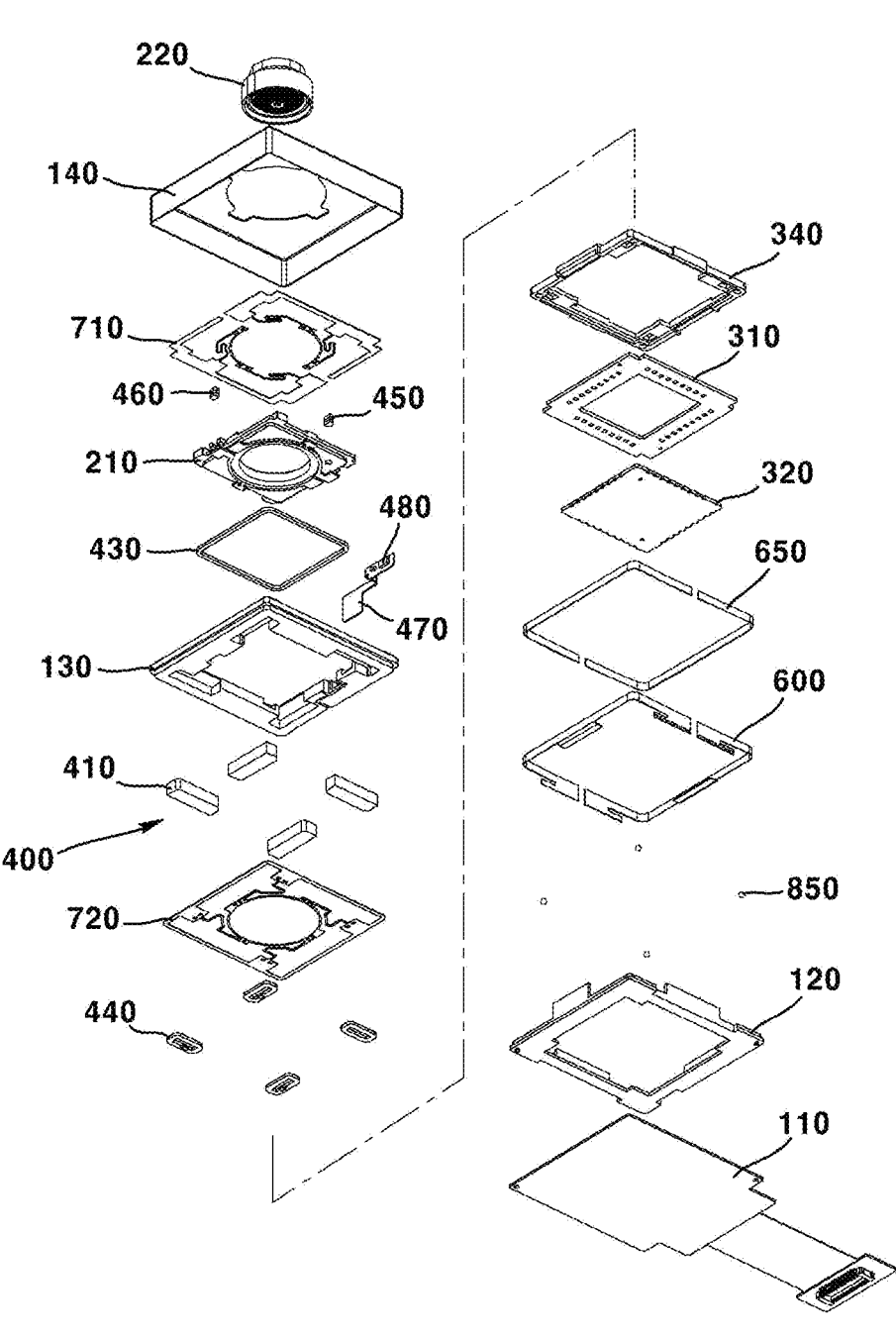
FIG. 8 is an exploded perspective view of a camera device according to a first embodiment of the present embodiment viewed from a different direction from that of FIG. 7.
Figure 9:
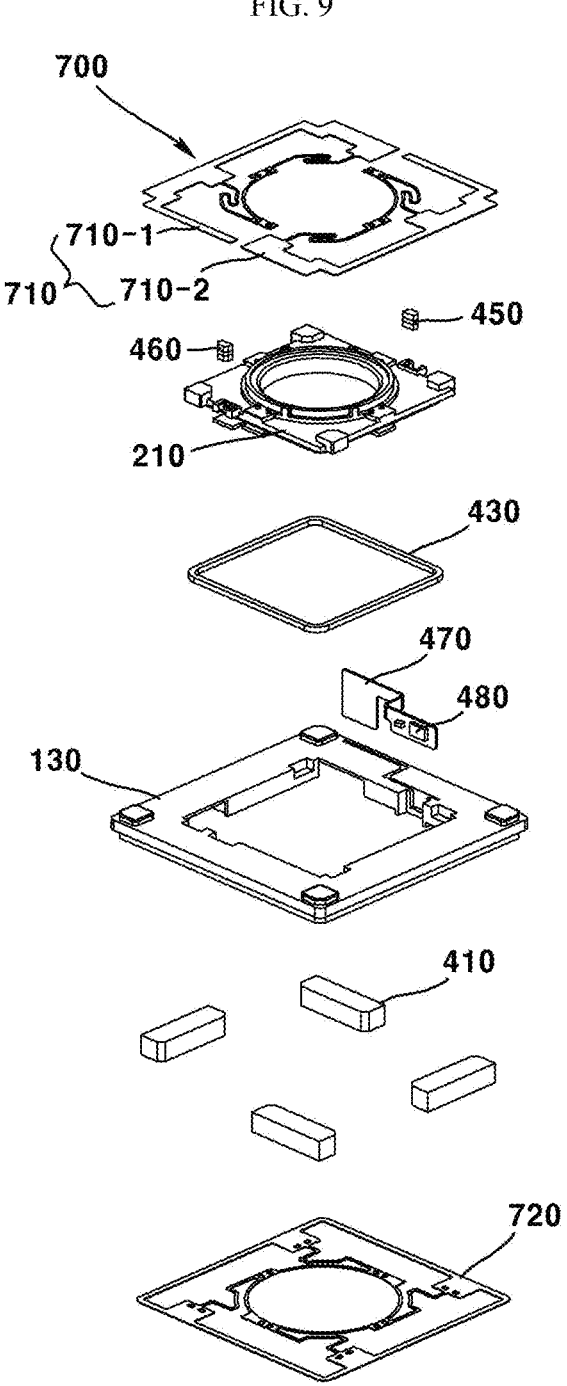
FIG. 9 is an exploded perspective view of a first moving part and related components of a camera device according to a first embodiment of the present embodiment.
Figure 11:
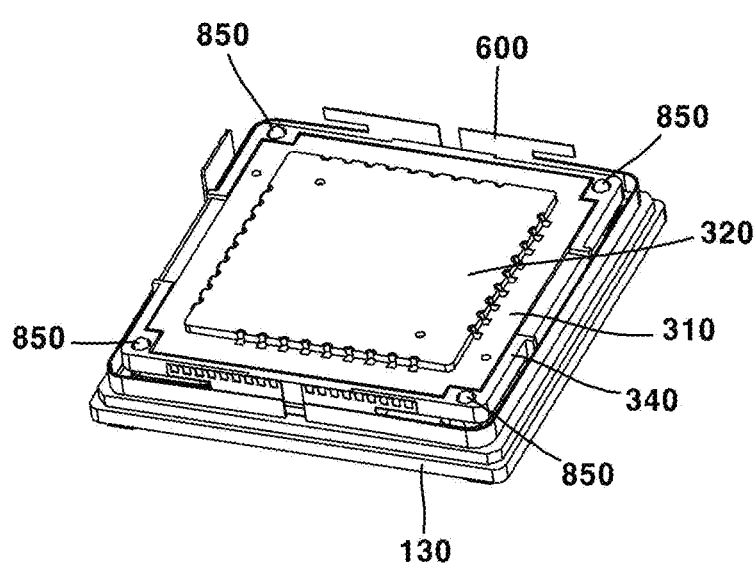
FIG. 11 is a bottom perspective view illustrating a second moving part and a ball of a camera device according to the first embodiment of the present invention.
Figure 12:
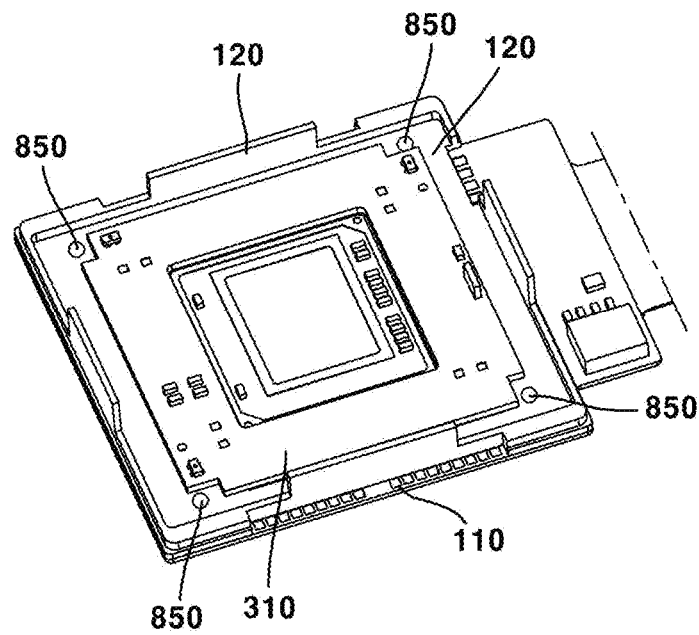
FIG. 12 is a bottom perspective view illustrating a ball and a fixed part of a camera device according to a first embodiment of the present invention.
Figure 15:
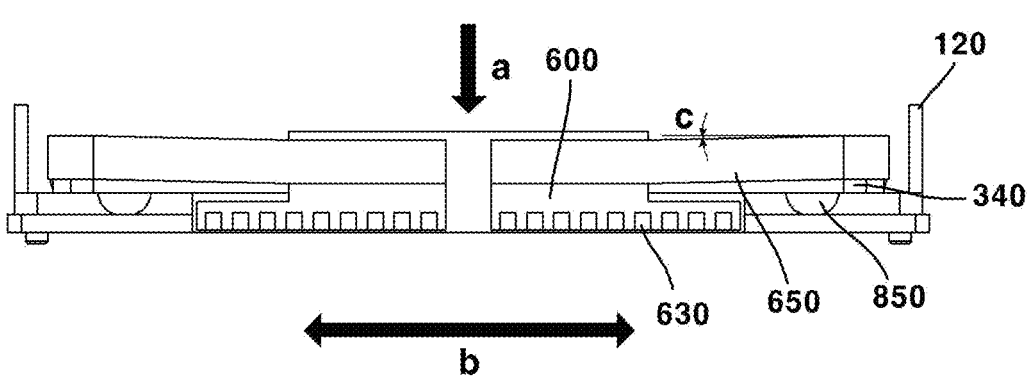
FIG. 15 is a diagram for explaining a structure for contacting a ball of a camera device according to a first embodiment of the present invention.
Figure 16:
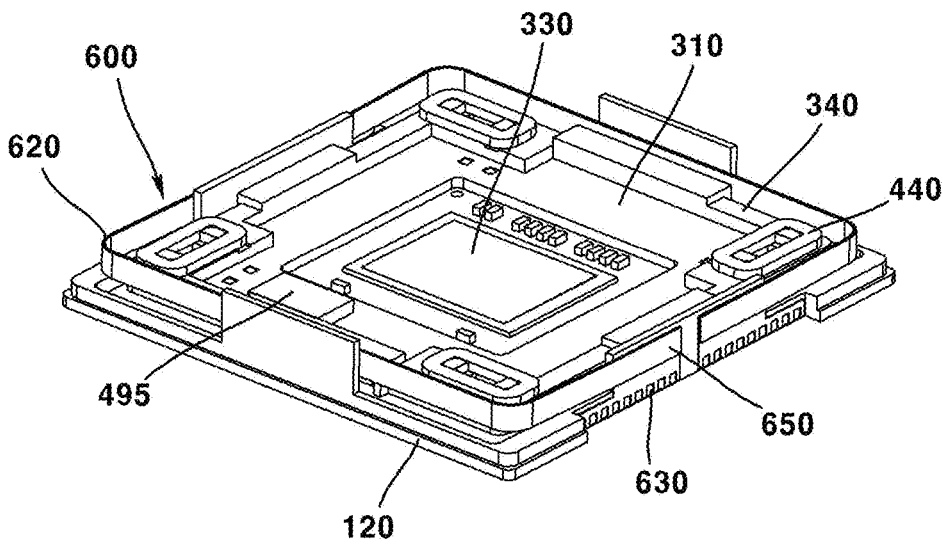
FIG. 16 is a perspective view of some components of a camera device according to a first embodiment of the present invention.
Figure 17:
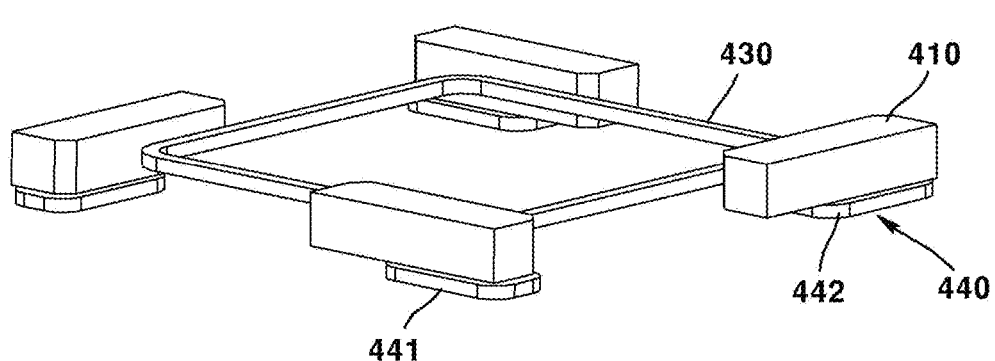
FIG. 17 is a perspective view of a magnet and a coil of a camera device according to a first embodiment of the present invention.
Figure 18:
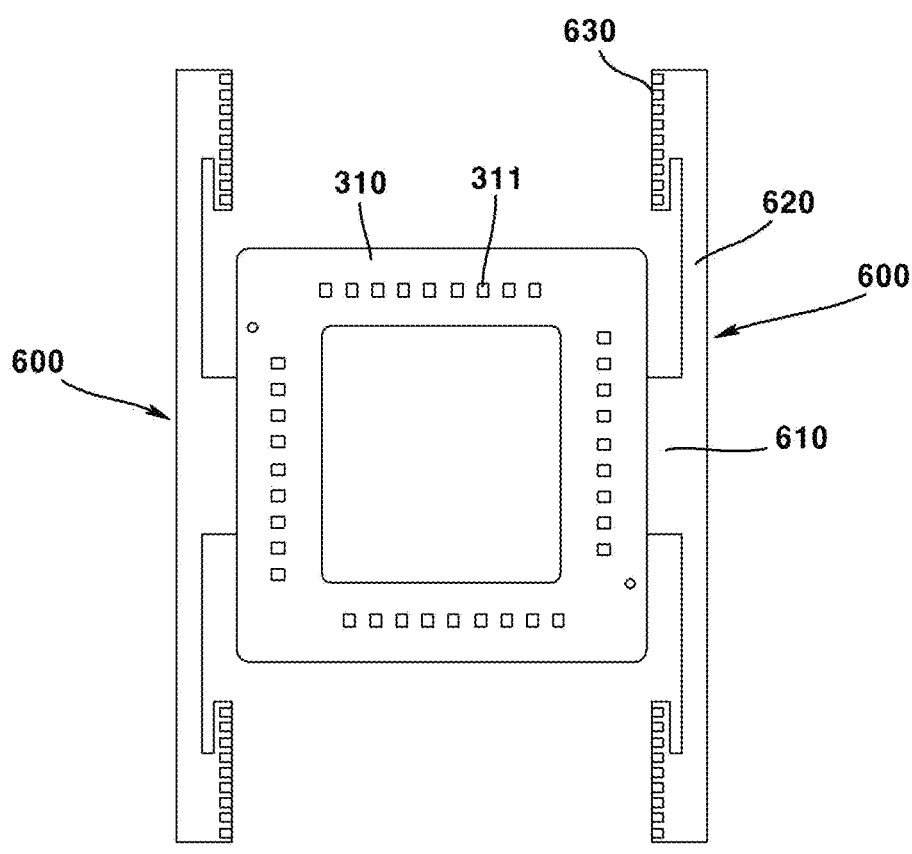
FIG. 18 is a plan view illustrating the connection between a second substrate and a connecting substrate of a camera device according to a first embodiment of the present invention in a state before the connecting substrate is bent.
Figure 19:
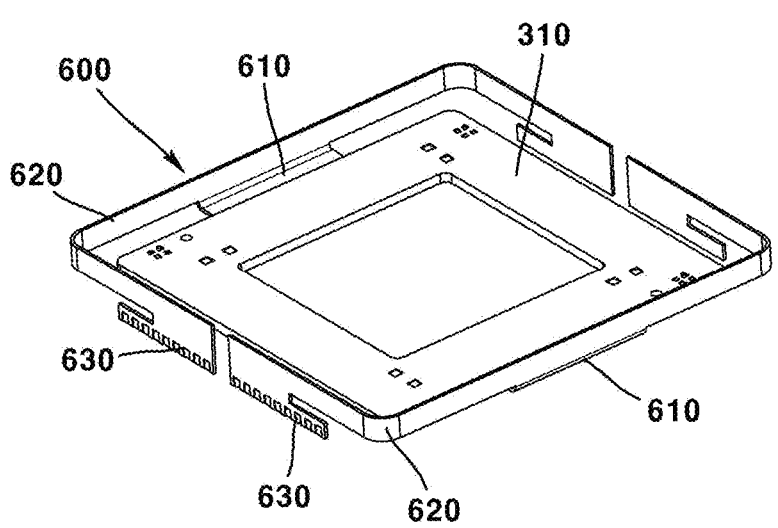
FIG. 19 is a perspective view of a state in which the connecting substrate of FIG. 14 is bent.
Figure 20:
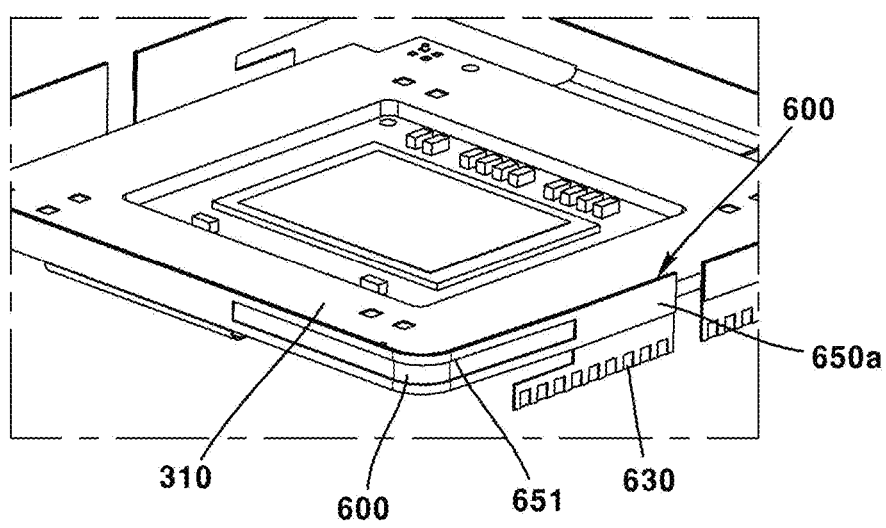
FIG. 20 is a perspective view illustrating a metal plate and related components of a camera device according to a first modified embodiment.
Figure 21:
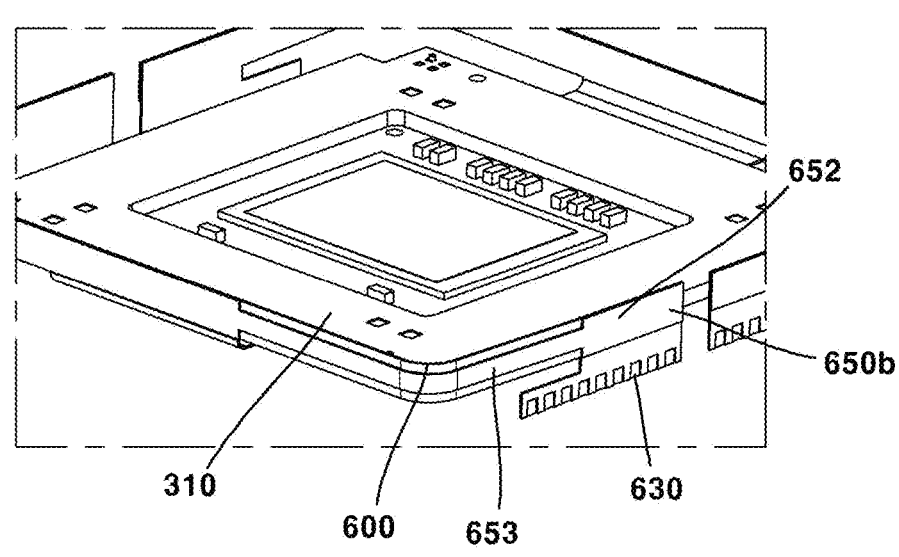
FIG. 21 is a perspective view illustrating a metal plate and related components of a camera device according to a second modified embodiment.
Figure 22:
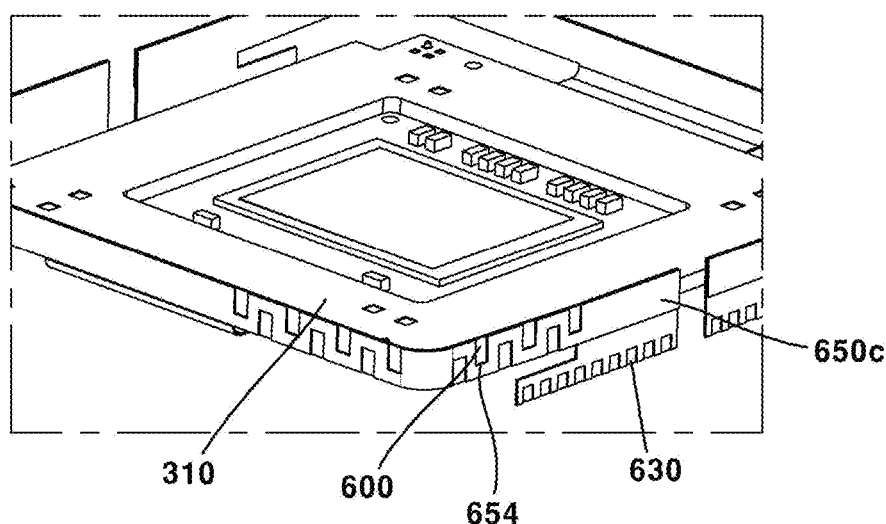
FIG. 22 is a perspective view illustrating a metal plate and related components of a camera device according to a third modified embodiment.
Figure 23:
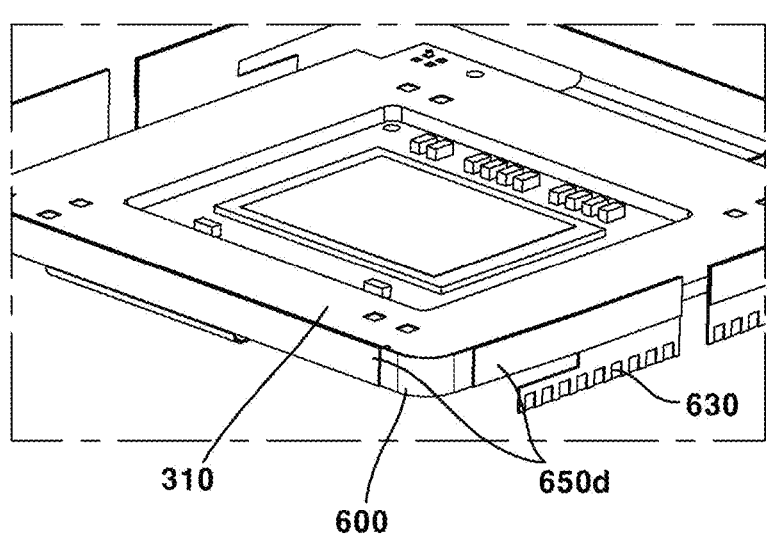
FIG. 23 is a perspective view illustrating a metal plate and related components of a camera device according to a fourth modified embodiment.
Figure 24:
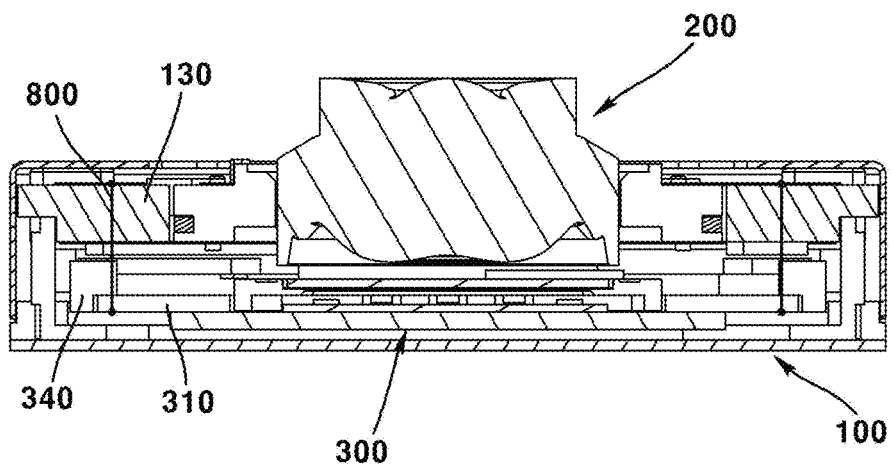
FIG. 24 is a cross-sectional view of a camera device according to a first embodiment of the present invention. Wires of the camera device according to a first embodiment of the present invention may be omitted in drawings other than FIG. 24. However, the wire may be illustrated and described in FIG. 24 as one component of a camera device according to a first embodiment of the present invention.

FIG. 1 is a perspective view of a camera device according to the present embodiment; FIG. 2 is a perspective view of a state in which a cover member is omitted from a camera device according to the present embodiment; FIG. 3 is a plan view of a camera device according to a first embodiment of the present embodiment; FIG. 4 is a cross-sectional view taken along line A-A in FIG. 3; FIG. 5 is a cross-sectional view taken along line B-B in FIG. 3; FIG. 6 is a cross-sectional view taken along line C-C in FIG. 3; FIG. 7 is an exploded perspective view of a camera device according to a first embodiment of the present embodiment; FIG. 8 is an exploded perspective view of a camera device according to a first embodiment of the present embodiment viewed from a different direction from that of FIG. 7; FIG. 9 is an exploded perspective view of a first moving part and related components of a camera device according to a first embodiment of the present embodiment; FIG. 10 is an exploded perspective view of a second moving part and related components of a camera device according to the present embodiment; FIG. 11 is a bottom perspective view illustrating a second moving part and a ball of a camera device according to the first embodiment of the present invention; FIG. 12 is a bottom perspective view illustrating a ball and a fixed part of a camera device according to a first embodiment of the present invention; FIG. 13(*a*) is a perspective view illustrating the appearance of a second moving part, a connecting substrate, and a metal plate of a camera device according to a first embodiment of the present invention; FIG. 13(*b*) is a cross-sectional view of a state in which the connecting substrate and the metal plate are coupled; FIG. 14 is a plan view illustrating a second moving part and a connecting substrate of a camera device according to a first embodiment of the present invention; FIG. 15 is a diagram for explaining a structure for contacting a ball of a camera device according to a first embodiment of the present invention; FIG. 16 is a perspective view of some components of a camera device according to a first embodiment of the present invention; FIG. 17 is a perspective view of a magnet and a coil of a camera device according to a first embodiment of the present invention; FIG. 18 is a plan view illustrating the connection between a second substrate and a connecting substrate of a camera device according to a first embodiment of the present invention in a state before the connecting substrate is bent; FIG. 19 is a perspective view of a state in which the connecting substrate of FIG. 14 is bent; FIG. 20 is a perspective view illustrating a metal plate and related components of a camera device according to a first modified embodiment; FIG. 21 is a perspective view illustrating a metal plate and related components of a camera device according to a second modified embodiment; FIG. 22 is a perspective view illustrating a metal plate and related components of a camera device according to a third modified embodiment; FIG. 23 is a perspective view illustrating a metal plate and related components of a camera device according to a fourth modified embodiment; and FIG. 24 is a cross-sectional view of a camera device according to a first embodiment of the present invention. Wires of the camera device according to a first embodiment of the present invention may be omitted in drawings other than FIG. 24. However, the wire may be illustrated and described in FIG. 24 as one component of a camera device according to a first embodiment of the present invention.

The camera device 10 can photograph one or more of images and videos. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a hand shake correction assembly. The camera device 10 may comprise an auto focus device. The camera device 10 may comprise a hand shake correction device. The camera device 10 may comprise an actuator. The camera device 10 may comprise a lens driving actuator. The camera device 10 may comprise a sensor driving actuator. The camera device 10 may comprise an auto focus actuator. The camera device 10 may comprise a hand shake correction actuator.

The camera device 10 may comprise a fixed part 100. The fixed part 100 may be a relatively fixed portion when the moving parts 200 and 300 move. The fixed part 100 may be a relatively fixed portion when at least one of the first moving part 200 and the second moving part 300 moves. The fixed part 100 may accommodate the first moving part 200 and the second moving part 300. The fixed part 100 may be disposed outside the first moving part 200 and the second moving part 300.

Throughout the specification, the first substrate 110 has been described as one component of the fixed part 100, but the first substrate 110 may be understood as a component separate from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise the first substrate 110. The first substrate 110 may be a main substrate. The first substrate 110 may be a substrate. The first substrate 110 may be a printed circuit board (PCB). The first substrate 110 may be connected to power of the optical device 1. The first substrate 110 may comprise a connector connected to power of the optical device 1.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 by an adhesive. The base 120 may be disposed between the first substrate 110 and the housing 130.

The camera device 10 may comprise a housing 130. The fixed part 100 may comprise a housing 130. The housing 130 may be disposed in base 120. The housing 130 may be disposed on base 120. The housing 130 may be disposed above the base 120. The housing 130 may be fixed to the base 120. The housing 130 may be coupled to base 120. The housing 130 may be attached to the base 120 by an adhesive. The housing 130 may be disposed on the first substrate 110. The housing 130 may be disposed above the first substrate 110. The housing 130 may be formed as a separate member from the base 120.

The camera device 10 may comprise a cover member 140. The fixed part 100 may comprise a cover member 140. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole being formed in an upper plate. The hole may be formed at a position corresponding to the lens 220. The cover member 140 may comprise a side plate. The side plate may comprise a plurality of side plates. The side plate may comprise four side plates. The side plate may comprise first to fourth side plates. The side plates may comprise first and second side plates being disposed opposite to each other, and third and fourth side plates being disposed opposite to each other. The cover member 140 may comprise a plurality of corners between pluralities of side plates.

Throughout the specification, the cover member 140 has been described as one component of the fixed part 100, but the cover member 140 may be understood as a separate component from the fixed part 100. The cover member 140 may be coupled with the fixed part 100. The cover member 140 may cover the first moving part 200.

The camera device 10 may comprise a first moving part 200. The first moving part 200 may move against the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be disposed to be movable in an optical axis direction inside the fixed part 100. An auto focus (AF) function may be performed by moving the first moving part 200 in an optical axis direction against the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed spaced apart from the first substrate 110. The bobbin 210 may be disposed inside the housing 130. The bobbin 210 may be disposed at an inner side of the housing 130. At least a portion of the bobbin 210 may be accommodated in the housing 130. The bobbin 210 may be movably disposed in the housing 130. The bobbin 210 may be movably disposed in the housing 130 in an optical axis direction. The bobbin 210 may be coupled to the lens 220. The bobbin 210 may comprise a hollow or hole. The lens 220 may be disposed in the hollow or hole of the bobbin 210. An outer circumferential surface of the lens 220 may be coupled to an inner circumferential surface of the bobbin 210.

The camera device 10 may comprise a lens 220. The first moving part 200 may comprise a lens 220. The lens 220 may be coupled to bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to the image sensor 330. An optical axis of the lens 220 may coincide with an optical axis of the image sensor 330. The optical axis may be a z-axis. The lens 220 may comprise a plurality of lenses. The lens 220 may comprise 5 or 6 lenses.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 may move against the fixed part 100. The second moving part 300 may move in a direction perpendicular to the optical axis direction with respect to the fixed part 100. The second moving part 300 may be disposed inside the fixed part 100. The second moving part 300 may be movably disposed inside the fixed part 100. The second moving part 300 may be disposed inside the fixed part 100 to be movable in a direction perpendicular to the optical axis direction. A hand shake correction function (OIS) may be performed by moving the second moving part 300 in a direction perpendicular to the optical axis direction against the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and a direction perpendicular to the optical axis direction. The second substrate 310 may move in a direction perpendicular to the optical axis direction. The second substrate 310 may be electrically connected to the image sensor 330. The second substrate 310 may move integrally with the image sensor 330. The second substrate 310 may comprise a hole. An image sensor 330 may be disposed in a hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from and coupled to the sensor substrate 320. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 with the image sensor 330 in a state being coupled thereto.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor base 350. The image sensor 330 may be electrically connected to the second substrate 310. The image sensor 330 may move integrally with the second substrate 310.

Light passing through the lens 220 and the filter 360 may be incident on the image sensor 330 to form an image. The image sensor 330 may be electrically connected to the sensor substrate 320, the second substrate 310 and the first substrate 110. The image sensor 330 may comprise an effective image region. The image sensor 330 may convert light irradiated onto the effective image region into an electrical signal. The image sensor 330 may comprise one or more among a charge coupled device (CCD), a metal oxide semi-conductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or hole in which the image sensor 330 is disposed. A second coil 440 may be disposed in the holder 340. The holder 340 may comprise a protrusion around which the second coil 440 is wound. The holder 340 may comprise a hole in which a Hall sensor 445 is disposed.

The camera device 10 may comprise a sensor base 350. The second moving part 300 may comprise a sensor base 350. The sensor base 350 may be disposed in the sensor substrate 320. The sensor base 350 may comprise a hole being formed at a position corresponding to the image sensor 330. The sensor base 350 may comprise a groove in which a filter 360 is disposed.

The camera device 10 may comprise a filter 360. The second moving part 300 may comprise a filter 360. The filter 360 may be disposed between the lens 220 and the image sensor 330. The filter 360 may be disposed in sensor base 350. The filter 360 may block light of a specific frequency band from entering the image sensor 330 from light passing through the lens 220. The filter 360 may comprise an infrared cut filter. The filter 360 may block infrared rays from being incident on the image sensor 330.

The camera device 10 may comprise a driving part. The driving part may move the moving parts 200 and 300 against the fixed part 100. The driving part may perform an auto focus (AF) function. The driving part may perform a hand shake correction (OIS) function. The driving part may move the lens 220. The driving part may move the image sensor 330. The driving part may comprise a magnet and a coil. The driving part may comprise a shape memory alloy (SMA).

The camera device 10 may comprise a first driving part. The first driving part may be an AF driving part. The first driving part may move the first moving part 200 in an optical axis direction. The first driving part may move the bobbin 210 in an optical axis direction. The lens 220 may be moved in an optical axis direction. The first driving part may perform an auto focus (AF) function. The first driving part may move the first moving part 200 upward in an optical axis direction. The first driving part may move the first moving part 200 downward in an optical axis direction.

The camera device 10 may comprise a second driving part. The second driving part may be an OIS driving part. The second driving part may move the second moving part 300 in a direction perpendicular to the optical axis direction. The second driving part may move the second substrate 310 in a direction perpendicular to the optical axis direction. The second driving part may move the sensor substrate 320 in a direction perpendicular to the optical axis direction. The second driving part may move the image sensor 330 in a direction perpendicular to the optical axis direction. The second driving part may move the holder 340 in a direction perpendicular to the optical axis direction. The second driving part may move the sensor base 350 in a direction perpendicular to the optical axis direction. The second driving part may move the filter 360 in a direction perpendicular to the optical axis direction. The second driving part may perform a hand shake correction (OIS) function.

The second driving part may move the second moving part 300 in a first direction perpendicular to the optical axis direction. The second driving part may move the second moving part 300 in a second direction perpendicular to the optical axis direction and the first direction. The second driving part may rotate the second moving part 300 about an optical axis.

In a first embodiment of the present invention, the first driving part may comprise a first coil 430. The second driving part may comprise a second coil 440. The first driving part and the second driving part may comprise a driving magnet 410 commonly used for interaction between the first coil 430 and the second coil 440. That is, the first driving part and the second driving part may comprise individually controlled coils and shared magnets.

The camera device 10 may comprise a driving magnet 410. The driving part may comprise a driving magnet 410. The driving magnet 410 may be a magnet. The driving magnet 410 may be a permanent magnet. The driving magnet 410 may be a common magnet. The driving magnet 410 may be commonly used for auto focus (AF) and hand shake correction (OIS).

The driving magnet 410 may be disposed in the fixed part 100. The driving magnet 410 may be fixed to the fixed part 100. The driving magnet 410 may be coupled to the fixed part 100. The driving magnet 410 may be attached to the fixed part 100 by an adhesive. The driving magnet 410 may be disposed in the housing 130. The driving magnet 410 may be fixed to the housing 130. The driving magnet 410 may be coupled to the housing 130. The driving magnet 410 may be attached to the housing 130 by an adhesive. The driving magnet 410 may be disposed at a corner of the housing 130. The driving magnet 410 may be disposed offset toward the corner of the housing 130.

The driving magnet 410 may be 2 pole magnetized magnet comprising one N-pole region and one S-pole region. As a modified embodiment, the driving magnet 410 may be a 4 pole magnetized magnet comprising two N pole regions and two S pole regions.

The driving magnet 410 may comprise a plurality of magnets. The driving magnet 410 may comprise four magnets. The driving magnet 410 may comprise first to fourth magnets. The first to fourth magnets may be disposed symmetrically with respect to the optical axis. The first to fourth magnets may have the same size and shape as each other.

As a modified embodiment, the driving magnet 410 may comprise a first magnet being disposed at a position corresponding to the first coil 430 and a second magnet being disposed at a position corresponding to the second coil 440. At this time, the first magnet and the second magnet may be disposed in the fixed part 100, and the first coil 430 and the second coil 440 may be disposed in the moving parts 200 and 300. Alternatively, the first magnet and the second magnet may be disposed in the moving parts 200 and 300, and the first coil 430 and the second coil 440 may be disposed in the fixed part 100.

The camera device 10 may comprise a first coil 430. The driving part may comprise the first coil 430. The first coil 430 may be disposed in the first moving part 200. The first coil 430 may be fixed to the first moving part 200. The first coil 430 may be coupled to the first moving part 200. The first coil 430 may be attached to the first moving part 200 by an adhesive. The first coil 430 may be disposed on the bobbin 210. The first coil 430 may be fixed to the bobbin 210. The first coil 430 may be coupled to the bobbin 210. The first coil 430 may be attached to the bobbin 210 by an adhesive. The first coil 430 may be electrically connected to a driver IC 480. The first coil 430 may be electrically connected to the lower elastic member 720, the sensing substrate 470 and the driver IC 480. The first coil 430 may receive current from the driver IC 480.

The first coil 430 may be disposed at a position corresponding to the driving magnet 410. The first coil 430 may be disposed on the bobbin 210 at a position corresponding to the driving magnet 410. The first coil 430 may face the driving magnet 410. The first coil 430 may comprise a surface facing the driving magnet 410. The first coil 430 may be disposed adjacent to the driving magnet 410. The first coil 430 may interact with the driving magnet 410. The first coil 430 may interact with the driving magnet 410 electromagnetically.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 upward in an optical axis direction. The first coil 430 may move the bobbin 210 upward in an optical axis direction. The first coil 430 may move the lens 220 upward in an optical axis direction. The first coil 430 may move the first moving part 200 downward in an optical axis direction. The first coil 430 may move the bobbin 210 downward in an optical axis direction. The first coil 430 may move the lens 220 in a downward direction of the optical axis direction.

The camera device 10 may comprise a second coil 440. The driving part may comprise a second coil 440. The second coil 440 may be disposed in the second moving part 300. The second coil 440 may be fixed to the second moving part 300. The second coil 440 may be coupled to the second moving part 300. The second coil 440 may be attached to the second moving part 300 by an adhesive. The second coil 440 may be disposed in the holder 340. The second coil 440 may be fixed to the holder 340. The second coil 440 may be coupled to the holder 340. The second coil 440 may be attached to the holder 340 by an adhesive. The second coil 440 may be disposed by being wound around a protrusion of the holder 340. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the driving magnet 410. The second coil 440 may be disposed at a position corresponding to the driving magnet 410 in the holder 340. The second coil 440 may face the driving magnet 410. The second coil 440 may comprise a surface facing the driving magnet 410. The second coil 440 may be disposed adjacent to the driving magnet 410. The second coil 440 may interact with the driving magnet 410. The second coil 440 may interact with the driving magnet 410 electromagnetically.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis.

The second coil 440 may comprise a plurality of coils. The second coil 440 may comprise four coils. The second coil 440 may comprise a coil for x-axis shift. The second coil 440 may comprise a coil for y-axis shift.

The second coil 440 may comprise a second-first coil 441. The second-first coil 441 may be a first sub coil. The second-first coil 441 may be a coil for x-axis shift. The second-first coil 441 may move the second moving part 300 in an x-axis direction. The second-first coil 441 may be disposed long in a y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, two coils of the second-first coil 441 may receive current together. Alternatively, the two coils of the second-first coil 441 may be electrically separated from each other and receive current individually.

The second coil 440 may comprise a second-second coil 442. The second-second coil 442 may be a second sub coil. The second-second coil 442 may be a coil for y-axis shift. The second-second coil 442 may move the second moving part 300 in a y-axis direction. The second-second coil 442 may be disposed long in an x-axis. The second-first coil 441 may comprise a plurality of coils. The second-second coil 442 may comprise two coils. The two coils of the second-second coil 442 may be electrically connected to each other. The second-second coil 442 may comprise a connection coil connecting the two coils. In this case, two coils of the second-second coil 442 may receive current together. Alternatively, the two coils of the second-second coil 442 may be electrically separated from each other and receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall element (Hall IC). The Hall sensor 445 may detect the driving magnet 410. The Hall sensor 445 may detect the magnetic force of the driving magnet 410. The Hall sensor 445 may face the driving magnet 410. The Hall sensor 445 may be disposed at a position corresponding to the driving magnet 410. The Hall sensor 445 may be disposed adjacent to the driving magnet 410. The Hall sensor 445 may detect the position of the second moving part 300. The Hall sensor 445 may detect the movement of the second moving part 300. The Hall sensor 445 may be disposed in the hollow of the second coil 440. A sensing value detected by the Hall sensor 445 may be used to provide feedback for hand shake correction driving. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect displacement of the second moving part 300 in an x-axis direction. The second Hall sensor may detect displacement of the second moving part 300 in a y-axis direction. The third Hall sensor may detect the rotation of the second moving part 300 about a z-axis either alone or together with one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 by an adhesive. The sensing magnet 450 may be disposed on the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the driving magnet 410. Through this, the influence of the sensing magnet 450 on driving may be minimized.

The sensing magnet 450 may be disposed at an opposite side of the correction magnet 460. The sensing magnet 450 and the correction magnet 460 may be disposed at opposite sides in the first moving part 200. The sensing magnet 450 and the correction magnet 460 may be disposed opposite to each other on the bobbin 210.

The camera device 10 may comprise a correction magnet 460. The compensation magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be attached to the first moving part 200 by an adhesive. The correction magnet 460 may be disposed on the bobbin 210. The correction magnet 460 may be fixed to the bobbin 210. The correction magnet 460 may be coupled to the bobbin 210. The correction magnet 460 may be attached to the bobbin 210 by an adhesive. The correction magnet 460 may be formed to have a smaller size than the driving magnet 410. Through this, the influence of the correction magnet 460 on driving may be minimized. In addition, the correction magnet 460 may be disposed at an opposite side of the sensing magnet 450 to form a magnetic balance with the sensing magnet 450. Through this, tilt that may be generated by the sensing magnet 450 may be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130.

The camera device 10 may comprise a driver IC 480. The driver IC 480 may be an AF driver IC. The driver IC 480 may be electrically connected to the first coil 430. The driver IC 480 may apply current to the first coil 430 to perform AF driving. The driver IC 480 may apply power to the first coil 430. The driver IC 480 may apply current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall element (Hall IC). The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect movement of the first moving part 200. A detection value detected by the sensor may be used for feedback of autofocus driving.

The camera device 10 may comprise a gyro sensor 490. The gyro sensor 490 may be disposed in the first substrate 110. The gyro sensor 490 may detect shaking of the camera device 10. The gyro sensor 490 may sense angular velocity or linear velocity due to shaking of the camera device 10. The gyro sensor 490 may be electrically connected to the driver IC 495. Shaking of the camera device 10 detected by the gyro sensor 490 may be used for hand shake correction (OIS) driving.

The camera device 10 may comprise a driver IC 495. The driver IC 495 may be an OIS driver IC. The driver IC 495 may be electrically connected to the second coil 440. The driver IC 495 may apply current to the second coil 440 to perform OIS driving. The driver IC 495 may apply power to the second coil 440. The driver IC 495 may apply current to the second coil 440. The driver IC 495 may apply a voltage to the second coil 440. The driver IC 495 may be disposed in the second substrate 310.

The camera device 10 may comprise an interposer. The interposer may comprise a connecting substrate 600 and a metal plate 650. The interposer may be a composite spring. The interposer may be a composite of FPCB and metal. The interposer may serve as both an electrical connection and a spring. The interposer may comprise an elastic member. The interposer may comprise a spring. The interposer may comprise a leaf spring. The interposer may comprise an FPCB. FPCBs can be formed without bending. The interposer may press the second substrate 310 in a direction of the ball 850.

The camera device 10 may comprise a connecting member. The connecting member may comprise a connecting substrate 600 and a metal plate 650. The connecting member may be a composite spring. The connecting member may be a complex of FPCB and metal. The connecting member can serve as both an electrical connection and a spring. The connecting member may comprise an elastic member. The connecting member may comprise a spring. The connecting member may comprise a leaf spring. The connecting member may comprise FPCB. FPCBs can be formed without bending. The connecting member may press the second substrate 310 in the direction of the ball 850. The connecting member may be an electrical connection means.

The camera device 10 may comprise a connecting substrate 600. The connecting substrate 600 may be a connecting portion. The connecting substrate 600 may be a connecting member. The connecting substrate 600 may be a flexible substrate. The connecting substrate 600 may be a flexible substrate. The connecting substrate 600 may be a flexible printed circuit board. The connecting substrate 600 may be a flexible printed circuit board (FPCB). The connecting substrate 600 may have flexibility at least in part. The second substrate 310 and the connecting substrate 600 may be integrally formed.

The connecting substrate 600 may support the second moving part 300. The connecting substrate 600 may support the movement of the second moving part 300. The connecting substrate 600 may movably support the second moving part 300. The connecting substrate 600 may connect the second moving part 300 and the fixed part 100. The connecting substrate 600 may connect the first substrate 110 and the second substrate 310. The connecting substrate 600 may electrically connect the first substrate 110 and the second substrate 310. The connecting substrate 600 may guide the movement of the second moving part 300. The connecting substrate 600 may guide the second moving part 300 to move in a direction perpendicular to the optical axis direction. The connecting substrate 600 may guide the second moving part 300 to rotate about an optical axis. The connecting substrate 600 may limit the movement of the second moving part 300 in an optical axis direction. A portion of the connecting substrate 600 may be coupled to the base 120.

The connecting substrate 600 may comprise two connecting substrates 600 being spaced apart from each other and formed symmetrically. As shown in FIG. 14, two connecting substrates 600 may be disposed on both sides of the second substrate 310. The connecting substrate 600 connected as shown in FIG. 14 may be bent six times to connect the first substrate 110 and the second substrate 310 as shown in FIG. 15.

The connecting substrate 600 may comprise a first region being connected to the second substrate 310 and being bent in an optical axis direction. The first region may be connected to the second substrate 310 and bent in an optical axis direction. The first region may be connected to the second substrate 310 and may be extended in an optical axis direction. The first region may be connected to the second substrate 310 and may be bent and extended in an optical axis direction. The connecting substrate 600 may comprise a second region being extended from a first region. The connecting substrate 600 may comprise a third region being bent in a direction perpendicular to the optical axis direction in a second region. The third region may be bent in a direction perpendicular to the optical axis direction in a second region. The third region may be extended in a direction perpendicular to the optical axis direction in a second region. The third region may be bent and extended in a direction perpendicular to the optical axis direction in a second region.

The connecting substrate 600 may comprise a connecting portion 610 comprising a first region. The connecting substrate 600 may comprise an extension portion 620 comprising a second region and a third region. The connecting substrate 600 may comprise a connecting portion 610 being connected to the second substrate 310. The connecting substrate 600 may comprise an extension portion 620 being extended from the connecting portion 610. The connecting substrate 600 may comprise a terminal portion 630 being connected to the extension portion 620 and comprising terminals.

The connecting substrate 600 may comprise a connecting portion 610. The connecting portion 610 may be connected to the second moving part 300. The connecting portion 610 may be coupled to the second moving part 300. The connecting portion 610 may be fixed to the second moving part 300. The connecting portion 610 may be connected to the second substrate 310. The connecting portion 610 may be coupled to the second substrate 310. The connecting portion 610 may be fixed to the second substrate 310. The connecting portion 610 may comprise a first bending region being bent in an optical axis direction. The connecting portion 610 may comprise a first region being bent in an optical axis direction with respect to the second substrate 310 and a second region being extended from a first region and being bent in a direction perpendicular to the optical axis direction.

The connecting substrate 600 may comprise an extension portion 620. The extension portion 620 may connect the connecting portion 610 and the terminal portion 630. The extension portion 620 may be extended from the connecting portion 610. The extension portion 620 may comprise a second bending region being bent in a direction perpendicular to the optical axis direction.

The connecting substrate 600 may comprise a terminal portion 630. The terminal portion 630 may be coupled to the fixed part 100. The terminal portion 630 may be fixed to the fixed part 100. The terminal portion 630 may be coupled to the first substrate 110. The terminal portion 630 may be connected to the first substrate 110. The terminal portion 630 may be soldered to the first substrate 110. The terminal portion 630 may be fixed to the first substrate 110. The terminal portion 630 may be coupled to the base 120. The terminal portion 630 may be fixed to the base 120. The terminal portion 630 may comprise terminals. The terminal may be coupled to the first substrate 110.

In a first embodiment of the present invention, the camera device 10 may comprise a flexible substrate. The flexible substrate can connect the fixed part 100 and the second moving part 300. The flexible substrate may comprise a connecting portion 610 being connected to the second moving part 300, an extension portion 620 being extended from the connecting portion 610, and a terminal portion 630 being connected to the extension portion 620 and comprising a terminal.

In a first embodiment of the present invention, the connecting substrate 600 may comprise a first portion being coupled to the first substrate 110, a second portion being coupled to the second substrate 310, and a third portion connecting the first portion and the second portion. The third portion may be disposed at least partially parallel to an optical axis. The third portion may be formed so that the length in an optical axis direction is longer than the thickness. The second portion of the connecting substrate 600 may be disposed at least partially in parallel with the second substrate 310. The third portion of the connecting substrate 600 may be disposed perpendicular to the second portion at least in part. The third portion of the connecting substrate 600 may be bent roundly at the portion corresponding to the corner of the second substrate 310. The second substrate 310 may comprise a first side surface and a second side surface being disposed opposite to each other, and a third side surface and a fourth side surface being disposed opposite to each other. The second portion of the connecting substrate 600 may be coupled with the first side surface and second side surface of the second substrate 310. The first portion of the connecting substrate 600 may be coupled to a portion of the first substrate 110 corresponding to the third side surface and fourth side surface of the second substrate 310.

As illustrated in FIG. 15, in a first embodiment of the present invention, the terminal portion 630 of the connecting substrate 600 may be fixed to the first substrate 110. The upper end of the extension portion 620 may be disposed lower in a region adjacent to the terminal portion 630 than in a region adjacent to the connecting portion 610. Through this, with respect to the virtual horizontal line extending from the upper end of the extension portion 620 in a region adjacent to the connecting portion 610, the upper end of the extension portion 620 is disposed to be more downwardly inclined as it approaches the terminal portion 630 so as to have a predetermined angle (refer to c in FIG. 15). Through this, the connecting substrate 600 can press the second moving part 300 toward the ball 850 (refer to a in FIG. 15). At this time, the direction in which the connecting substrate 600 presses the second moving part 300 may be perpendicular to the moving direction of the second moving part 300 (refer to b in FIG. 15).

In a first embodiment of the present invention, the metal plate 650 is coupled to the connecting substrate 600, so that the force with which the connecting substrate 600 presses the second moving part 300 toward the ball 850 can be increased. The ball 850 can be maintained between the second moving part 300 and the fixed part 100 without being removed by the pressing force of the connecting substrate 600 and the metal plate 650. Close contact between the second moving part 300 and the ball 850 and the fixed part 100 and the ball 850 can be maintained by the pressing force of the connecting substrate 600 and the metal plate 650.

The camera device 10 may comprise a metal plate 650. The connecting substrate 600 may comprise a metal plate 650. However, the metal plate 650 may be understood as a separate component from the connecting substrate 600. The metal plate 650 may be a metal member. The metal plate 650 may be a metal part. The metal plate 650 may be a metal layer. The metal plate 650 may be a metal thin film. The metal plate 650 may be formed of metal. The metal plate 650 may be formed of an alloy. The metal plate 650 may be formed of a conductive material. The metal plate 650 can be distinguished from the conductive layer of the connecting substrate 600. The metal plate 650 may be formed of a material different from the conductive layer of the connecting substrate 600.

The metal plate 650 may be coupled to the connecting substrate 600. The metal plate 650 may have elasticity. The metal plate 650 may press the holder 340 toward the first substrate 110. The metal plate 650 may press the holder 340 toward the base 120. The metal plate 650 may press the second moving part 300 toward the first substrate 110. The metal plate 650 may press the second moving part 300 toward the base 120.

In an optical axis direction, at least in part, the length of the metal plate 650 may be equal to the length of the extension portion 620. The metal plate 650 may be extended to the same length in an optical axis direction as the extension portion 620. The thickness of the metal plate 650 may be the same as the thickness of the connecting substrate 600. The thickness of the metal plate 650 may be thicker than the thickness of the connecting substrate 600.

At least a portion of the metal plate 650 may be disposed in the extension portion 620 of the connecting substrate 600. The extension portion 620 may comprise a bending region being bent in a direction perpendicular to the optical axis direction. At this time, the metal plate 650 may be disposed in the bending region.

The metal plate 650 may be formed of a conductive material. The metal plate 650 can be used as a ground (GND). The metal plate 650 may be electrically connected to the first substrate 110. In this case, the quantity of power connection patterns of the connecting substrate 600 may be reduced.

A camera device 10 according to a first modified embodiment may comprise a metal plate 650a as illustrated in FIG. 20. The metal plate 650a may comprise a hole 651. At least a portion of the hole 651 of the metal plate 650a may be disposed in a bending region of the extension portion 620.

A camera device 10 according to a second modified embodiment may comprise a metal plate 650b as illustrated in FIG. 21. The metal plate 650b may comprise a first portion 652 and a second portion 653 that is shorter than the first portion 652 in an optical axis direction. At least a portion of the second portion 653 of the metal plate 650b may be disposed in a bending region of the extension portion 620.

A camera device 10 according to a third modified embodiment may comprise a metal plate 650c as illustrated in FIG. 22. The metal plate 650c may comprise a plurality of grooves 654 that are concave in an optical axis direction. The plurality of grooves 654 of the metal plate 650 may not be disposed in a bending region of the extension portion 620. The plurality of grooves 654 may be formed in a zigzag shape.

A camera device 10 according to a fourth modified embodiment may comprise a metal plate 650d as illustrated in FIG. 23. The metal plate 650d may not be disposed in a bending region of the extension portion 620. The metal plate 650d may comprise a cutout part that opens the bending region of the extension portion 620.

The camera device 10 may comprise an elastic member 700. The elastic member 700 may be a support member. The elastic member 700 can connect the fixed part 100 and the first moving part 200. The elastic member 700 can elastically connect the fixed part 100 and the first moving part 200. The elastic member 700 can connect the bobbin 210 and the housing 130. The elastic member 700 can elastically connect the bobbin 210 and the housing 130. The elastic member 700 can movably support the first moving part 200 with respect to the fixed part 100. The elastic member 700 may be deformed when the first moving part 200 moves. When the movement of the first moving part 200 is completed, the elastic member 700 can position the first moving part 200 to the initial position through restoring force (elastic force). The elastic member 700 may comprise a leaf spring. The elastic member 700 may comprise a spring. The elastic member 700 may have elasticity at least in part. The elastic member 700 can provide restoring force (elastic force) to the first moving part.

The camera device 10 may comprise an upper elastic member 710. The elastic member 700 may comprise an upper elastic member 710. The upper elastic member 710 may be disposed above the lower elastic member 720. The upper elastic member 710 may comprise an inner side portion being coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise an outer side portion being coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connecting portion connecting the inner side portion and the outer side portion. The connecting portion may have elasticity.

The upper elastic member 710 may comprise a plurality of upper elastic units. The upper elastic member 710 may comprise first and second upper elastic units 710-1 and 710-2. The upper elastic member 710 may comprise two upper elastic units 710-1 and 710-2. The two upper elastic units are spaced apart from each other to electrically connect the sensing substrate 470 and the first coil 430.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise an outer side portion being coupled to the housing 130. The outer side portion of the lower elastic member 720 may be coupled to an upper portion of the housing 130. The outer side portion of the lower elastic member 720 may be disposed on an upper surface of the housing 130. The lower elastic member 720 may comprise a connecting portion connecting the inner side portion and the outer side portion. The connecting portion may have elasticity.

In a modified embodiment, the lower elastic member 720 may comprise a plurality of lower elastic units. The lower elastic member 720 may comprise first and second lower elastic units. The lower elastic member 720 may comprise two lower elastic units. The two lower elastic units are spaced apart from each other and can electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 can connect the fixed part 100 and the second moving part 300. The wire 800 can elastically connect the fixed part 100 and the second moving part 300. The wire 800 can connect the housing 130 and the second substrate 310. The wire 800 can elastically connect the housing 130 and the second substrate 310. The wire 800 can movably support the second moving part 300. The wire 800 can support the second moving part 300 to move or rotate in a direction perpendicular to the optical axis direction.

The camera device 10 may comprise a ball 850. The ball 850 may be formed in a spherical shape. The ball 850 can guide the movement of the second moving part 300 through rolling. The ball 850 can guide the second moving part 300 to move in a direction perpendicular to the optical axis direction. The ball 850 can guide the second moving part 300 to rotate about an optical axis. The ball 850 may be disposed between the holder 340 and the base 120. The ball 850 may be placed between the second moving part 300 and the fixed part 100. The ball 850 may be disposed between the second moving part 300 and the base 120. The ball 850 may be disposed between the second moving part 300 and the first substrate 110. The ball 850 may be disposed between the holder 340 and the first substrate 110. The holder 340 may comprise a portion being disposed between the second coil 440 and the ball 850 in an optical axis direction. The ball 850 may be overlapped with the second coil 440 in an optical axis direction.

The ball 850 may comprise a plurality of balls. The ball 850 may comprise four balls. The ball 850 may comprise first to fourth balls. Four balls may be disposed in four corner regions of a lower surface of the second moving part 300.

The camera device 10 according to a first embodiment of the present invention can use a common magnet for AF and OIS operation. In a first embodiment of the present invention, a magnetic field structure of VCM for driving a total of 4 axes, one axis for AF driving (Z-shift) and three axes for OIS driving (X-shift, Y-shift, Z-Roll), can be implemented with 4 magnets. In addition, in a first embodiment of the present invention, the FPCB bending structure can serve as both an electrical connection and a spring.

In a first embodiment of the present invention, a driving magnet common structure can be expected to reduce material costs by reducing the number of magnets to be applied. In addition, in a first embodiment of the present invention, the height dimension of the camera device 10 can be reduced by applying a common magnet structure. In addition, in a first embodiment of the present invention, assembly and productivity can be improved by bending the connecting substrate 600 a total of 6 times to achieve a spring shape.

In a first embodiment of the present invention, the image sensor 330, sensor substrate 320, holder 340, and second coil 440 may be comprised in a moving part. The base 120, first substrate 110, driving magnet 410, and cover member 140 may be comprised in a fixed part. A composite spring coupling an FPCB and a metal plate can be bent and applied to serve as an electrical connection and spring between the mentioned moving parts and fixed parts. In a first embodiment of the present invention, the connecting substrate 600 and the metal plate 650 can be coupled so as to form one connecting member.

In a first embodiment of the present invention, a ball is disposed between the fixed part 100 and the second moving part 300, and by applying the z-axis offset of the composite spring of the connecting substrate 600 and the metal plate 650, a preload perpendicular to the driving direction can be formed.

In a first embodiment of the present invention, the interposer structure, which is a key component of sensor shift, is applied as an FPCB and metal composite, so it has an advantage of being able to produce a spring shape that is easy to bend by offsetting the restoring force of the FPCB. In addition, by using the metal layer as a ground (GND), the number of power connection patterns of the FPCB can be reduced.

Hereinafter, the driving of a camera device according to a first embodiment of the present invention will be described with reference to the drawings.

Figure 25:
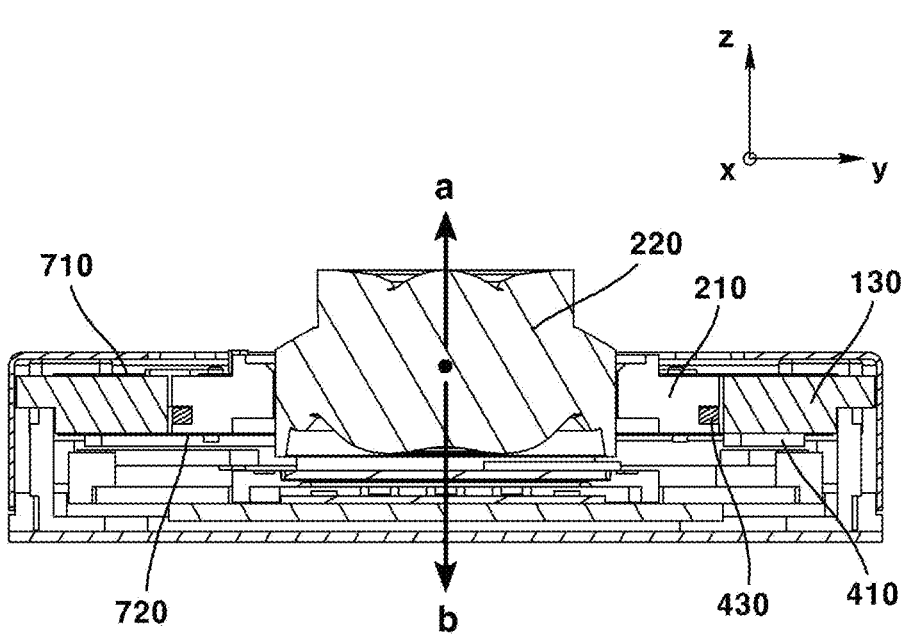
FIG. 25 is a diagram for explaining the driving of an auto focus function of a camera device according to a first embodiment of the present invention.

FIG. 25 is a diagram for explaining the driving of an auto focus function of a camera device according to a first embodiment of the present invention.

When power is applied to the first coil 430 of a camera device 10 according to a first embodiment of the present invention, an electromagnetic field is formed in the first coil 430, and the first coil 430 can move in an optical axis direction (z-axis direction) through electromagnetic interaction with driving magnet 410. At this time, the first coil 430 may move in an optical axis direction together with the first moving part 200 comprising the lens 220. In this case, the lens 220 moves away from or approaches the image sensor 330, so the focus of the subject can be adjusted. To apply power to the first coil 430, any one or more of current and voltage may be applied.

When a current in a first direction is applied to a first coil 430 of a camera device 10 according to a first embodiment of the present invention, the first coil 430 can move in an upward direction (refer to a in FIG. 25) of the optical axis direction. At this time, the first coil 430 can move the lens 220 in an upward direction of optical axis direction to be away from the image sensor 330.

When a current in a second direction opposite to the first direction is applied to the first coil 430 of a camera device 10 according to a first embodiment of the present invention, the first coil 430 can move in a downward direction (refer to b in FIG. 25) of the optical axis direction through electromagnetic interaction with driving magnet 410. At this time, the first coil 430 can move the lens 220 downward in an optical axis direction to become closer to the image sensor 330.

Figure 26:
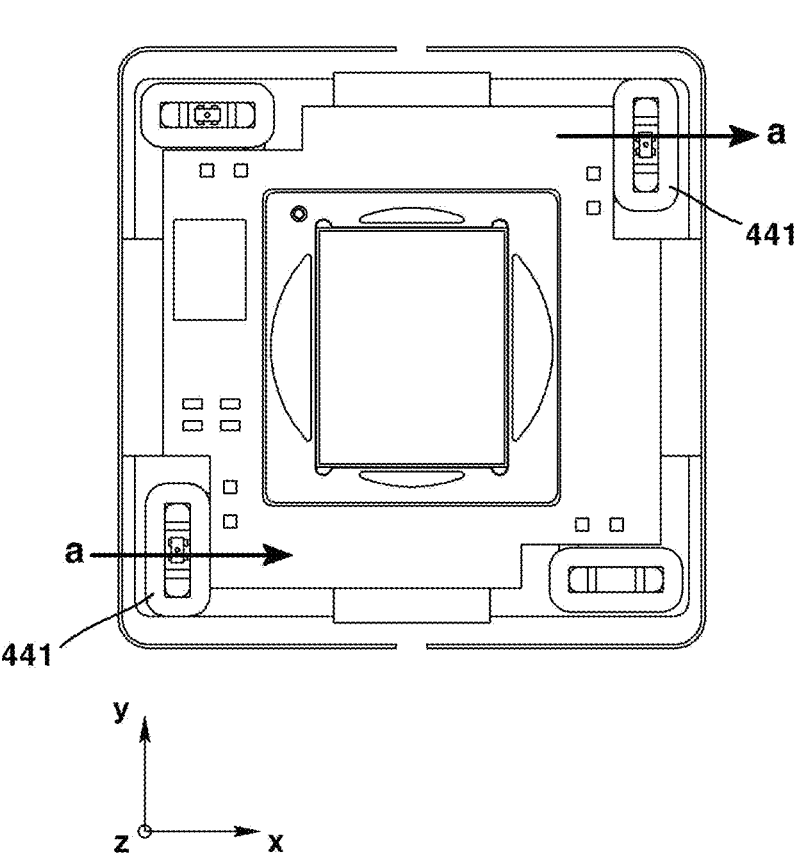
FIGS. 26 to 28 are diagrams for explaining the driving of the hand shake correction function of a camera device according to a first embodiment of the present invention. In more detail.
Figure 27:
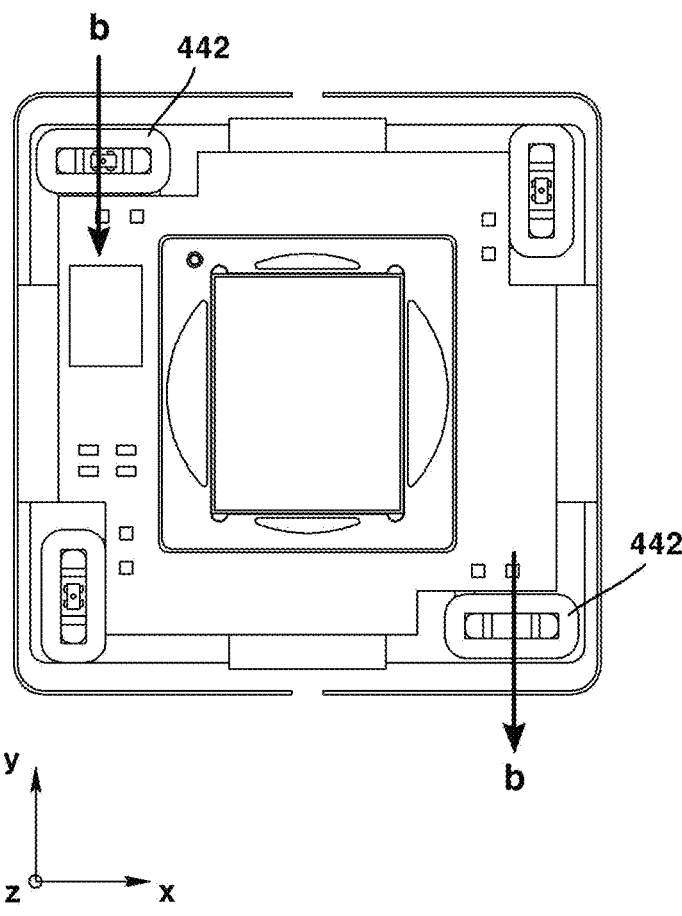
Figure 28:
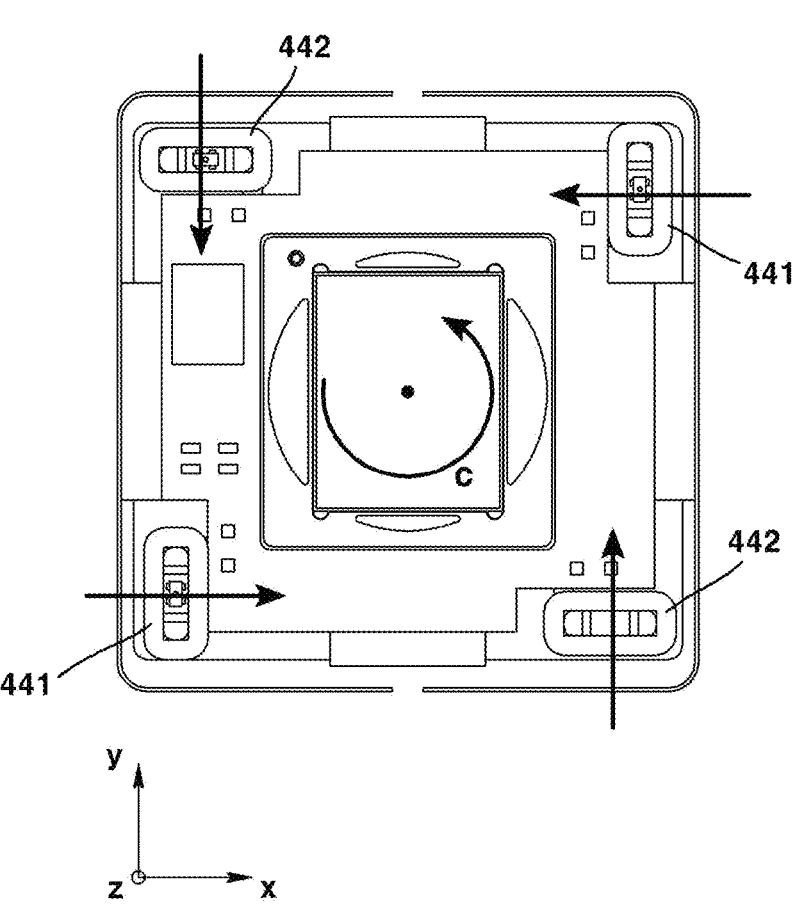

FIGS. 26 to 28 are diagrams for explaining the driving of the hand shake correction function of a camera device according to a first embodiment of the present invention.

When power is applied to the second coil 440 of a camera device 10 according to a first embodiment of the present invention, an electromagnetic field is formed in the second coil 440, and the second coil 440 can move in a direction perpendicular to the optical axis direction through electromagnetic interaction with driving magnet 410. In addition, the second coil 440 can rotate about an optical axis through electromagnetic interaction with the driving magnet 410. At this time, the second coil 440 may move or rotate together with the second moving part 300 comprising the image sensor 330. In a first embodiment of the present invention, the second coil 440 can move the image sensor 330 so as to compensate for the shaking of the camera device 10 being detected by the gyro sensor.

FIG. 26 is a diagram for explaining driving in which an image sensor of a camera device according to a first embodiment of the present invention is shifted along the x-axis.

When a current in a first direction is applied to the second-first coil 441 of a camera device 10 according to a first embodiment of the present invention, the second-first coil 441 can move in one direction (refer to a in FIG. 26) of the first direction (x-axis direction) perpendicular to the optical axis direction through electromagnetic interaction with driving magnet 410. At this time, the second-first coil 441 can move the image sensor 330 in one of the first direction perpendicular to the optical axis direction. Conversely, when a current in a second direction opposite to the first direction is applied to the second-first coil 441, the second-first coil 441 can move in another direction of the first direction (x-axis direction) perpendicular to the optical axis direction through electromagnetic interaction with driving magnet 410. At this time, the second-first coil 441 can move the image sensor 330 in another direction of the first direction perpendicular to the optical axis direction.

FIG. 27 is a diagram for explaining driving in which an image sensor of a camera device according to a first embodiment of the present invention is shifted along the y-axis.

When a current in a first direction is applied to the second-second coil 442 of a camera device 10 according to a first embodiment of the present invention, the second-second coil 442 can move in one direction (refer to a in FIG. 26) of the first direction (x-axis direction) perpendicular to the optical axis direction through electromagnetic interaction with driving magnet 410. At this time, the second-second coil 442 can move the image sensor 330 in one of the first direction perpendicular to the optical axis direction. Conversely, when a current in a second direction opposite to the first direction is applied to the second-second coil 442, the second-second coil 442 can move in another direction of the first direction (x-axis direction) perpendicular to the optical axis direction through electromagnetic interaction with driving magnet 410. At this time, the second-second coil 442 can move the image sensor 330 in another direction of the first direction perpendicular to the optical axis direction.

FIG. 28 is a diagram for explaining driving in which an image sensor of a camera device according to a first embodiment of the present invention rolls about the z-axis.

When a current in a first direction is applied to the second-first coil 441 and the second-second coil 442 of a camera device 10 according to a second embodiment of the present invention, the second-first coil 441 and the second-second coil 442 can rotate in one direction about an optical axis through electromagnetic interaction with the driving magnet 410 (refer to c in FIG. 28). At this time, the second-first coil 441 and the second-second coil 442 can rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 can rotate in other directions about an optical axis through electromagnetic interaction with the drive magnet 410. At this time, the second-first coil 441 and the second-second coil 442 can rotate the image sensor 330 in the other direction about the optical axis. At this time, the other direction may be a clockwise direction.

Hereinafter, an optical device according to a first embodiment of the present invention will be described with reference to the drawings.

Figure 29:
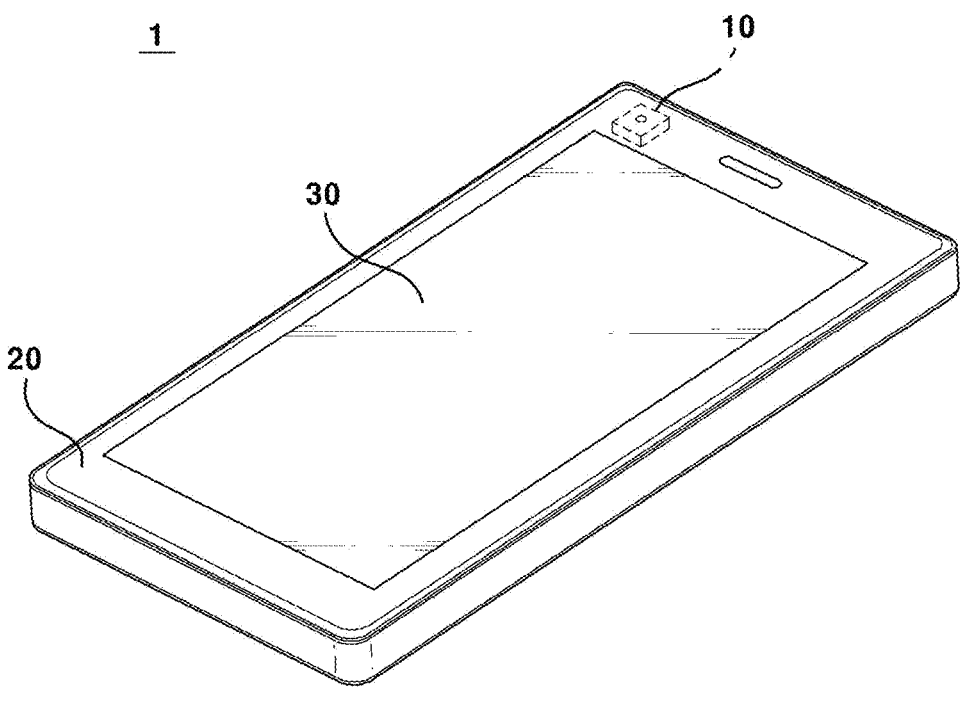
FIG. 29 is a perspective view of an optical device according to a first embodiment of the present invention.
Figure 30:
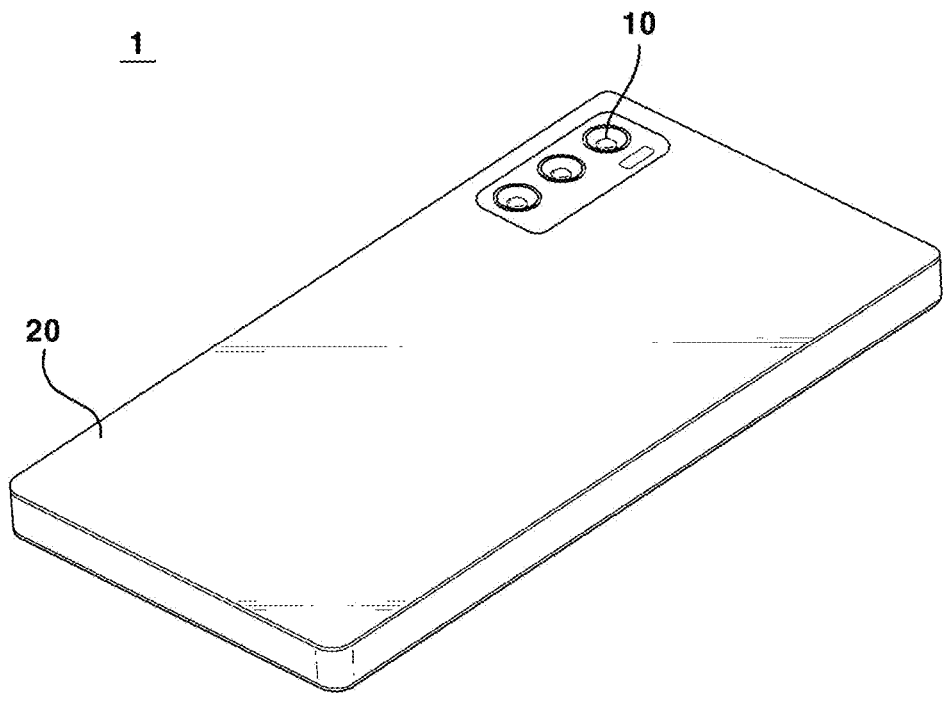
FIG. 30 is a perspective view of an optical device according to a first embodiment viewed from a direction different from that of FIG. 29.

FIG. 29 is a perspective view of an optical device according to a first embodiment of the present invention; FIG. 30 is a perspective view of an optical device according to a first embodiment viewed from a direction different from that of FIG. 29.

The optical device 1 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical device 1 may comprise any device for photographing images or photos.

The optical device 1 may comprise a main body 20. The optical device 1 may comprise a camera device 10. The camera device 10 may be disposed on the main body 20. The camera device 10 can photograph a subject. The optical device 1 may comprise a display 30. The display 30 may be disposed in the main body 20. The display 30 can output any one or more of images and images photographed by the camera device 10. The display 30 may be disposed on a first surface of the main body 20. The camera device 10 may be disposed on at least one of a first surface of the main body 20 and a second surface opposite to the first surface.

Hereinafter, a camera device according to a second embodiment of the present invention will be described with reference to the drawings.

Figure 31:
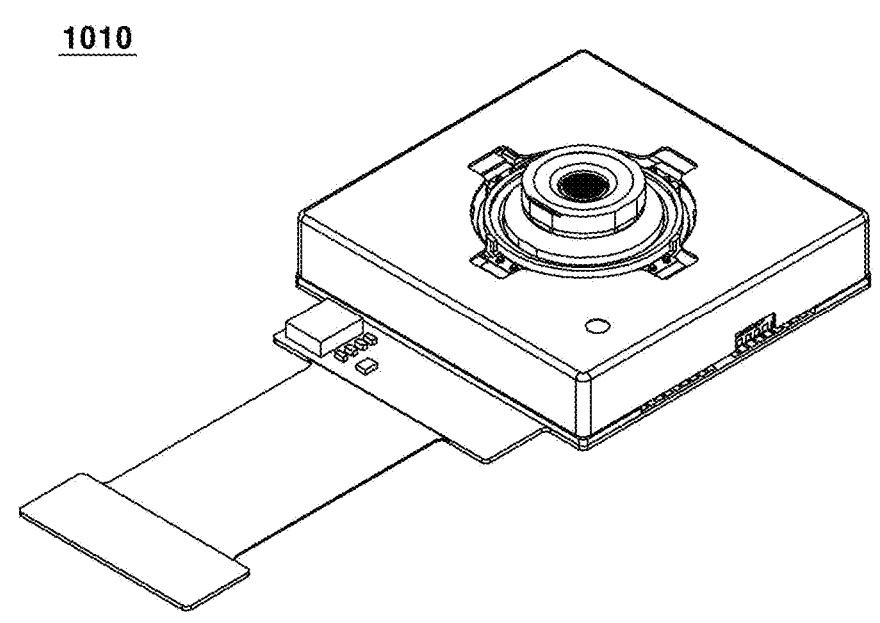
FIG. 31 is a perspective view of a camera device according to a second embodiment of the present invention.
Figure 32:
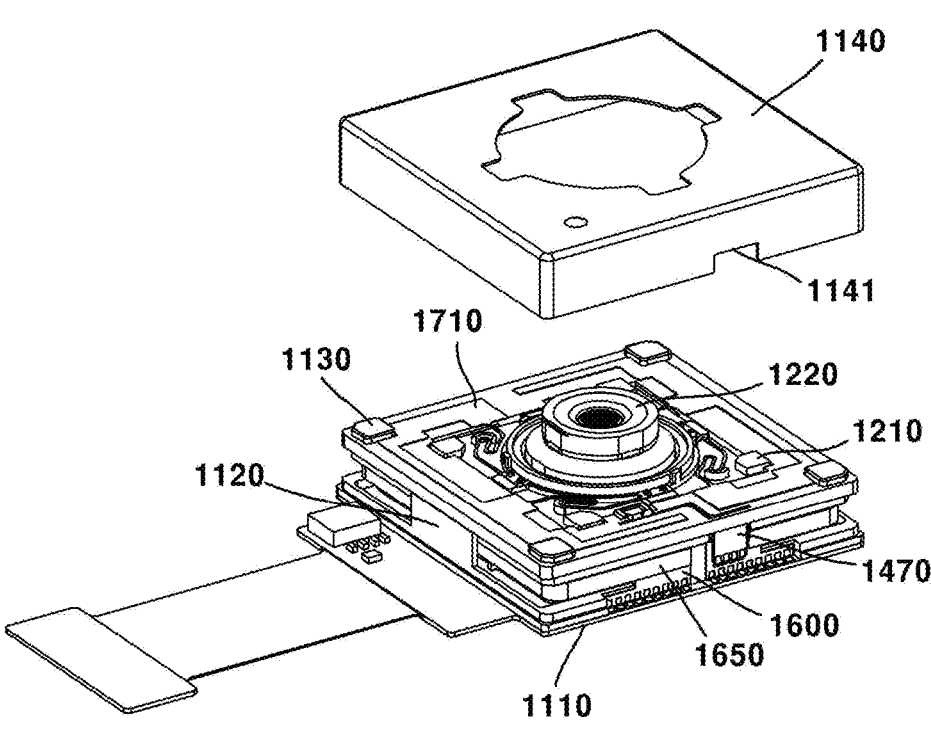
FIG. 32 is an exploded perspective view of a state in which a cover member is separated from a camera device according to a second embodiment of the present invention.
Figure 33:
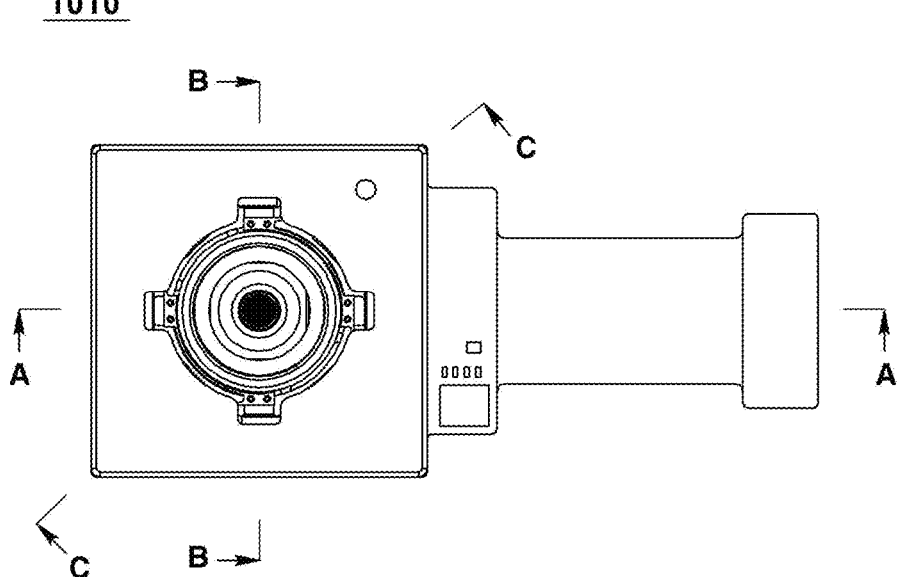
FIG. 33 is a plan view of a camera device according to a second embodiment of the present invention.
Figure 34:
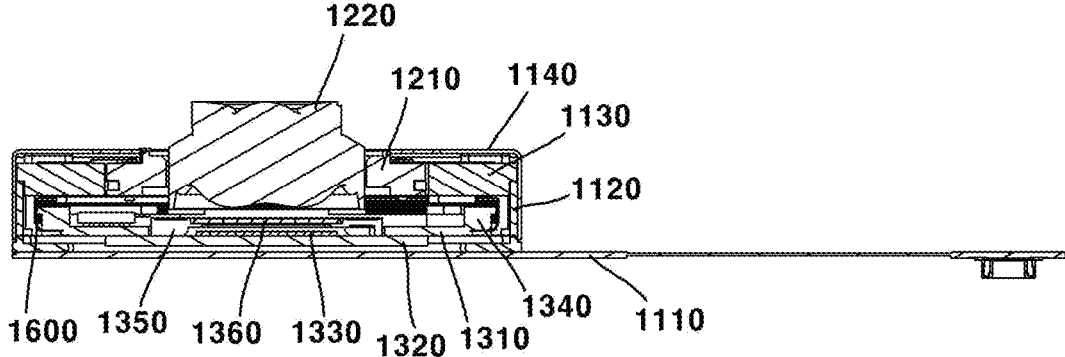
FIG. 34 is a cross-sectional view viewed from A-A in FIG. 33.
Figure 35:
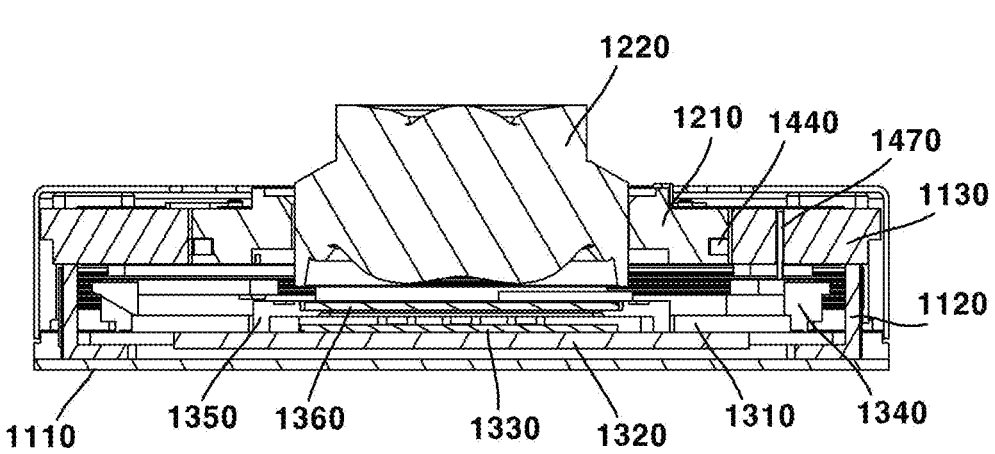
FIG. 35 is a cross-sectional view viewed from B-B in FIG. 33.
Figure 36:
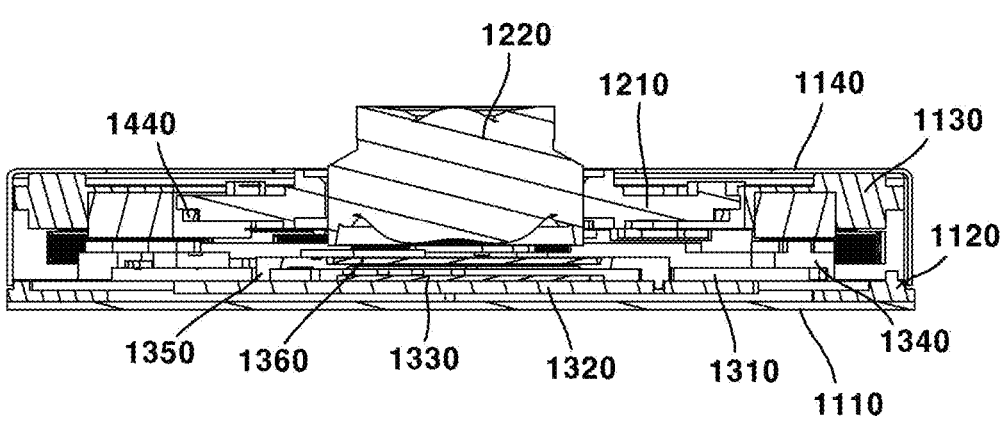
FIG. 36 is a cross-sectional view viewed from C-C in FIG. 33.
Figure 37:
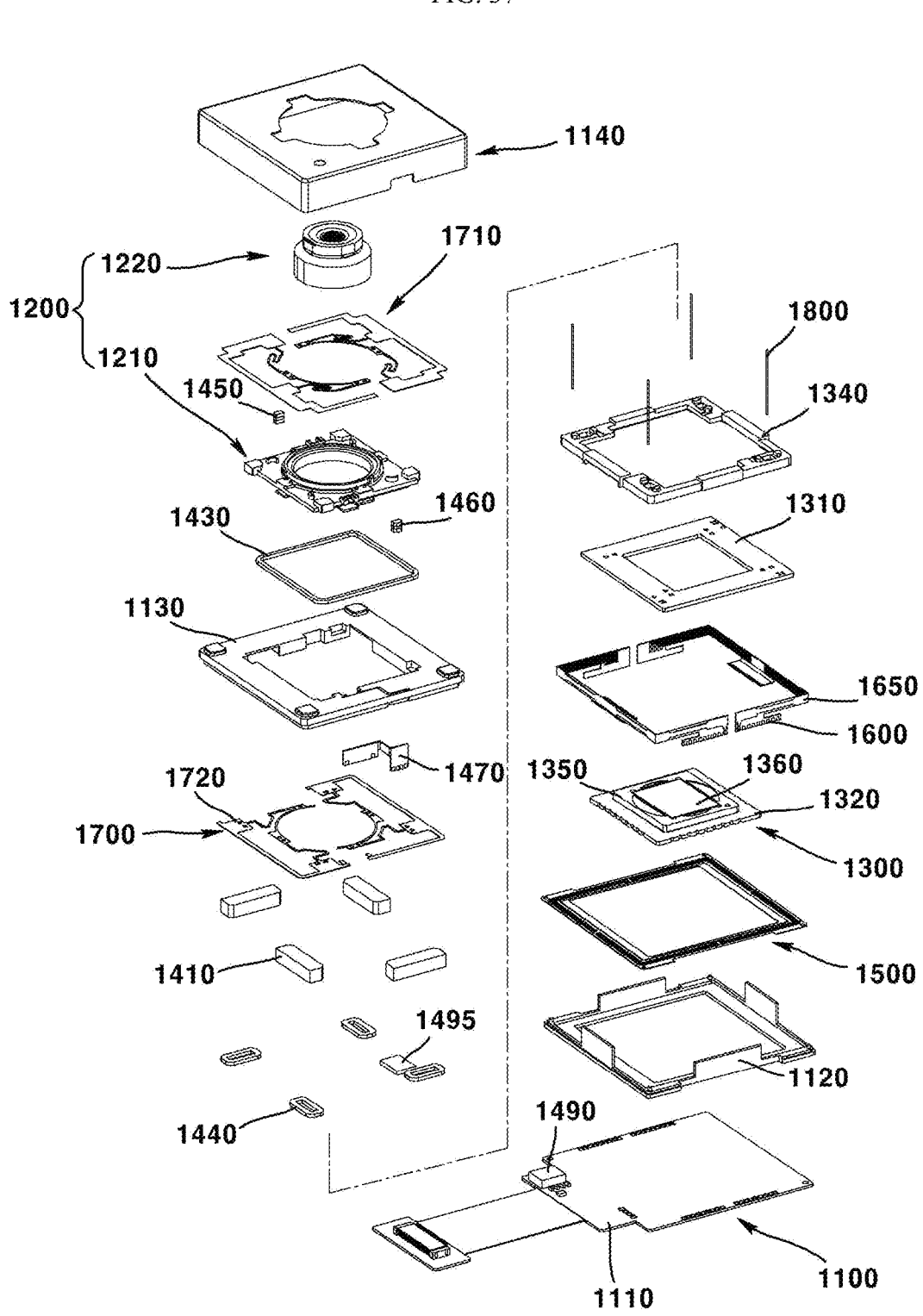
FIG. 37 is an exploded perspective view of a camera device according to a second embodiment of the present invention.
Figure 38:
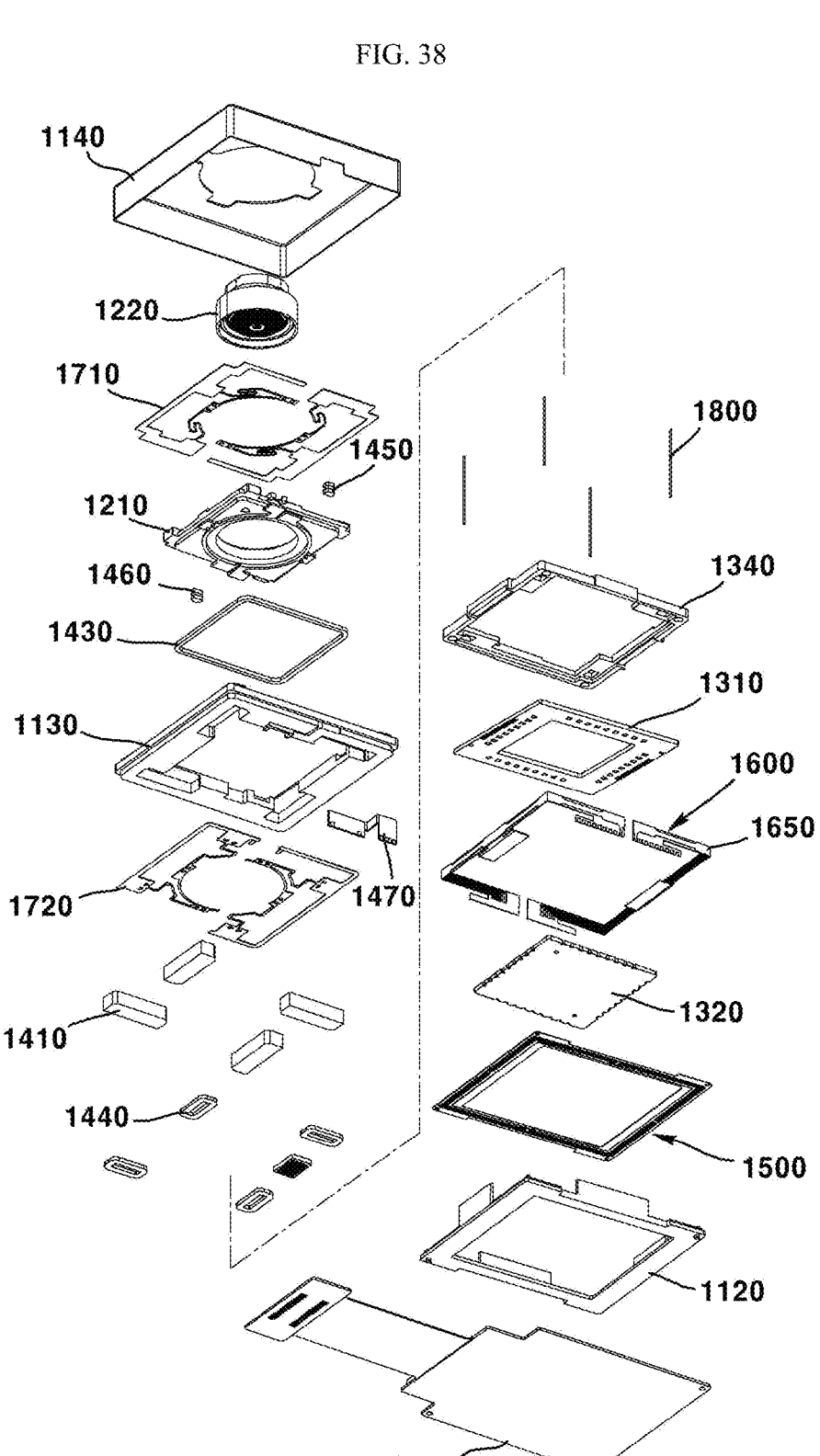
FIG. 38 is an exploded perspective view of a camera device according to a second embodiment of the present invention viewed from a direction different from that of FIG. 37.
Figure 39:
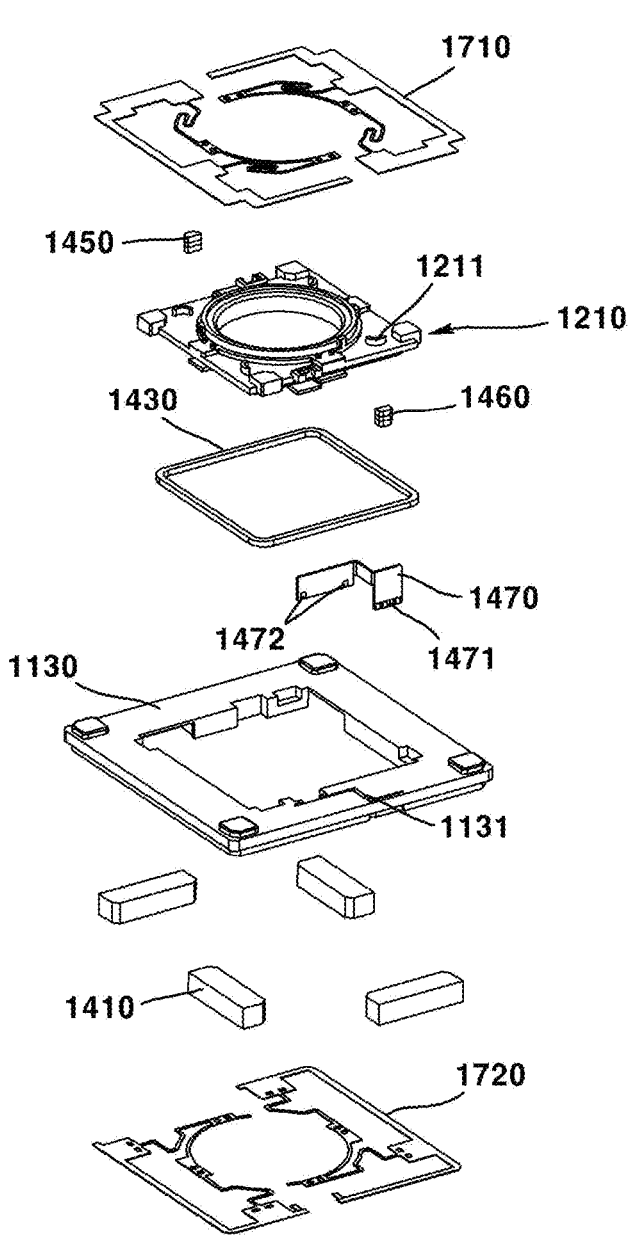
FIG. 39 is an exploded perspective view of a first moving part and related components of a camera device according to a second embodiment of the present invention.
Figure 40:
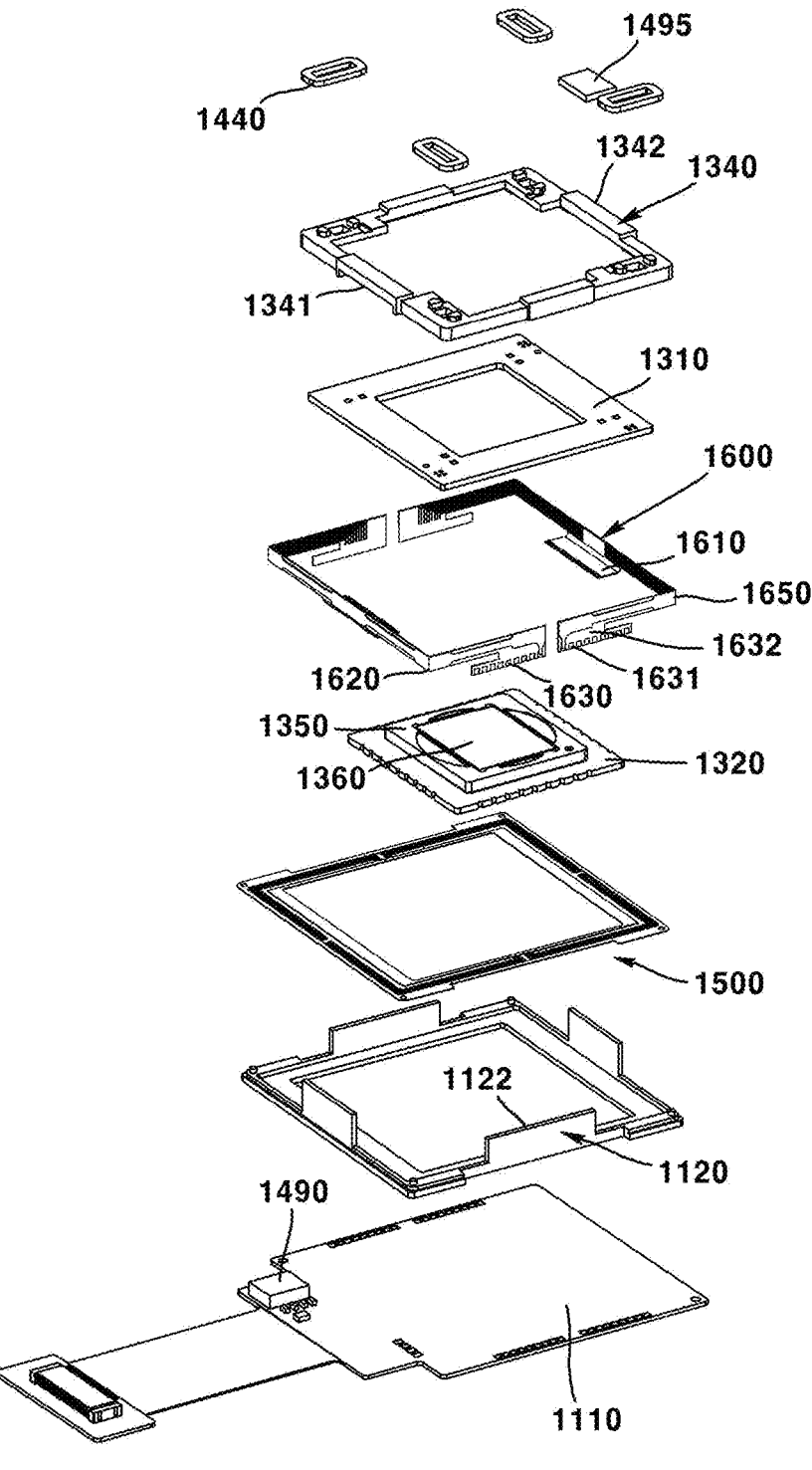
FIG. 40 is an exploded perspective view of a second moving part and related components of a camera device according to a second embodiment of the present invention.
Figure 41:
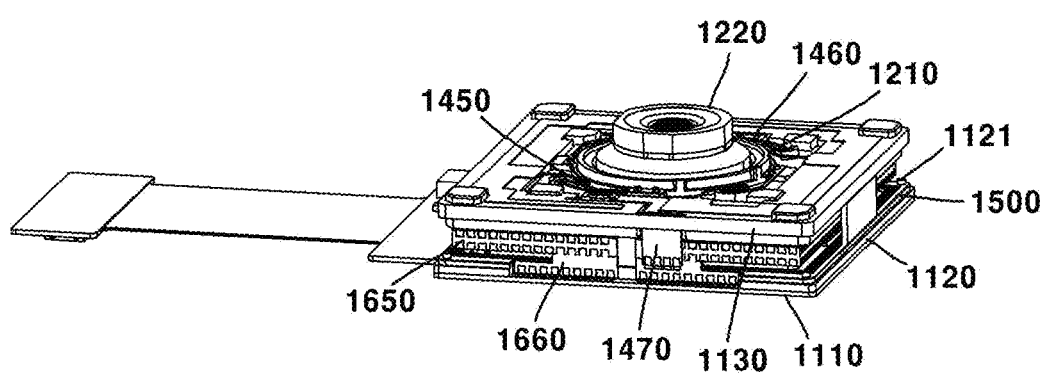
FIG. 41 is a perspective view of a state in which a cover member is omitted in a camera device according to a second embodiment of the present invention.
Figure 42:
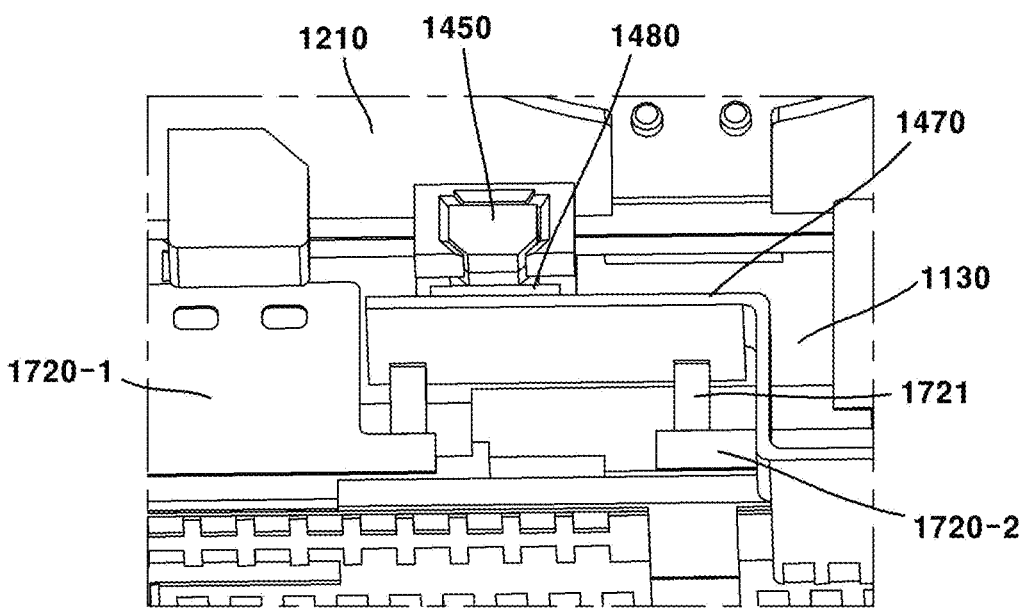
FIG. 42 is a perspective view illustrating a sensing structure and an energizing structure for AF feedback control of a camera device according to a second embodiment of the present invention.
Figure 43:
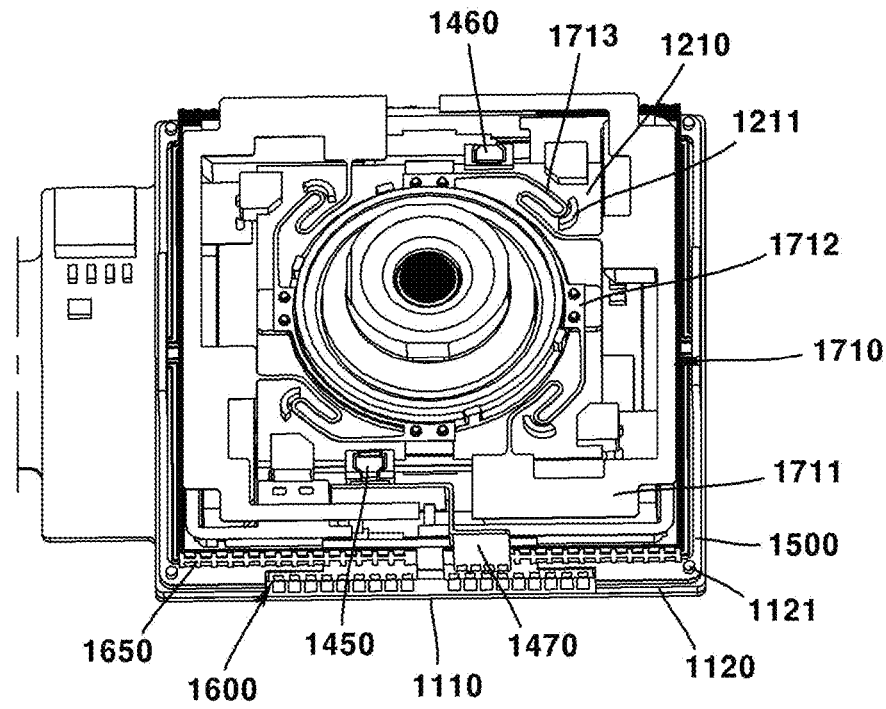
FIG. 43 is a perspective view of some components of a camera device according to a second embodiment of the present invention.
Figure 44:
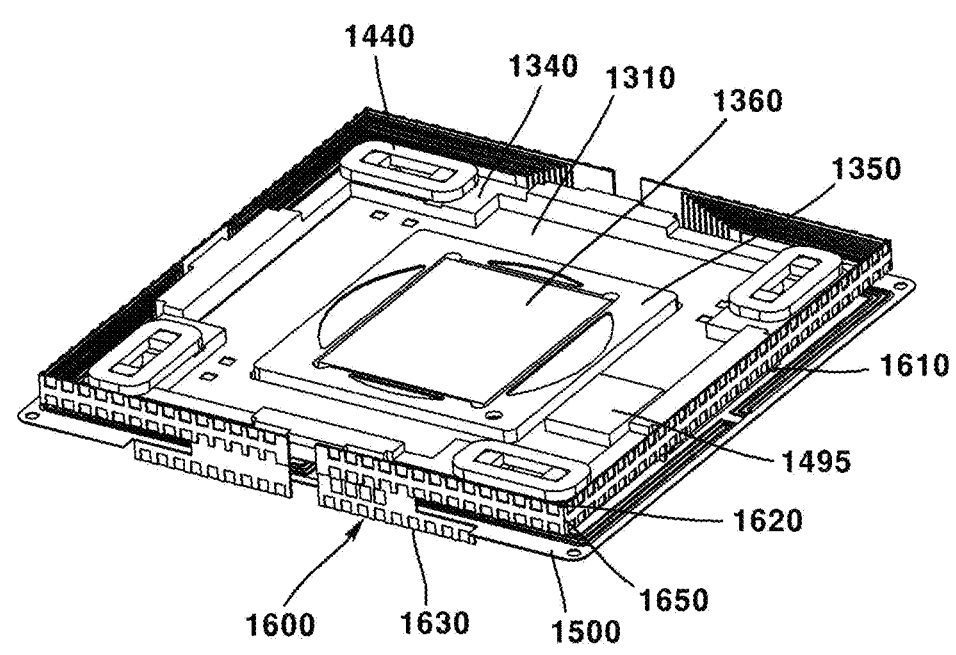
FIG. 44 is a perspective view illustrating a second moving part, a connecting substrate, and an elastic member of a camera device according to a second embodiment of the present invention.
Figure 45:
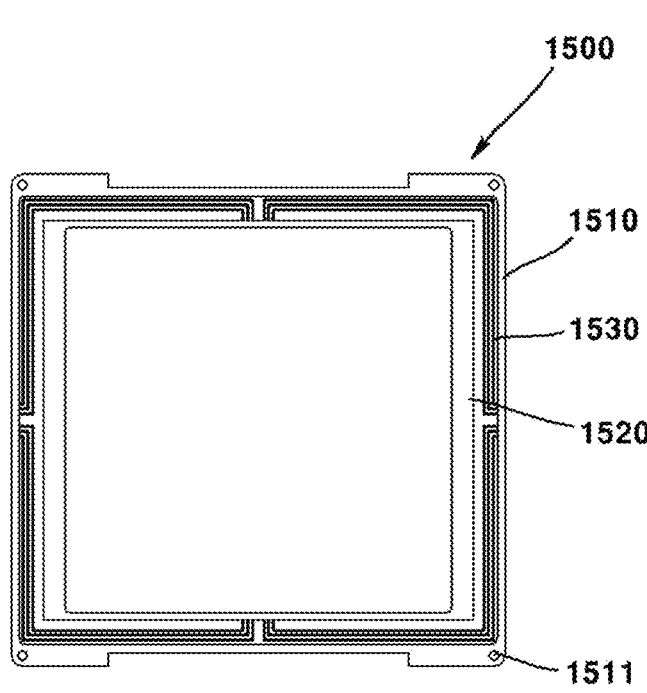
FIG. 45 is a perspective view illustrating an elastic member of a camera device according to a second embodiment of the present invention.
Figure 46:
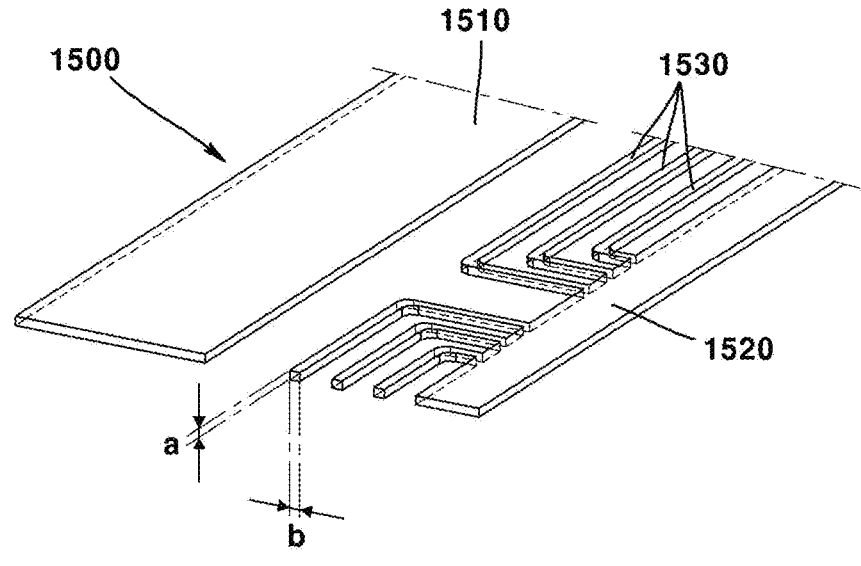
FIG. 46 is a cross-sectional perspective view illustrating a portion of an elastic member of a camera device according to a second embodiment of the present invention.
Figure 47:
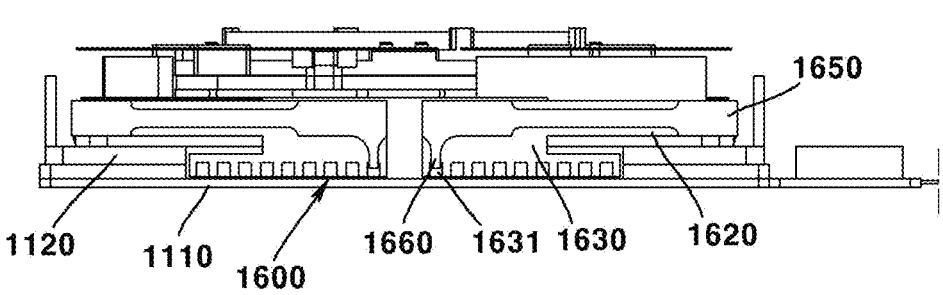
FIG. 47 is a side view of a state in which a cover member is omitted in a camera device according to a second embodiment of the present invention.
Figure 48:
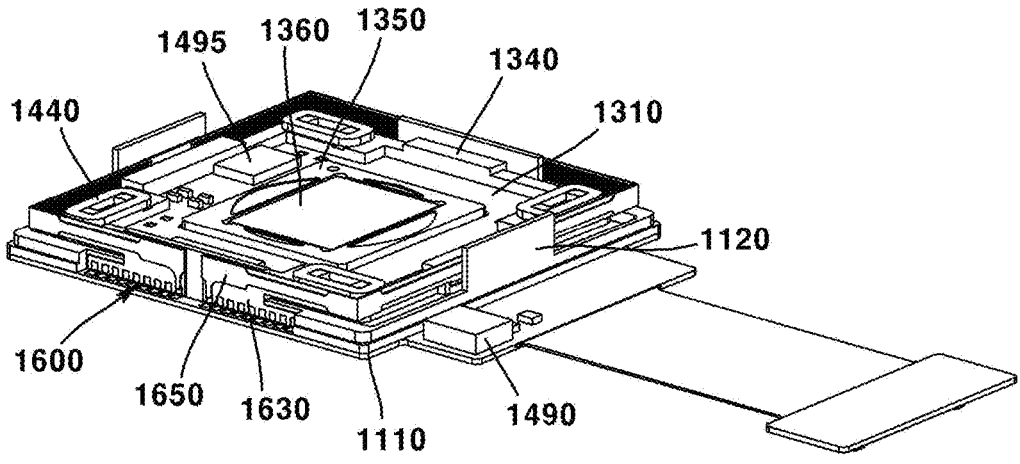
FIG. 48 is a perspective view illustrating a second moving part, a fixed part, and a connecting substrate of a camera device according to a second embodiment of the present invention.
Figure 51:
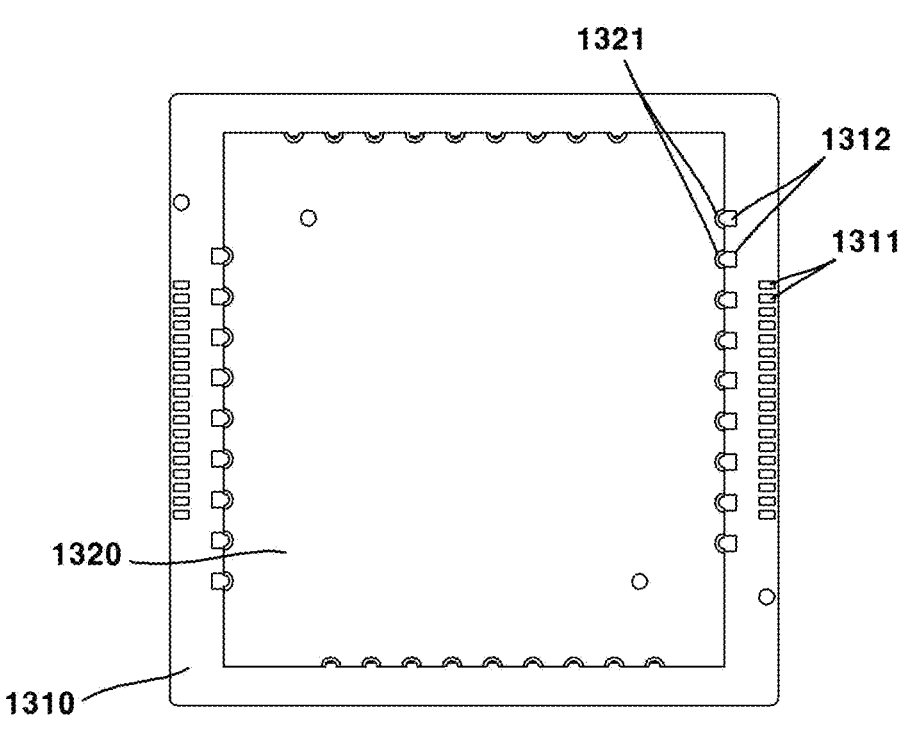
FIG. 51 is a bottom view of a second substrate and a sensor substrate of a camera device according to a second embodiment of the present invention.
Figure 52:
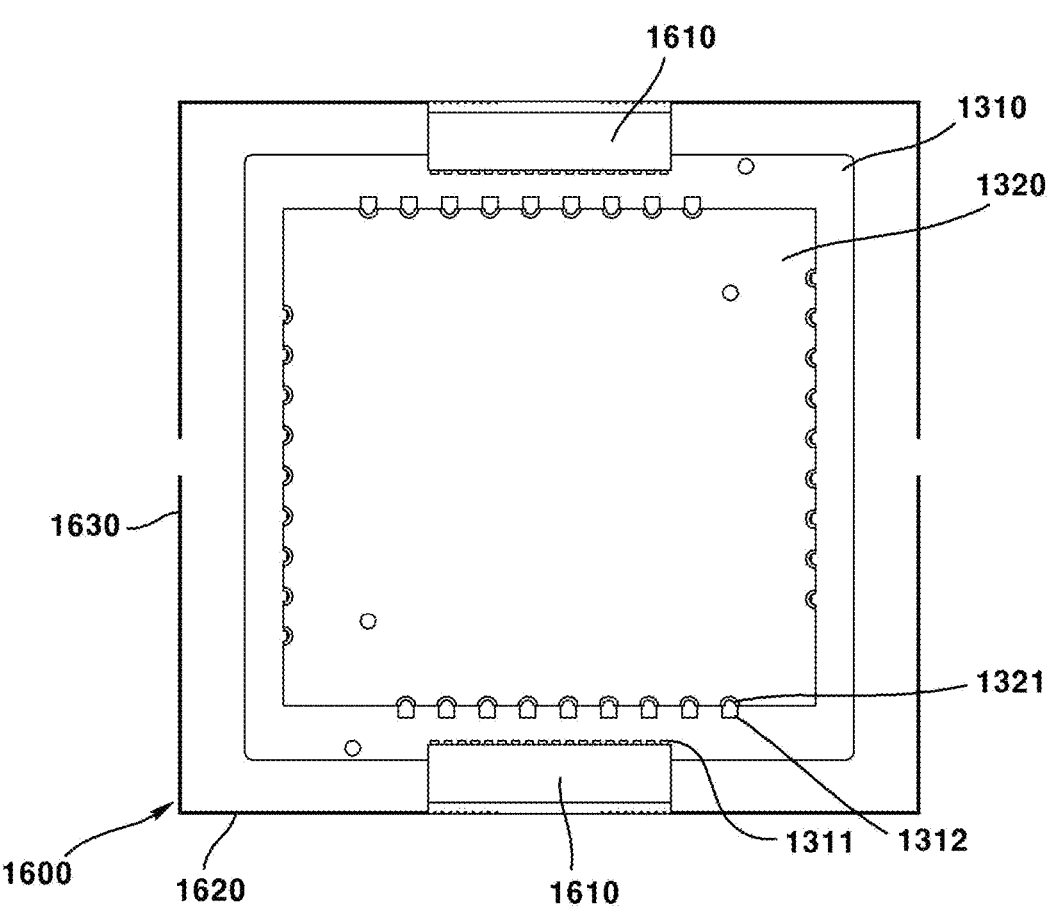
FIG. 52 is a bottom view illustrating a coupled state of a connecting substrate, a second substrate, and a sensor substrate of a camera device according to a second embodiment of the present invention.
Figure 53:
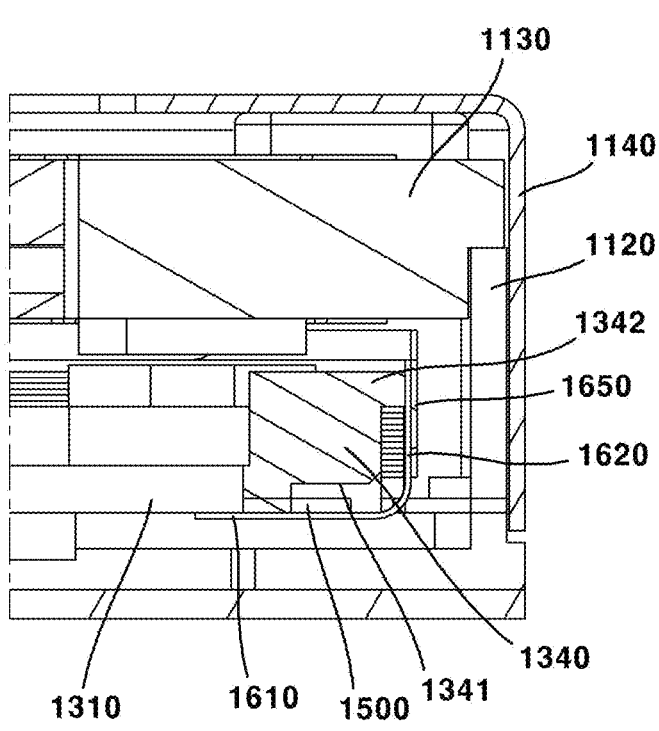
FIG. 53 is a cross-sectional view illustrating a coupling state between a connecting substrate and a holder of a camera device according to a second embodiment of the present invention.
Figure 56:
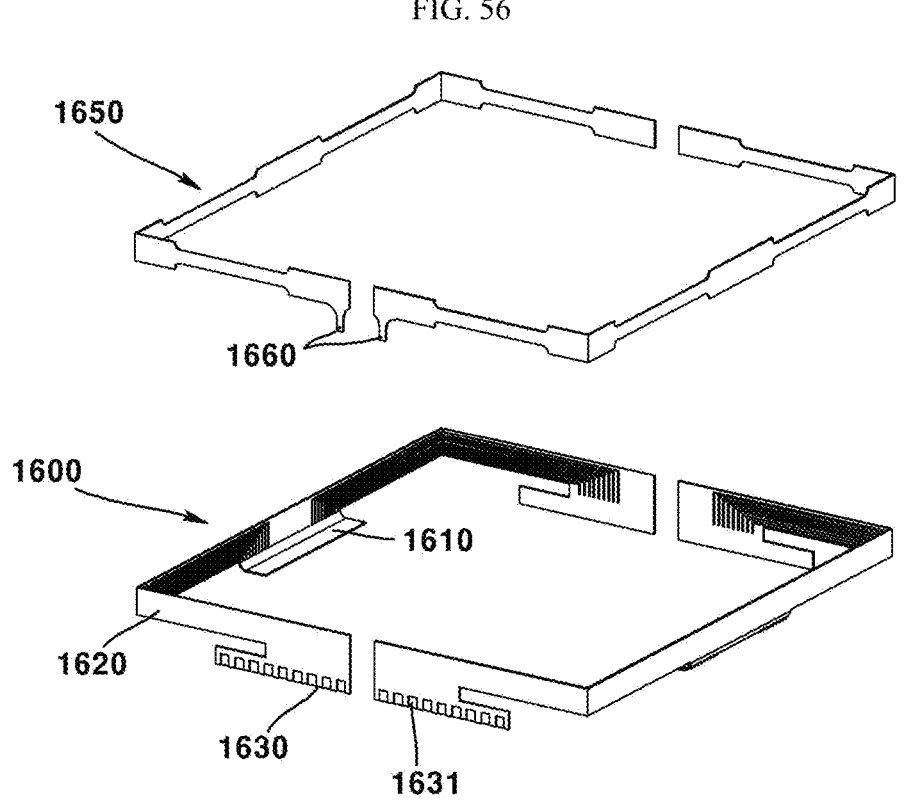
FIG. 56 is an exploded perspective view illustrating a connecting substrate and a metal plate of a camera device according to a second embodiment of the present invention, separated.
Figure 59:
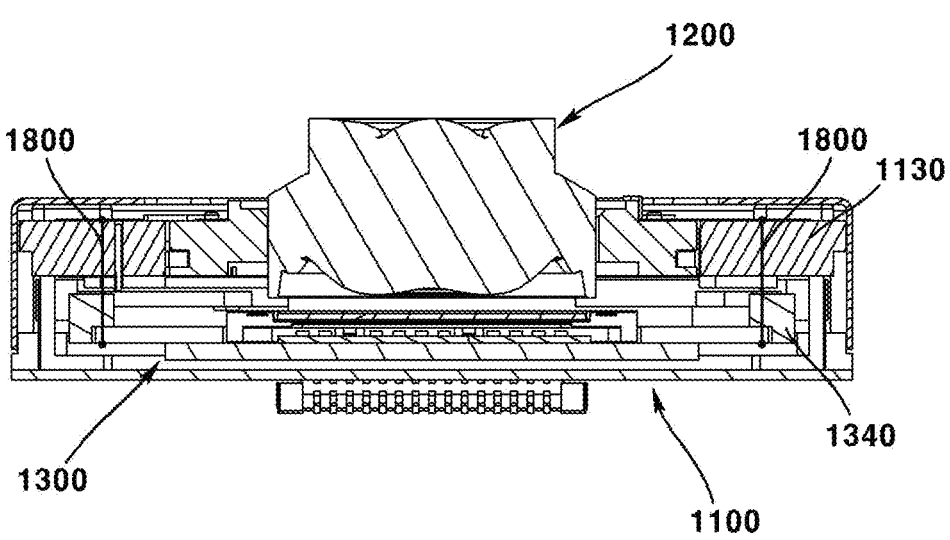
FIG. 59 is a cross-sectional view of a camera device according to a second embodiment of the present invention.

FIG. 31 is a perspective view of a camera device according to a second embodiment of the present invention; FIG. 32 is an exploded perspective view of a state in which a cover member is separated from a camera device according to a second embodiment of the present invention; FIG. 33 is a plan view of a camera device according to a second embodiment of the present invention; FIG. 34 is a cross-sectional view viewed from A-A in FIG. 33; FIG. 35 is a cross-sectional view viewed from B-B in FIG. 33; FIG. 36 is a cross-sectional view viewed from C-C in FIG. 33; FIG. 37 is an exploded perspective view of a camera device according to a second embodiment of the present invention; FIG. 38 is an exploded perspective view of a camera device according to a second embodiment of the present invention viewed from a direction different from that of FIG. 37; FIG. 39 is an exploded perspective view of a first moving part and related components of a camera device according to a second embodiment of the present invention; FIG. 40 is an exploded perspective view of a second moving part and related components of a camera device according to a second embodiment of the present invention; FIG. 41 is a perspective view of a state in which a cover member is omitted in a camera device according to a second embodiment of the present invention; FIG. 42 is a perspective view illustrating a sensing structure and an energizing structure for AF feedback control of a camera device according to a second embodiment of the present invention; FIG. 43 is a perspective view of some components of a camera device according to a second embodiment of the present invention; FIG. 44 is a perspective view illustrating a second moving part, a connecting substrate, and an elastic member of a camera device according to a second embodiment of the present invention; FIG. 45 is a perspective view illustrating an elastic member of a camera device according to a second embodiment of the present invention; FIG. 46 is a cross-sectional perspective view illustrating a portion of an elastic member of a camera device according to a second embodiment of the present invention; FIG. 47 is a side view of a state in which a cover member is omitted in a camera device according to a second embodiment of the present invention; FIG. 48 is a perspective view illustrating a second moving part, a fixed part, and a connecting substrate of a camera device according to a second embodiment of the present invention; FIG. 49 is a perspective view illustrating a part of a second moving part and a connecting substrate of a camera device according to a second embodiment of the present invention; FIGS. 50(a) and 50(b) are perspective views of a connecting substrate and a second substrate of a camera device according to a second embodiment of the present invention; FIG. 51 is a bottom view of a second substrate and a sensor substrate of a camera device according to a second embodiment of the present invention; FIG. 52 is a bottom view illustrating a coupled state of a connecting substrate, a second substrate, and a sensor substrate of a camera device according to a second embodiment of the present invention; FIG. 53 is a cross-sectional view illustrating a coupling state between a connecting substrate and a holder of a camera device according to a second embodiment of the present invention; FIG. 54 is a cross-sectional view illustrating a coupling state between a connecting substrate and a base of a camera device according to a second embodiment of the present invention; FIG. 55(*a*) is a perspective view of a connecting substrate and a metal plate of a camera device according to a second embodiment of the present invention, and FIG. 55(*b*) is a cross-sectional view of a connecting substrate and a metal plate of a camera device according to a second embodiment of the present invention; FIG. 56 is an exploded perspective view illustrating a connecting substrate and a metal plate of a camera device according to a second embodiment of the present invention, separated; FIGS. 57(*a*)-57(*d*) are views illustrating various embodiments of a metal plate of a camera device according to a second embodiment of the present invention; FIG. 58 is a perspective view of a magnet and a coil of a camera device according to a second embodiment of the present invention; and FIG. 59 is a cross-sectional view of a camera device according to a second embodiment of the present invention. Wires of the camera device according to a second embodiment of the present invention may be omitted in some drawings.

The camera device 1010 may photograph one or more of images and videos. The camera device 1010 may be a camera. The camera device 1010 may be a camera module. The camera device 1010 may be a camera assembly. The camera device 1010 may be a camera unit. The camera device 1010 may comprise a lens driving device. The camera device 1010 may comprise a sensor driving device. The camera device 1010 may comprise a voice coil motor (VCM). The camera device 1010 may comprise an auto focus assembly. The camera device 1010 may comprise a hand shake correction assembly. The camera device 1010 may comprise an auto focus device. The camera device 1010 may comprise a hand shake correction device. The camera device 1010 may comprise an actuator. The camera device 1010 may comprise a lens driving actuator. The camera device 1010 may comprise a sensor driving actuator. The camera device 1010 may comprise an auto focus actuator. The camera device 1010 may comprise a hand shake correction actuator.

The camera device 1010 may comprise a fixed part 1100. The fixed part 1100 may be a relatively fixed portion when the moving parts 1200 and 300 move. The fixed part 1100 may be a relatively fixed portion when at least one of the first moving part 1200 and the second moving part 1300 moves. The fixed part 1100 may accommodate the first moving part 1200 and the second moving part 1300. The fixed part 1100 may be disposed outside the first moving part 1200 and the second moving part 1300.

Throughout the specification, the first substrate 1110 has been described as one component of the fixed part 1100, but the first substrate 1110 may be understood as a component separate from the fixed part 1100. The fixed part 1100 may be disposed in the first substrate 1110. The fixed part 1100 may be disposed on the first substrate 1110. The fixed part 1100 may be disposed above the first substrate 1110.

The camera device 1010 may comprise a first substrate 1110. The fixed part 1100 may comprise the first substrate 1110. The first substrate 1110 may be a main substrate. The first substrate 1110 may be a substrate. The first substrate 1110 may be a printed circuit board (PCB). The first substrate 1110 may be connected to power of the optical device 1001. The first substrate 1110 may comprise a connector connected to power of the optical device 1001.

The camera device 1010 may comprise a base 1120. The fixed part 1100 may comprise a base 1120. The base 1120 may be disposed in the first substrate 1110. The base 1120 may be disposed on the first substrate 1110. The base 1120 may be disposed above the first substrate 1110. The base

1120 may be fixed to the first substrate 1110. The base 1120 may be coupled to the first substrate 1110. The base 1120 may be attached to the first substrate 1110 by an adhesive. The base 1120 may be disposed between the first substrate 1110 and the housing 1130.

The base 1120 may comprise a protrusion 1121. The protrusion 1121 may be formed on an upper surface of the base 1120. The protrusion 1121 may be protruded upward from the base 1120. The protrusion 1121 may be coupled with the elastic member 1500. The elastic member 1500 may comprise a hole into which the protrusion 1121 of the base 1120 is inserted. The protrusion 1121 of the base 1120 may be coupled to the hole of the elastic member 1500. The protrusion 1121 may comprise a plurality of protrusions. The protrusion 1121 may comprise four protrusions. The four protrusions 1121 may be disposed in four corner regions of an upper surface of the base 1120.

The base 1120 may comprise a protruded portion 1122. The protruded portion 1122 may be protruded from an upper surface of the base 1120. The protruded portion 1122 may be formed on an upper surface of the base 1120. The protruded portion 1122 may be protruded above the upper surface of the base 1120. At least a portion of the second coupling portion 1630 of the connecting substrate 1600 may be attached to an outer side surface of the protruded portion 1122 of the base 1120 with an adhesive. A portion of the connecting substrate 1600 may be attached to an outer side surface of the protruded portion 1122 of the base 1120 with adhesive. The connecting substrate 1600 may be attached to the protruded portion 1122 of the base 1120 with an adhesive. The connecting substrate 1600 may be disposed on the protruded portion 1122 of the base 1120. The connecting substrate 1600 may be fixed to the protruded portion 1122 of the base 1120. The connecting substrate 1600 may be coupled to the protruded portion 1122 of the base 1120. The connecting substrate 1600 may comprise a portion being attached to the protruded portion 1122 of the base 1120 with an adhesive. The connecting substrate 1600 may be fixed to the base 1120. The second coupling portion 1630 of the connecting substrate 1600 may be fixed to the base 1120.

The camera device 1010 may comprise a housing 1130. The fixed part 1100 may comprise a housing 1130. The housing 1130 may be disposed in base 1120. The housing 1130 may be disposed on base 1120. The housing 1130 may be disposed above the base 1120. The housing 1130 may be fixed to the base 1120. The housing 1130 may be coupled to base 1120. The housing 1130 may be attached to the base 1120 by an adhesive. The housing 1130 may be disposed on the first substrate 1110. The housing 1130 may be disposed above the first substrate 1110. The housing 1130 may be formed as a separate member from the base 1120.

The camera device 1010 may comprise a cover member 1140. The fixed part 1100 may comprise a cover member 1140. The cover member 1140 may be coupled to the base 1120. The cover member 1140 may be coupled to the housing 1130. The cover member 1140 may be coupled to the first substrate 1110. The cover member 1140 may be fixed to the base 1120. The cover member 1140 may be fixed to the housing 1130. The cover member 1140 may be fixed to the first substrate 1110. The cover member 1140 may cover at least a portion of the base 1120. The cover member 1140 may cover at least a portion of the housing 1130.

The cover member 1140 may be a 'cover can' or a 'shield can'. The cover member 1140 may be formed of a metal material. The cover member 1140 may block electromagnetic interference (EMI). The cover member 1140 may be electrically connected to the first substrate 1110. The cover member 1140 may be grounded to the first substrate 1110.

The cover member 1140 may comprise an upper plate. The cover member 1140 may comprise a hole being formed in an upper plate. The hole may be formed at a position corresponding to the lens 1220. The cover member 1140 may comprise a side plate. The side plate may comprise a plurality of side plates. The side plate may comprise four side plates. The side plate may comprise first to fourth side plates. The side plates may comprise first and second side plates being disposed opposite to each other, and third and fourth side plates being disposed opposite to each other. The cover member 1140 may comprise a plurality of corners between pluralities of side plates.

Throughout the specification, the cover member 1140 has been described as one component of the fixed part 1100, but the cover member 1140 may be understood as a separate component from the fixed part 1100. The cover member 1140 may be coupled with the fixed part 1100. The cover member 1140 may cover the first moving part 2100.

The camera device 1010 may comprise a first moving part 1200. The first moving part 1200 may move against the fixed part 1100. The first moving part 1200 may move in an optical axis direction with respect to the fixed part 1100. The first moving part 1200 may be disposed inside the fixed part 1100. The first moving part 1200 may be movably disposed inside the fixed part 1100. The first moving part 1200 may be disposed to be movable in an optical axis direction inside the fixed part 1100. An auto focus (AF) function may be performed by moving the first moving part 1200 in an optical axis direction against the fixed part 1100. The first moving part 1200 may be disposed on the second moving part 1300.

The camera device 1010 may comprise a bobbin 1210. The first moving part 1200 may comprise a bobbin 1210. The bobbin 1210 may be disposed on the first substrate 1110. The bobbin 1210 may be disposed above the first substrate 1110. The bobbin 1210 may be disposed spaced apart from the first substrate 1110. The bobbin 1210 may be disposed inside the housing 1130. The bobbin 1210 may be disposed at an inner side of the housing 1130. At least a portion of the bobbin 1210 may be accommodated in the housing 1130. The bobbin 1210 may be movably disposed in the housing 1130. The bobbin 1210 may be movably disposed in the housing 1130 in an optical axis direction. The bobbin 1210 may be coupled to the lens 1220. The bobbin 1210 may comprise a hollow or hole. The lens 1220 may be disposed in the hollow or hole of the bobbin 1210. An outer circumferential surface of the lens 1220 may be coupled to an inner circumferential surface of the bobbin 1210.

The bobbin 1210 may comprise a protrusion 1211. The protrusion 1211 may be protruded from an upper surface of the bobbin 1210. The protrusion 1211 may be a boss. The protrusion 1211 may be formed as a rib. The protrusion 1211 may be disposed adjacent to the connecting portion 1713 of the upper elastic member 1710. The protrusion 1211 may comprise a curved surface. The protrusion 1211 may comprise a curved surface having a curvature corresponding to the curvature of an adjacent portion of the connecting portion 1713 of the upper elastic member 1710. A damper may be disposed in the protrusion 1211. The damper may connect the bobbin 1210 and the upper elastic member 1710. The damper may be viscous. The damper may be a viscous epoxy. The damper may connect the bobbin 1210 and the connecting portion 1713 of the upper elastic member 1710. The damper may connect the protrusion 1211 of the bobbin 1210 and the upper elastic member 1710. The damper may connect the protrusion 1211 of the bobbin 1210 and the connecting portion 1713 of the upper elastic member 1710. The protrusion 1211 may comprise a plurality of protrusions. The protrusion 1211 may comprise four protrusions.

The camera device 1010 may comprise a lens 1220. The first moving part 1200 may comprise a lens 1220. The lens 1220 may be coupled to bobbin 1210. The lens 1220 may be fixed to the bobbin 1210. The lens 1220 may move integrally with the bobbin 1210. The lens 1220 may be screw-coupled to the bobbin 1210. The lens 1220 may be attached to the bobbin 1210 by an adhesive. The lens 1220 may be disposed at a position corresponding to the image sensor 1330. An optical axis of the lens 1220 may coincide with an optical axis of the image sensor 1330. The optical axis may be a z-axis. The lens 1220 may comprise a plurality of lenses. The lens 1220 may comprise 5 or 6 lenses.

The camera device 1010 may comprise a lens module. The lens module may be coupled to the bobbin 1210. The lens module may comprise a barrel and one or more lenses 1220 being disposed inside the barrel.

The camera device 1010 may comprise a second moving part 1300. The second moving part 1300 may move against the fixed part 1100. The second moving part 1300 may move in a direction perpendicular to the optical axis direction with respect to the fixed part 1100. The second moving part 1300 may be disposed inside the fixed part 1100. The second moving part 1300 may be movably disposed inside the fixed part 1100. The second moving part 1300 may be disposed inside the fixed part 1100 to be movable in a direction perpendicular to the optical axis direction. A hand shake correction function (OIS) may be performed by moving the second moving part 1300 in a direction perpendicular to the optical axis direction against the fixed part 1100. The second moving part 1300 may be disposed between the first moving part 1200 and the first substrate 1110.

The camera device 1010 may comprise a second substrate 1310. The second moving part 1300 may comprise a second substrate 1310. The second substrate 1310 may be a substrate. The second substrate 1310 may be a printed circuit board (PCB). The second substrate 1310 may be disposed between the first moving part 1200 and the first substrate 1110. The second substrate 1310 may be disposed between the bobbin 1210 and the first substrate 1110. The second substrate 1310 may be disposed between the lens 1220 and the first substrate 1110. The second substrate 1310 may be spaced apart from the fixed part 1100. The second substrate 1310 may be spaced apart from the fixed part 1100 in an optical axis direction and a direction perpendicular to the optical axis direction. The second substrate 1310 may move in a direction perpendicular to the optical axis direction. The second substrate 1310 may be electrically connected to the image sensor 1330. The second substrate 1310 may move integrally with the image sensor 1330. The second substrate 1310 may comprise a hole. An image sensor 1330 may be disposed in a hole of the second substrate 1310.

The second substrate 1310 may comprise a first terminal 1311. The first terminal 1311 may be disposed on a lower surface of the second substrate 1310. The first terminal 1311 may be formed on a lower surface of the second substrate 1310. The lower surface of the second substrate 1310 may comprise a first region and a second region being disposed opposite to the first region. Eighteen each of the first terminal 1311 of the second substrate 1310 may be disposed in each of the first and second regions. A total of 36 each of the first terminal 1311 of the second substrate 1310 may be formed. Or, 10 each or more of the first terminal 1311 of the second substrate 1310 may be disposed in each of the first region and the second region. More than 15 each of the first terminals 1311 of the second substrate 1310 may be disposed in each of the first region and the second region. There may be 18 each or more of the first terminals 1311 of the second substrate 1310 in each of the first region and the second region. There may be no more than 24 each of the first terminals 1311 of the second substrate 1310 in each of the first region and the second region.

The second substrate 1310 may comprise a second terminal 1312. The second terminal 1312 may be disposed on a lower surface of the second substrate 1310. The second terminal 1312 may be disposed to be spaced apart from the first terminal 1311. The second terminal 1312 may be spaced apart from the first terminal 1311. The second terminal 1312 may be electrically separated from the first terminal 1311. The second terminal 1312 may be coupled to the terminal 1321 of the sensor substrate 1320. The second substrate 1310 may be formed separately from the sensor substrate 1320. The second substrate 1310 may be formed separately from the sensor substrate 1320 and then coupled with the sensor substrate 1320. The terminal 1321 of the sensor substrate 1320 may be soldered to the second terminal 1312 of the second substrate 1310. The lower surface of the second substrate 1310 may comprise third and fourth regions being disposed at an opposite side of each other, and fifth and sixth regions being disposed at an opposite sides of each other. At this time, nine each of the second terminals 1312 of the second substrate 1310 may be disposed in each of the third to sixth regions. A total of 36 each of the second terminals 1312 of the second substrate 1310 may be formed. The number of second terminals 1312 of the second substrate 1310 may be the same as the number of first terminals 1311. Three each or more of the second terminals 1312 of the second substrate 1310 may be disposed in each of the third to sixth regions. Five each or more of the second terminals 1312 of the second substrate 1310 may be disposed in each of the third to sixth regions. Eight each or more of the second terminals 1312 of the second substrate 1310 may be disposed in each of the third to sixth regions. There may be no more than 12 each of the second terminals 1312 of the second substrate 1310 in each of the third to sixth regions.

The first terminal 1311 of the second substrate 1310 may comprise a plurality of first terminals 1311. The second terminal 1312 of the second substrate 1310 may comprise a plurality of second terminals 1312. The gap between the pluralities of first terminals 1311 may be narrower than the gap between the pluralities of second terminals 1312. The gap between the pluralities of first terminals 1311 may be different from the gap between the pluralities of second terminals 1312. In a modified embodiment, the gap between the pluralities of first terminals 1311 may be larger than the gap between the pluralities of second terminals 1312. The area of each of the pluralities of first terminals 1311 may be smaller than the area of each of the pluralities of second terminals 1312. The area of each of the pluralities of first terminals 1311 may be different from the area of each of the pluralities of second terminals 1312. In a modified embodiment, the area of each of the pluralities of first terminals 1311 may be larger than the area of each of the pluralities of second terminals 1312. The number of first terminals 1311 may be equal to the number of second terminals 1312. In a modified embodiment, the number of first terminals 1311 may be different from the number of second terminals 1312.

The camera device 1010 may comprise a sensor substrate 1320. The second moving part 1300 may comprise a sensor substrate 1320. The sensor substrate 1320 may be a substrate. The sensor substrate 1320 may be a printed circuit board (PCB). The sensor substrate 1320 may be coupled to the image sensor 1330. The sensor substrate 1320 may be coupled to the second substrate 1310.

The sensor substrate 1320 may comprise a terminal 1321. The terminal 1321 of the sensor substrate 1320 may be coupled to the terminal 1311 of the second substrate 1310. The sensor substrate 1320 may be coupled to a lower surface of the second substrate 1310. The sensor substrate 1320 may be disposed below the second substrate 1310. The sensor substrate 1320 may be coupled below the second substrate 1310 with the image sensor 1330 in a state being coupled thereto.

The camera device 1010 may comprise an image sensor 1330. The second moving part 1300 may comprise an image sensor 1330. The image sensor 1330 may be disposed in the sensor substrate 1320. The image sensor 1330 may be disposed between the sensor substrate 1320 and the sensor base 1350. The image sensor 1330 may be electrically connected to the second substrate 1310. The image sensor 1330 may move integrally with the second substrate 1310.

Light passing through the lens 1220 and the filter 1360 may be incident on the image sensor 1330 to form an image. The image sensor 1330 may be electrically connected to the sensor substrate 1320, the second substrate 1310 and the first substrate 1110. The image sensor 1330 may comprise an effective image region. The image sensor 1330 may convert light irradiated onto the effective image region into an electrical signal. The image sensor 1330 may comprise one or more among a charge coupled device (CCD), a metal oxide semiconductor (MOS), a CPD, and a CID.

The camera device 1010 may comprise a holder 1340. The second moving part 1300 may comprise a holder 1340. The holder 1340 may be formed of an insulating material. The holder 1340 may be disposed in the second substrate 1310. The holder 1340 may be disposed on the second substrate 1310. The holder 1340 may be disposed above the second substrate 1310. The holder 1340 may be fixed to the second substrate 1310. The holder 1340 may be coupled to the second substrate 1310. The holder 1340 may comprise a hollow or hole in which the image sensor 1330 is disposed. A second coil 1440 may be disposed in the holder 1340. The holder 1340 may comprise a protrusion around which the second coil 1440 is wound. The holder 1340 may comprise a hole in which a Hall sensor 1445 is disposed.

The holder 1340 may comprise a groove 1341. The groove 1341 may be formed on a lower surface of the holder 1340. The groove 1341 may be recessed from a lower surface of the holder 1340. The groove 1341 may be recessed from an outer side surface of the holder 1340. A portion of the connecting substrate 1600 may be disposed in the groove 1341 of the holder 1340. The first coupling portion 1610 of the connecting substrate 1600 may be disposed in the groove 1341 of the holder 1340. The portion, where the first coupling portion 1610 of the connecting substrate 1600 and the connecting portion 1620 meet, may be disposed in the groove 1341 of the holder 1340. The groove 1341 of the holder 1340 may be formed so that the bent portion of the connecting substrate 1600 does not interfere with the edge of the holder 1340.

The holder 1340 may comprise a protruded portion 1342. The protruded portion 1342 may be protruded from an upper surface of the holder 1340. The protruded portion 1342 may be formed on an upper surface of the holder 1340. The protruded portion 1342 may be protruded above the upper surface of the holder 1340. A portion of the connecting substrate 1600 may be attached to an outer side surface of the protruded portion 1342 of the holder 1340 with an adhesive. The connecting substrate 1600 may be attached to the protruded portion 1342 of the holder 1340 with an adhesive. The connecting substrate 1600 may be disposed in the protruded portion 1342 of the holder 1340. The connecting substrate 1600 may be fixed to the protruded portion 1342 of the holder 1340. The connecting substrate 1600 may be coupled to the protruded portion 1342 of the holder 1340. The connecting substrate 1600 may comprise a portion being attached to the protruded portion 1342 of the holder 1340 with an adhesive. The connecting substrate 1600 may be fixed to the holder 1340. The connecting portion 1620 of the connecting substrate 1600 may be fixed to the holder 1340.

The camera device 1010 may comprise a sensor base 1350. The second moving part 1300 may comprise a sensor base 1350. The sensor base 1350 may be disposed in the sensor substrate 1320. The sensor base 1350 may comprise a hole being formed at a position corresponding to the image sensor 1330. The sensor base 1350 may comprise a groove in which a filter 1360 is disposed.

The camera device 1010 may comprise a filter 1360. The second moving part 1300 may comprise a filter 1360. The filter 1360 may be disposed between the lens 1220 and the image sensor 1330. The filter 1360 may be disposed in sensor base 1350. The filter 1360 may block light of a specific frequency band from entering the image sensor 1330 from light passing through the lens 1220. The filter 1360 may comprise an infrared cut filter. The filter 1360 may block infrared rays from being incident on the image sensor 1330.

The camera device 1010 may comprise a driving part. The driving part may move the moving parts 1200 and 300 against the fixed part 1100. The driving part may perform an auto focus (AF) function. The driving part may perform a hand shake correction (OIS) function. The driving part may move the lens 1220. The driving part may move the image sensor 1330. The driving part may comprise a magnet and a coil. The driving part may comprise a shape memory alloy (SMA).

The camera device 1010 may comprise a first driving part. The first driving part may be an AF driving part. The first driving part may move the first moving part 1200 in an optical axis direction. The first driving part may move the bobbin 1210 in an optical axis direction. The lens 1220 may be moved in an optical axis direction. The first driving part may perform an auto focus (AF) function. The first driving part may move the first moving part 1200 upward in an optical axis direction. The first driving part may move the first moving part 1200 downward in an optical axis direction.

The camera device 1010 may comprise a second driving part. The second driving part may be an OIS driving part. The second driving part may move the second moving part 1300 in a direction perpendicular to the optical axis direction. The second driving part may move the second substrate 1310 in a direction perpendicular to the optical axis direction. The second driving part may move the sensor substrate 1320 in a direction perpendicular to the optical axis direction. The second driving part may move the image sensor 1330 in a direction perpendicular to the optical axis direction. The second driving part may move the holder 1340 in a direction perpendicular to the optical axis direction. The second driving part may move the sensor base 1350 in a direction perpendicular to the optical axis direction. The second driving part may move the filter 1360 in a direction perpendicular to the optical axis direction. The second driving part may perform a hand shake correction (OIS) function.

The second driving part may move the second moving part 1300 in a first direction perpendicular to the optical axis direction. The second driving part may move the second moving part 1300 in a second direction perpendicular to the optical axis direction and the first direction. The second driving part may rotate the second moving part 1300 about an optical axis.

In a second embodiment of the present invention, the first driving part may comprise a first coil 1430. The second driving part may comprise a second coil 1440. The first driving part and the second driving part may comprise a driving magnet 1410 commonly used for interaction between the first coil 1430 and the second coil 1440. That is, the first driving part and the second driving part may comprise individually controlled coils and shared magnets.

The camera device 1010 may comprise a driving magnet 1410. The driving part may comprise a driving magnet 1410. The driving magnet 1410 may be a magnet. The driving magnet 1410 may be a permanent magnet. The driving magnet 1410 may be a common magnet. The driving magnet 1410 may be commonly used for auto focus (AF) and hand shake correction (OIS).

The driving magnet 1410 may be disposed in the fixed part 1100. The driving magnet 1410 may be fixed to the fixed part 1100. The driving magnet 1410 may be coupled to the fixed part 1100. The driving magnet 1410 may be attached to the fixed part 1100 by an adhesive. The driving magnet 410 may be disposed in the housing 1130. The driving magnet 1410 may be fixed to the housing 1130. The driving magnet 1410 may be coupled to the housing 1130. The driving magnet 1410 may be attached to the housing 1130 by an adhesive. The driving magnet 1410 may be disposed at a corner of the housing 1130. The driving magnet 1410 may be disposed offset toward the corner of the housing 1130.

The driving magnet 1410 may be 2 pole magnetized magnet comprising one N-pole region and one S-pole region. Each unit magnet of the driving magnet 1410 may have an N pole on its inner surface and an S pole on its outer surface. Conversely, each unit magnet of the driving magnet 1410 may have an S pole on its inner surface and an N pole on its outer surface. In a modified embodiment, the driving magnet 1410 may be a four-pole magnetized magnet comprising two N-pole regions and two S-pole regions.

The driving magnet 1410 may comprise a plurality of magnets. The driving magnet 1410 may comprise four magnets. The driving magnet 1410 may comprise first to fourth magnets. The first to fourth magnets may be disposed symmetrically with respect to the optical axis. The first to fourth magnets may have the same size and shape as each other.

As a modified embodiment, the driving magnet 1410 may comprise a first magnet being disposed at a position corresponding to the first coil 1430 and a second magnet being disposed at a position corresponding to the second coil 1440. At this time, the first magnet and the second magnet may be disposed in the fixed part 1100, and the first coil 1430 and the second coil 1440 may be disposed in the moving parts 1200 and 300. Alternatively, the first magnet and the second magnet may be disposed in the moving parts 1200 and 300, and the first coil 1430 and the second coil 1440 may be disposed in the fixed part 1100.

The camera device 1010 may comprise a first coil 1430. The driving part may comprise the first coil 1430. The first coil 1430 may be disposed in the first moving part 1200. The first coil 1430 may be fixed to the first moving part 1200. The first coil 1430 may be coupled to the first moving part 1200. The first coil 1430 may be attached to the first moving part 1200 by an adhesive. The first coil 1430 may be disposed on the bobbin 1210. The first coil 1430 may be fixed to the bobbin 1210. The first coil 1430 may be coupled to the bobbin 1210. The first coil 1430 may be attached to the bobbin 1210 by an adhesive. The first coil 1430 may be electrically connected to a driver IC 1480. The first coil 1430 may be electrically connected to the lower elastic member 1720, the sensing substrate 1470 and the driver IC 1480. The first coil 1430 may receive current from the driver IC 1480.

The first coil 1430 may be disposed at a position corresponding to the driving magnet 1410. The first coil 1430 may be disposed on the bobbin 1210 at a position corresponding to the driving magnet 1410. The first coil 1430 may face the driving magnet 1410. The first coil 1430 may comprise a surface facing the driving magnet 1410. The first coil 1430 may be disposed adjacent to the driving magnet 1410. The first coil 1430 may interact with the driving magnet 1410. The first coil 1430 may interact with the driving magnet 1410 electromagnetically.

The first coil 1430 may move the first moving part 1200 in an optical axis direction. The first coil 1430 may move the bobbin 1210 in an optical axis direction. The first coil 1430 may move the lens 1220 in an optical axis direction. The first coil 1430 may move the first moving part 1200 upward in an optical axis direction. The first coil 1430 may move the bobbin 1210 upward in an optical axis direction. The first coil 1430 may move the lens 1220 upward in an optical axis direction. The first coil 1430 may move the first moving part 1200 downward in an optical axis direction. The first coil 1430 may move the bobbin 2110 downward in an optical axis direction. The first coil 1430 may move the lens 1220 in a downward direction of the optical axis direction.

The camera device 1010 may comprise a second coil 1440. The driving part may comprise a second coil 1440. The second coil 1440 may be disposed in the second moving part 1300. The second coil 1440 may be fixed to the second moving part 1300. The second coil 1440 may be coupled to the second moving part 1300. The second coil 1440 may be attached to the second moving part 1300 by an adhesive. The second coil 1440 may be disposed in the holder 1340. The second coil 1440 may be fixed to the holder 1340. The second coil 1440 may be coupled to the holder 1340. The second coil 1440 may be attached to the holder 1340 by an adhesive. The second coil 1440 may be disposed by being wound around a protrusion of the holder 1340. The second coil 1440 may be disposed on the holder 1340. The second coil 1440 may be electrically connected to the second substrate 1310. Both ends of the second coil 1440 may be soldered to the second substrate 1310. The second coil 1440 may be electrically connected to the driver IC 1495. The second coil 1440 may be electrically connected to the second substrate 1310 and the driver IC 1495. The second coil 1440 may receive current from the driver IC 1495.

The second coil 1440 may be disposed at a position corresponding to the driving magnet 1410. The second coil 1440 may be disposed at a position corresponding to the driving magnet 1410 in the holder 1340. The second coil 1440 may face the driving magnet 1410. The second coil 1440 may comprise a surface facing the driving magnet 1410. The second coil 1440 may be disposed adjacent to the driving magnet 1410. The second coil 1440 may interact with the driving magnet 1410. The second coil 1440 may interact with the driving magnet 1410 electromagnetically.

The second coil 1440 may move the second moving part 1300 in a direction perpendicular to the optical axis direction. The second coil 1440 may move the second substrate 1310 in a direction perpendicular to the optical axis direction. The second coil 1440 may move the sensor substrate 1320 in a direction perpendicular to the optical axis direction. The second coil 1440 may move the image sensor 1330 in a direction perpendicular to the optical axis direction. The second coil 1440 may move the holder 1340 in a direction perpendicular to the optical axis direction. The second coil 1440 may rotate the second moving part 1300 about an optical axis. The second coil 1440 may rotate the second substrate 1310 about an optical axis. The second coil 1440 may rotate the sensor substrate 1320 about an optical axis. The second coil 1440 may rotate the image sensor 1330 about an optical axis. The second coil 1440 may rotate the holder 1340 about an optical axis.

The second coil 1440 may comprise a plurality of coils. The second coil 1440 may comprise four coils. The second coil 1440 may comprise a coil for x-axis shift. The second coil 1440 may comprise a coil for y-axis shift.

The second coil 1440 may comprise a second-first coil 1441. The second-first coil 1441 may be a first sub coil. The second-first coil 1441 may be a coil for x-axis shift. The second-first coil 1441 may move the second moving part 1300 in an x-axis direction. The second-first coil 1441 may be disposed long in a y-axis. The second-first coil 1441 may comprise a plurality of coils. The second-first coil 1441 may comprise two coils. The two coils of the second-first coil 1441 may be electrically connected to each other. The second-first coil 1441 may comprise a connection coil connecting the two coils. In this case, two coils of the second-first coil 1441 may receive current together. Alternatively, the two coils of the second-first coil 1441 may be electrically separated from each other and receive current individually.

The second coil 1440 may comprise a second-second coil 1442. The second-second coil 1442 may be a second sub coil. The second-second coil 1442 may be a coil for y-axis shift. The second-second coil 1442 may move the second moving part 1300 in a y-axis direction. The second-second coil 1442 may be disposed long in an x-axis. The second-first coil 1441 may comprise a plurality of coils. The second-second coil 1442 may comprise two coils. The two coils of the second-second coil 1442 may be electrically connected to each other. The second-second coil 1442 may comprise a connection coil connecting the two coils. In this case, two coils of the second-second coil 1442 may receive current together. Alternatively, the two coils of the second-second coil 1442 may be electrically separated from each other and receive current individually.

The camera device 1010 may comprise a Hall sensor 1445. The Hall sensor 1445 may be disposed in the second substrate 1310. The Hall sensor 1445 may be disposed in a hole of the holder 1340. The Hall sensor 1445 may comprise a Hall element (Hall IC). The Hall sensor 1445 may detect the driving magnet 1410. The Hall sensor 1445 may detect the magnetic force of the driving magnet 1410. The Hall sensor 1445 may face the driving magnet 1410. The Hall sensor 1445 may be disposed at a position corresponding to the driving magnet 1410. The Hall sensor 1445 may be disposed adjacent to the driving magnet 1410. The Hall sensor 1445 may detect the position of the second moving part 1300. The Hall sensor 1445 may detect the movement of the second moving part 1300. The Hall sensor 1445 may be disposed in the hollow of the second coil 1440. A sensing value detected by the Hall sensor 1445 may be used to provide feedback for hand shake correction driving. The Hall sensor 1445 may be electrically connected to the driver IC 1495.

The Hall sensor 1445 may comprise a plurality of Hall sensors. The Hall sensor 1445 may comprise three Hall sensors. The Hall sensor 1445 may comprise first to third Hall sensors. The first Hall sensor may detect displacement of the second moving part 1300 in an x-axis direction. The second Hall sensor may detect displacement of the second moving part 1300 in a y-axis direction. The third Hall sensor may detect the rotation of the second moving part 1300 about a z-axis either alone or together with one or more of the first Hall sensor and the second Hall sensor.

The camera device 1010 may comprise a sensing magnet 1450. The sensing magnet 1450 may be disposed in the first moving part 1200. The sensing magnet 1450 may be fixed to the first moving part 1200. The sensing magnet 1450 may be coupled to the first moving part 1200. The sensing magnet 1450 may be attached to the first moving part 1200 by an adhesive. The sensing magnet 1450 may be disposed on the bobbin 1210. The sensing magnet 1450 may be fixed to the bobbin 1210. The sensing magnet 1450 may be coupled to the bobbin 1210. The sensing magnet 1450 may be attached to the bobbin 1210 by an adhesive. The sensing magnet 1450 may be formed to have a smaller size than the driving magnet 1410. Through this, the influence of the sensing magnet 1450 on driving may be minimized.

The sensing magnet 1450 may be disposed at an opposite side of the correction magnet 1460. The sensing magnet 1450 and the correction magnet 1460 may be disposed at opposite sides in the first moving part 1200. The sensing magnet 1450 and the correction magnet 1460 may be disposed opposite to each other on the bobbin 1210.

The camera device 1010 may comprise a correction magnet 1460. The compensation magnet 1460 may be a compensation magnet. The correction magnet 1460 may be disposed in the first moving part 1200. The correction magnet 1460 may be fixed to the first moving part 1200. The correction magnet 1460 may be coupled to the first moving part 1200. The correction magnet 1460 may be attached to the first moving part 1200 by an adhesive. The correction magnet 1460 may be disposed on the bobbin 1210. The correction magnet 1460 may be fixed to the bobbin 1210. The correction magnet 1460 may be coupled to the bobbin 1210. The correction magnet 1460 may be attached to the bobbin 1210 by an adhesive. The correction magnet 1460 may be formed to have a smaller size than the driving magnet 1410. Through this, the influence of the correction magnet 1460 on driving may be minimized. In addition, the correction magnet 1460 may be disposed at an opposite side of the sensing magnet 1450 to form a magnetic balance with the sensing magnet 1450. Through this, tilt that may be generated by the sensing magnet 1450 may be inhibited.

The camera device 1010 may comprise a sensing substrate 1470. The sensing substrate 1470 may be a substrate. The sensing substrate 1470 may be a printed circuit board (PCB). The sensing substrate 1470 may be a flexible substrate. The sensing substrate 1470 may be an FPCB. The sensing substrate 1470 may be coupled to the first substrate 1110. The sensing substrate 1470 may be connected to the first substrate 1110. The sensing substrate 1470 may be electrically connected to the first substrate 1110. The sensing substrate 1470 may be soldered to the first substrate 1110. The sensing substrate 1470 may be disposed in the housing 1130. The sensing substrate 1470 may be fixed to the housing 1130. The sensing substrate 1470 may be coupled to the housing 1130. The housing 1130 may comprise a groove or hole having a shape corresponding to that of the sensing substrate 1470. The sensing substrate 1470 may be disposed in a groove or hole of the housing 1130.

The camera device 1010 may comprise a driver IC 1480. The driver IC 1480 may be an AF driver IC. The driver IC 1480 may be electrically connected to the first coil 1430. The driver IC 1480 may apply current to the first coil 1430 to perform AF driving. The driver IC 1480 may apply power to the first coil 1430. The driver IC 1480 may apply current to the first coil 1430. The driver IC 1480 may apply a voltage to the first coil 1430. The driver IC 1480 may be disposed in the sensing substrate 1470. The driver IC 1480 may be disposed at a position corresponding to the sensing magnet 1450. The driver IC 1480 may be disposed to face the sensing magnet 1450. The driver IC 1480 may be disposed adjacent to the sensing magnet 1450.

The driver IC 1480 may comprise a sensor. The sensor may comprise a Hall element (Hall IC). The sensor may be disposed at a position corresponding to the sensing magnet 1450. The sensor may be disposed to face the sensing magnet 1450. The sensor may be disposed adjacent to the sensing magnet 1450. The sensor may detect the sensing magnet 1450. The sensor may detect the magnetic force of the sensing magnet 1450. The sensor may detect the position of the first moving part 1200. The sensor may detect movement of the first moving part 1200. A detection value detected by the sensor may be used for feedback of auto-focus driving.

The camera device 1010 may comprise a gyro sensor 1490. The gyro sensor 1490 may be disposed in the first substrate 1110. The gyro sensor 1490 may detect shaking of the camera device 1010. The gyro sensor 1490 may sense angular velocity or linear velocity due to shaking of the camera device 1010. The gyro sensor 1490 may be electrically connected to the driver IC 1495. Shaking of the camera device 1010 detected by the gyro sensor 1490 may be used for hand shake correction (OIS) driving.

The camera device 1010 may comprise a driver IC 1495. The driver IC 1495 may be an OIS driver IC. The driver IC 1495 may be electrically connected to the second coil 1440. The driver IC 1495 may apply current to the second coil 1440 to perform OIS driving. The driver IC 1495 may apply power to the second coil 1440. The driver IC 1495 may apply current to the second coil 1440. The driver IC 1495 may apply a voltage to the second coil 1440. The driver IC 1495 may be disposed in the second substrate 1310.

The camera device 1010 may comprise an elastic member 1500. The elastic member 1500 may comprise a leaf spring. The elastic member 1500 may comprise a spring. The elastic member 1500 may be an OIS elastic member. The elastic member 1500 can connect the fixed part 1100 and the second moving part 1300. The elastic member 1500 may connect the base 1120 and the second moving part 1300. The elastic member 1500 can connect the fixed part 1100 and the holder 1340. The elastic member 1500 may connect the base 1120 and the holder 1340.

The elastic member 1500 may not be electrically connected to the first substrate 1110. The elastic member 1500 may be spaced apart from the first substrate 1110. The elastic member 1500 can be distinguished from the metal plate 1650 being electrically connected to the first substrate 1110. The elastic member 1500 can be distinguished from the connecting substrate 1600 being electrically connected to the first substrate 1110. The elastic member 1500 may be spaced apart from the metal plate 1650. The elastic member 1500 may be spaced apart from the connecting substrate 1600. The elastic member 1500 may be spaced apart from the wire 1800.

The first coupling portion 1610 of the connecting substrate 1600 may be disposed between the elastic member 1500 and the holder 1340. Or, a portion of the elastic member 1500 may be disposed between the first coupling portion 1610 of the connecting substrate 1600 and the holder 1340. The first coupling portion 1610 of the connecting substrate 1600 may be disposed between the elastic member 1500 and the holder 1340 in an optical axis direction. Or, a portion of the elastic member 1500 may be disposed between the first coupling portion 1610 of the connecting substrate 1600 and the holder 1340 in an optical axis direction.

In a second embodiment of the present invention, the total spring constant (total spring K) of the member elastically supporting the second moving part 1300 against the fixed part 1100 may be the sum of the spring constant of the coupling member of the connecting substrate 1600 and the metal plate 1650 and the spring constant of the elastic member 1500. At this time, since the coupling member of the connecting substrate 1600 and the metal plate 1650 acts as a composite member, it may be difficult to manage the resonance frequency. In a second embodiment of the present invention, an elastic member 1500 may be provided separately from the composite member. The connecting substrate 1600 may be formed of only a single layer of copper foil to increase sensitivity. In a second embodiment of the present invention, the total spring constant may be 50 to 400 mN/mm. The spring constant of the elastic member 1500 may be greater than that of the composite member. The spring constant of the elastic member 1500 and the spring constant of the composite member may be 20 to 250 mN/mm, respectively.

The elastic member 1500 comprises an outer side portion 1510 being coupled to the fixed part 1100, an inner side portion 1520 being coupled to the second moving part 1300, and a connecting portion 1530 connecting the outer side portion 1510 and the inner side portion 1520. The connecting portion 1530 may be extended in a direction perpendicular to the optical axis direction. The height of the connecting portion 1530 in an optical axis direction (refer to a in FIG. 46) may be 0.5 to 5 times the width in a direction perpendicular to the optical axis direction (refer to b in FIG. 46). The spring constant of the connecting portion 1530 in a direction perpendicular to the optical axis direction may be smaller than the spring constant in an optical axis direction. Through this, the movement of the connecting portion 1530 in an optical axis direction may be smaller than the movement in a direction perpendicular to the optical axis direction. That is, the elastic member 1500 may restrict movement in an optical axis direction and guide the second moving part 1300 to move in a direction perpendicular to the optical axis direction. The connecting portion 1530 may be formed of at least three strands. The elastic member 1500 may comprise a structure that makes it easy to move left and right and requires more current consumption to move in a Z direction. The elastic member 1500 may comprise a structure that suppresses sagging of the moving object in an up and down direction.

One of the elastic members 1500 and 1700 may be referred to as a first elastic member, and the other may be referred to as a second elastic member.

The camera device 1010 may comprise a damper. The damper may be viscous. The damper may comprise a viscous epoxy. The damper may be disposed in the elastic member 1500. The damper may be applied to the elastic member 1500. The damper may be in contact with the elastic member 1500. The damper may be connected to the elastic member 1500. The damper may be disposed in the connecting portion 1530 of the elastic member 1500. The damper may be applied to the connecting portion 1530 of the elastic member 1500. The damper may be in contact with the connecting portion 1530 of the elastic member 1500. The damper may be connected to the connecting portion 1530 of the elastic member 1500. The damper may connect the outer side portion 1510 of the elastic member 1500 and the connecting portion 1530. In a modified embodiment, the damper may connect the inner side portion 1520 and the connecting portion 1530 of the elastic member 1500.

The camera device 1010 may comprise a connecting member. The connecting member may be an interposer. The connecting member may support the movement of the second moving part 1300. The connecting member may movably support the second moving part 1300. The connecting member can connect the second moving part 1300 and the fixed part 1100. The connecting member may connect the first substrate 1110 and the second substrate 1310. The connecting member may electrically connect the first substrate 1110 and the second substrate 1310. The connecting member may connect the first substrate 1110 and the second moving part 1300. The connecting member may guide the movement of the second moving part 1300. The connecting member may guide the second moving part 1300 to move in a direction perpendicular to the optical axis direction. The connecting member may guide the second moving part 1300 to rotate about an optical axis. The connecting member may restrict movement of the second moving part 1300 in an optical axis direction.

The connecting member may comprise: a first coupling portion 1610 being coupled to the second moving part 1300; a second coupling portion 1630 being coupled to the first substrate 1110; and a connecting portion 1620 connecting the first coupling portion 1610 and the second coupling portion 1630. At least a portion of the first coupling portion 1610 of the connecting member is overlapped with the second moving part 1300 in an optical axis direction and may be disposed below the second moving part 1300.

The interposer for sensor shift and module tilt must have electrical and mechanical characteristics. An image sensor 1330 may be attached to a second board 1310, which is a rigid PCB. At this time, the image sensor 1330 may be attached to a sensor substrate 1320, which is a separate additional PCB. A sensor base 1350, which is a holder for protecting the image sensor 1330, and an IR filter may be attached to the second substrate 1310.

A terminal may be needed to connect the second substrate 1310 and the connecting substrate 1600 to each other. Signals and power from the image sensor 1330 and driver IC 1495 may be applied through the terminal.

As for methods for electrically connecting the second substrate 1310 and the connecting substrate 1600, methods such as SMT and soldering are available, and in particular, an ACF method also may be used. Since the second substrate 1310 and the connecting substrate 1600 are separated from each other, there is no need to use an RF PCB, and because of this, the component price can be reduced by half.

The connecting substrate 1600 must act as a spring, and additional spring material composite materials can be added. One of the two surfaces can be grounded for impedance matching. An EMI tape can be electrically connected to ground for impedance matching. The impedance value is between 40 and 60 ohms, and can have a frequency region between 1 and 10 GHz.

The connecting member may comprise a connecting substrate 1600. The connecting member may comprise an elastic member connecting the fixed part 1100 and the second moving part 1300. The connecting member may comprise a leaf spring. The connecting member may comprise a wire 1800. The connecting member may comprise a ball being disposed between the fixed part 1100 and the second moving part 1300.

The camera device 1010 may comprise a connecting substrate 1600. The connecting substrate 1600 may be a connecting portion. The connecting substrate 1600 may be a connecting member. The connecting substrate 1600 may be a flexible substrate. The connecting substrate 1600 may be a flexible substrate. The connecting substrate 1600 may be a flexible printed circuit board. The connecting substrate 1600 may be a flexible printed circuit board (FPCB). The connecting substrate 1600 may have flexibility at least in part.

The connecting substrate 1600 may be formed separately from the second substrate 1310. The connecting substrate 1600 may be manufactured separately from the second substrate 1310. The connecting substrate 1600 may be formed separately from the second substrate 1310 and coupled to the second substrate 1310 through a conductive member. At this time, the conductive member may comprise one or more of solder and conductive epoxy. The terminal 1611 of the connecting substrate 1600 may be coupled to the first terminal 1311 of the second substrate 1310 through an anisotropic conductive film (ACF). ACF may be a conductive double-sided film or a conductive double-sided tape. The ACF can electrically connect the terminal 1611 of the connecting substrate 1600 and the first terminal 1311 of the second substrate 1310 by heat and pressure. When the connecting substrate 1600 is manufactured separately from the second substrate 1310, more connecting substrates 1600 can be manufactured on one substrate, thereby lowering the manufacturing cost.

The connecting substrate 1600 may support the second moving part 1300. The connecting substrate 1600 may support the movement of the second moving part 1300. The connecting substrate 1600 may movably support the second moving part 1300. The connecting substrate 1600 may connect the second moving part 1300 and the fixed part 1100. The connecting substrate 1600 may connect the first substrate 1110 and the second substrate 1310. The connecting substrate 1600 may electrically connect the first substrate 1110 and the second substrate 1310. The connecting substrate 1600 may guide the movement of the second moving part 1300. The connecting substrate 1600 may guide the second moving part 1300 to move in a direction perpendicular to the optical axis direction. The connecting substrate 1600 may guide the second moving part 1300 to rotate about an optical axis. The connecting substrate 1600 may limit the movement of the second moving part 1300 in an optical axis direction. A portion of the connecting substrate 1600 may be coupled to the base 1120.

The connecting substrate 1600 may comprise two connecting substrates 1600 being spaced apart from each other and formed symmetrically. The two connecting substrates 1600 may be disposed on both sides of the second substrate 310. The connecting substrate 600 may be bent six times to connect the first substrate 1110 and the second substrate 1310.

The connecting substrate 1600 may comprise a first region being connected to the second substrate 1310 and being bent in an optical axis direction. The first region may be connected to the second substrate 1310 and bent in an optical axis direction. The first region may be connected to the second substrate 1310 and may be extended in an optical axis direction. The first region may be connected to the second substrate 1310 and may be bent and extended in an optical axis direction. The connecting substrate 1600 may comprise a second region being extended from a first region. The connecting substrate 1600 may comprise a third region being bent in a direction perpendicular to the optical axis direction in a second region. The third region may be bent in a direction perpendicular to the optical axis direction in a second region. The third region may be extended in a direction perpendicular to the optical axis direction in a second region. The third region may be bent and extended in a direction perpendicular to the optical axis direction in a second region.

The connecting substrate 1600 may comprise a first coupling portion 1610 comprising a first region. The connecting substrate 1600 may comprise a connecting portion 1620 comprising a second region and a third region. The connecting substrate 1600 may comprise a first coupling portion 1610 being connected to the second substrate 1310. The connecting substrate 1600 may comprise a connecting portion 1620 being extended from the first coupling portion 1610. The connecting substrate 1600 may comprise a second coupling portion 1630 being connected to the connecting portion 1620 and comprising a terminal.

At least a portion of the first coupling portion 1610 of the connecting substrate 1600 may be overlapped with the second substrate 1310 in an optical axis direction. At least a portion of the first coupling portion 1610 of the connecting substrate 1600 may be disposed below the second substrate 1310 in an optical axis direction. The first coupling portion 1610 of the connecting substrate 1600 may be overlapped with the sensor substrate 1320 in a direction perpendicular to the optical axis direction. The first coupling portion 1610 of the connecting substrate 1600 may be disposed lower than the image sensor 1330. The first coupling portion 1610 of the connecting substrate 1600 may be disposed lower than the center of the image sensor 1330. The first coupling portion 1610 of the connecting substrate 1600 may be disposed lower than the upper surface of the image sensor 1330. The first coupling portion 1610 of the connecting substrate 1600 may be disposed lower than the lower surface of the image sensor 1330. The first coupling portion 1610 of the connecting substrate 1600 may be disposed higher than the upper surface of the base 1120. The thickness of the second substrate 1310 in an optical axis direction may be 0.4 mm. As a comparative example, the first coupling portion 1610 of the connecting substrate 1600 may be connected to the center of the side surface of the second substrate 1310. In a second embodiment of the present invention, compared to the comparative example, the first coupling portion 1610 of the connecting substrate 1600 may be disposed about 0.25 mm lower. As the height of the first coupling portion 1610 of the connecting substrate 1600 is lowered, the length of the connecting portion 1620 of the connecting substrate 1600 in an optical axis direction may be increased. Through this, the rigidity of the connecting substrate 1600 in an optical axis direction is increased and more conductive lines can be disposed in the connecting portion 1620 of the connecting substrate 1600. Or, the height up to which the camera device 1010 is protruded from the smartphone can be minimized by reducing the shoulder height of the camera device 1010 without increasing the length of the connecting portion of the connecting substrate 1600 in an optical axis direction.

The connecting substrate 1600 may comprise a first coupling portion 1610. The first coupling portion 1610 may be a first terminal portion. The first coupling portion 1610 may be connected to the second moving part 1300. The first coupling portion 1610 may be coupled to the second moving part 1300. The first coupling portion 1610 may be fixed to the second moving part 1300. The first coupling portion 1610 may be connected to the second substrate 1310. The first coupling portion 1610 may be coupled to the second substrate 1310. The first coupling portion 1610 may be fixed to the second substrate 1310. The first coupling portion 1610 of the second substrate 1310 may be disposed perpendicular to the optical axis direction. The first coupling portion 1610 may be disposed in a horizontal direction.

The first coupling portion 1610 may comprise a terminal 1611. The terminal 1611 may be coupled to the first terminal 1311 of the second substrate 1310. The terminal 1611 may be disposed on an upper surface of the first coupling portion 1610. The terminal 1611 may comprise a plurality of terminals.

The connecting substrate 1600 may comprise a connecting portion 1620. The connecting portion 1620 may connect the first coupling portion 1610 and the second coupling portion 1630. The connecting portion 1620 may be extended from the first coupling portion 1610. The connecting portion 1620 may comprise a bending region being bent in a direction perpendicular to the optical axis direction. The bending angle of the connecting portion 1620 may be 80 to 100 degrees. The bending angle of the connecting portion 1620 may be 85 to 95 degrees. The connecting portion 1620 may comprise a bending region being bent in an optical axis direction. The connecting portion 1620 may comprise a first region being bent in an optical axis direction against the second substrate 1310 and a second region being extended from the first region and being bent in a direction perpendicular to the optical axis direction. One of the bending region where the first coupling portion 1610 and the connecting portion 1620 meet and the bending region of the connecting portion 1620 may be referred to as a first bending region, and the other may be referred to as a second bending region. The connecting portion 1620 of the second substrate 1310 may be disposed parallel to an optical axis direction. The connecting portion 1620 may comprise a portion being bent in a direction perpendicular to the optical axis direction.

The connecting substrate 1600 may comprise a second coupling portion 1630. The second coupling portion 1630 may be a second terminal portion. The second coupling portion 1630 may be coupled to the fixed part 1100. The second coupling portion 1630 may be fixed to the fixed part 1100. The second coupling portion 1630 may be connected to the connecting portion 1620. The second coupling portion 1630 may be coupled to the first substrate 1110. The second coupling portion 1630 may be connected to the first substrate 1110. The second coupling portion 1630 may be soldered to the first substrate 1110. The second coupling portion 1630 may be fixed to the first substrate 1110. The second coupling portion 1630 may be coupled to the base 1120. The second coupling portion 1630 may be fixed to the base 1120. The second coupling portion 1630 of the second substrate 1310 may be disposed parallel to an optical axis direction. The second coupling portion 1630 may comprise a terminal 1631 being coupled to the first substrate 1110. The second coupling portion 1630 may comprise a terminal 1631. The terminal 1631 may be coupled to the first substrate 1110.

In a first embodiment of the present invention, the camera device 1010 may comprise a flexible substrate. The flexible substrate can connect the fixed part 1100 and the second moving part 1300. The flexible substrate may comprise a first connecting portion 1610 being connected to the second moving part 1300, a connecting portion 1620 being extended from the first connecting portion 1610, and a terminal portion 1630 being connected to the connecting portion 1620 and comprising a terminal.

In a second embodiment of the present invention, the connecting substrate 1600 may comprise a first portion being coupled to the first substrate 1110, a second portion being coupled to the second substrate 1310, and a third portion connecting the first portion and the second portion. The third portion may be disposed at least partially parallel to an optical axis. The third portion may be formed so that the length in an optical axis direction is longer than the thickness. The second portion of the connecting substrate 1600 may be disposed at least partially in parallel with the second substrate 1310. The third portion of the connecting substrate 1600 may be disposed perpendicular to the second portion at least in part. The third portion of the connecting substrate 1600 may be bent roundly at the portion corresponding to the corner of the second substrate 1310. The second substrate 1310 may comprise a first side surface and a second side surface being disposed opposite to each other, and a third side surface and a fourth side surface being disposed opposite to each other. The second portion of the connecting substrate 1600 may be coupled with the first side surface and second side surface of the second substrate 1310. The first portion of the connecting substrate 1600 may be coupled to a portion of the first substrate 1110 corresponding to the third side surface and fourth side surface of the second substrate 1310.

The camera device 1010 may comprise a metal plate 1650. The connecting member may comprise a metal plate 1650. The connecting substrate 1600 may comprise a metal plate 1650. However, the metal plate 1650 may be understood as a separate component from the connecting substrate 1600. The metal plate 1650 may be a metal member. The metal plate 1650 may be a metal part. The metal plate 1650 may be a metal layer. The metal plate 1650 may be a metal thin film. The metal plate 1650 may be formed of metal. The metal plate 1650 may be formed of an alloy. The metal plate 1650 may be formed of a copper alloy. The metal plate 1650 may be formed of a conductive material. The metal plate 1650 can be distinguished from the conductive layer 1602 of the connecting substrate 1600. The metal plate 1650 may be formed of a material different from the conductive layer 1602 of the connecting substrate 1600. The metal plate 1650 may be disposed in the connecting substrate 1600. The metal plate 1650 may be coupled to the connecting substrate 1600. The metal plate 1650 may be fixed to the connecting substrate 1600. The metal plate 1650 may be formed integrally with the connecting substrate 1600. The metal plate 1650 may have elasticity.

In an optical axis direction, at least in part, the length of the metal plate 1650 may be equal to the length of the connecting portion 1620. The metal plate 1650 may be extended to the same length in an optical axis direction as the connecting portion 1620. The thickness of the metal plate 1650 may be the same as the thickness of the connecting substrate 1600. The thickness of the metal plate 1650 may be thicker than the thickness of the connecting substrate 1600. The thickness of the conductive layer 1602 may be 7 to 50 μm. The thickness of the metal plate 1650 may be 20 to 150 µm. The metal plate 1650 can be connected to ground (GND) and used for impedance matching and noise suppression.

At least a portion of the metal plate 1650 may be disposed in the connecting portion 1620 of the connecting substrate 1600. The connecting portion 1620 may comprise a bending region being bent in a direction perpendicular to the optical axis direction. At this time, the metal plate 1650 may be disposed in the bending region. The metal plate 1650 may be disposed on an inner surface of the connecting portion 1620. The metal plate 1650 may be disposed on an outer surface of the connecting portion 1620.

The metal plate 1650 may be formed of a conductive material. The metal plate 1650 may be electrically connected to the second substrate 1310. The metal plate 1650 may be electrically connected to the image sensor 1330. The metal plate 1650 may be electrically connected to the driver IC 1495. The metal plate 1650 may be connected to the terminal 1631 of the connecting substrate 1600. The metal plate 1650 may be electrically connected to the terminal 1631 of the connecting substrate 1600. The metal plate 1650 may be in direct contact with the terminal 1631 of the connecting substrate 1600. The metal plate 1650 may be coupled to the terminal 1631 of the connecting substrate 1600 by a conductive member. The metal plate 1650 can be used as a ground (GND). The metal plate 1650 may be connected to the ground terminal of the connecting substrate 1600. The metal plate 1650 may be electrically connected to the first substrate 1110. In this case, the quantity of power connection patterns of the connecting substrate 1600 may be reduced.

The metal plate 1650 may comprise a body portion disposed on the connecting portion 1620 and a protruded portion 1660 being extended downward from the body portion to the terminal 1631 of the connecting substrate 1600. The protruded portion 1660 may be a protrusion. The protruded portion 1660 may be connected to the terminal 1631 of the connecting substrate 1600. The protruded portion 1660 may be electrically connected to the terminal 1631 of the connecting substrate 1600. The protruded portion 1660 may be coupled to the terminal 1631 of the connecting substrate 1600. The protruded portion 1660 may be coupled to the terminal 1631 of the connecting substrate 1600 by a conductive member. The protruded portion 1660 may be fixed to the terminal 1631 of the connecting substrate 1600. The protruded portion 1660 may be in direct contact with the terminal 1631 of the connecting substrate 1600. The protruded portion 1660 may be connected to the ground terminal of the connecting substrate 1600.

As illustrated in FIG. 55(*b*), the connecting substrate 1600 may comprise two insulating layers 1601 and a conductive layer 1602 being disposed between the two insulating layers 1601. The metal plate 1650 may comprise a different material from the conductive layer 1602. The conductive layer 1602 may be a conductive layer. The conductive layer 1602 may be formed of copper. The metal plate 1650 may be formed of a copper alloy. The metal plate 1650 may comprise one or more of an alloy of copper and titanium and an alloy of copper and nickel. The thickness of the metal plate 1650 may be thicker than the thickness of the conductive layer 1602. The thickness of the conductive layer 1602 may correspond to the distance between the two insulating layers 1601. In a second embodiment of the present invention, the connecting substrate 1600 may be formed of only two insulating layers 1601 and a conductive layer 1602 being disposed between the two insulating layers 1601. The insulating layer 1601 may be formed of polyimide (Pi).

As illustrated in FIG. 57(*a*), the metal plate 1650*a* may comprise a plurality of first grooves 1375 being recessed from the upper end and a plurality of second grooves 1375 being recessed from the lower end. The plurality of first grooves 1375 and the plurality of second grooves 1375 may be disposed at positions corresponding to each other in an optical axis direction. The width of each individual groove of the first groove 1375 and the second groove 1375 may be smaller than the length of the metal plate 1650*a* in an optical axis direction.

As illustrated in FIG. 57(*b*), the metal plate 1650*b* may comprise a first portion 1653 and a second portion 1654 that is shorter than the first portion 1653 in an optical axis direction. At least a portion of the second portion 1654 of the metal plate 1650 may be disposed in a bending region of the connecting portion 1620 of the connecting member 1600.

As illustrated in FIG. 57(*c*), the metal plate 1650*c* may be zigzagly extended in a direction perpendicular to the optical axis direction with a width shorter than the length of the connecting portion 1620 in an optical axis direction. The metal plate 1650*c* may be extended in a direction inclined to an optical axis and a direction perpendicular to the optical axis. The metal plate 1650*c* may comprise a first portion 1655 and a second portion 1656 being extended from the first portion 1655 in a zigzag shape.

As illustrated in FIG. 57(*d*), the metal plate 1650*d* may comprise a plurality of first grooves being recessed from the upper end and a plurality of second grooves being recessed from the lower end. The plurality of first grooves and the plurality of second grooves may be disposed at positions corresponding to each other in an optical axis direction. The width of each of the first and second grooves may be smaller than the length of the metal plate 1650*d* in an optical axis direction. The metal plate 1650*d* may comprise a first portion 1657 and a second portion 1658 connecting the first portion 1657 and comprising a first groove and a second groove. The first portion 1657 of the metal plate 1650*d* may be disposed in a bending region of the connecting portion 1620.

The camera device 1010 may comprise an insulating layer. The connecting member may comprise an insulating layer. The connecting substrate 1600 may comprise an insulating layer. The insulating layer may cover the metal plate 1650. The insulating layer may be disposed on an outer surface of the metal plate 1650. The metal plate 1650 may be disposed between the insulating layers. The insulating layer may comprise an insulating material. The insulating layer may be formed of polyimide (Pi). The insulating layer may protect the metal plate 1650.

The camera device 1010 may comprise an EMI tape. The connecting member may comprise EMI tape. The EMI tape may be attached to the connecting substrate 1600. The EMI tape may be disposed in the connecting substrate 1600. The EMI tape may be fixed to the connecting substrate 1600. The EMI tape may be attached to the connecting portion 1620 of the connecting substrate 1600. The EMI tape can be connected to ground (GND).

The camera device 1010 may comprise an elastic member 1700. The elastic member 1700 may be an AF elastic member. The elastic member 1700 may be a support member. The elastic member 1700 can connect the fixed part 1100 and the first moving part 1200. The elastic member 1700 can elastically connect the fixed part 1100 and the first moving part 1200. The elastic member 1700 may connect the bobbin 1210 and the housing 1130. The elastic member 1700 can elastically connect the bobbin 1210 and the housing 1130. The elastic member 1700 can movably support the first moving part 1200 against the fixed part 1100. The elastic member 1700 may be deformed when the first moving part 1200 moves. When the movement of the first moving part 1200 is completed, the elastic member 1700 can position the first moving part 1200 to the initial position through restoring force (elastic force). The elastic member 1700 may comprise a leaf spring. The elastic member 1700 may comprise a spring. The elastic member 1700 may have elasticity at least in part. The elastic member 1700 may provide restoring force (elastic force) to the first moving part.

The elastic member 1700 may comprise an outer side portion being coupled to the fixed part 1100, an inner side portion being coupled to the first moving part 1200, and a connecting portion connecting the outer portion and the inner portion. The spring constant in an optical axis direction of the connecting portion may be smaller than the spring constant in a direction perpendicular to the optical axis direction. Through this, the movement of the elastic member 1700 in an optical axis direction may be greater than the movement in a direction perpendicular to the optical axis direction. That is, the elastic member 1700 may guide the first moving part 1200 to move in an optical axis direction against the fixed part 1100.

The camera device 1010 may comprise an upper elastic member 1710. The elastic member 1700 may comprise an upper elastic member 1710. The upper elastic member 1710 may be disposed on a lower elastic member 1720. The upper elastic member 1710 may comprise an inner side portion 1712 being coupled to the bobbin 1210. The inner side portion 1712 of the upper elastic member 1710 may be coupled to an upper portion of the bobbin 1210. The inner side portion 1712 of the upper elastic member 1710 may be disposed at an upper portion of the bobbin 1210. The upper elastic member 1710 may comprise an outer side portion 1711 being coupled to the housing 1130. The outer side portion 1711 of the upper elastic member 1710 may be coupled to a lower surface of the housing 1130. The outer side portion 1711 of the upper elastic member 1710 may be disposed on a lower surface of the housing 1130. The upper elastic member 1710 may comprise a connecting portion 1713 connecting the inner side portion 1712 and the outer side portion 1711. The connecting portion 1713 may have elasticity.

The camera device 1010 may comprise a lower elastic member 1720. The elastic member 1700 may comprise a lower elastic member 1720. The lower elastic member 1720 may be disposed below the upper elastic member 1710. The lower elastic member 1720 may comprise an inner side portion being coupled to the bobbin 1210. The inner side portion of the lower elastic member 1720 may be coupled to a lower portion of the bobbin 1210. The inner side portion of the lower elastic member 1720 may be disposed on a lower surface of the bobbin 1210. The lower elastic member 1720 may comprise an outer side portion being coupled to the housing 1130. The outer side portion of the lower elastic member 1720 may be coupled to an upper portion of the housing 1130. The outer side portion of the lower elastic member 1720 may be disposed on an upper surface of the housing 1130. The lower elastic member 1720 may comprise a connecting portion connecting the inner side portion and the outer side portion. The connecting portion may have elasticity. The lower elastic member 1720 may comprise a terminal portion 1721. The terminal portion 1721 may be extended from the outer side portion. The terminal portion 1721 may be electrically connected to the sensing substrate

1470. The terminal portion 1721 may be coupled to a terminal of the sensing substrate 1470 through a conductive member.

The lower elastic member 1720 may comprise a plurality of lower elastic units. The lower elastic member 1720 may comprise first and second lower elastic units 1720-1 and 1720-2. The lower elastic member 1720 may comprise two lower elastic units 1720-1 and 1720-2. The two lower elastic units 1720-1 and 1720-2 are spaced apart from each other and can electrically connect the sensing substrate 1470 and the first coil 1430.

The camera device 1010 may comprise a wire 1800. The wire 1800 may be a wire spring. The wire 1800 may be an elastic member. The wire 1800 may be a leaf spring in a modified embodiment. The wire 1800 may connect the fixed part 1100 and the second moving part 1300. The wire 1800 can elastically connect the fixed part 1100 and the second moving part 1300. The wire 1800 may connect the housing 1130 and the second substrate 1310. The wire 1800 can elastically connect the housing 1130 and the second substrate 1310. The wire 1800 may movably support the second moving part 1300. The wire 1800 may support the second moving part 1300 to move or rotate in a direction perpendicular to the optical axis direction. The wire 1800 may comprise four wires being disposed in a corner region of the housing 1130.

An interposer that simultaneously performs an electrical role for electrical connection and a mechanical role for impact reliability and the like for connecting signals from the image sensor 1330 for OIS sensor shift and from the driver IC 1495 to the first substrate 1110, which is the main PCB, may be absolutely necessary. A second embodiment of the present invention may comprise an interposer that can secure the same characteristics. The interposer may be a connecting member. The interposer may comprise a connecting substrate 1600 and a metal plate 1650. The sensing substrate 1470 may be electrically connected to the connecting substrate 1600. The connecting substrate 1600 may be an interposer PCB. The metal plate 1650 may be made of copper. The metal plate 1650 may be formed of an alloy of copper (Cu) and titanium (Ti). The metal plate 1650 may be a spring. The metal plate 1650 may be an elastic member. The metal plate 1650 may have elasticity. Springs can be used as ground reinforcement. Even when the allowable current must be high due to an increase in the size of the image sensor 1330, impedance matching can be facilitated by using the GND connection through the metal plate 1650 according to a second embodiment of the present invention. The spring shape can be modified into various forms other than FIGS. 57(*a*)-57(*d*), and the spring constant K can be lowered. The spring constant K in the rotation direction can be more than 1 time higher than that in the X and Y directions, and K in the Z direction may be more than 50 times higher. The metal plate 1650 may be omitted. However, even in this case, the target value of the spring constant may be set the same. The interposer may be easy to move in X and Y, but may be difficult to move in the Z direction.

By applying the connecting substrate 1600 and the metal plate 1650, management of the bending part and the tolerance thereof may become facilitated. By increasing the spring constant K compared to the individual connecting substrate 1600, the influence of the connecting substrate 1600 compared to the influence of the spring can be reduced. In order to facilitate tuning, the primary resonance frequency of the OIS should be within 40 to 150 Hz, and the resonance frequency in the rotation direction can be higher than the primary resonance frequency. The weight of the second moving part 1300, comprising the image sensor 1330 and the second substrate 1310, may be 2 grams or less, and the value of the spring constant K may be 100 N/m or more. The first and third resonance frequencies can be managed above 100 Hz to facilitate tuning. The interposer substrate may be the second substrate 1310. A hole may be formed in the center of the interposer substrate.

A driver IC and a Hall element are disposed on the second substrate 1310, and the rigid portion of the second substrate 1310 and the FPCB portion of the connecting substrate 1600 may be electrically connected at two or more portions. At this time, it can be connected at 2 to 4 portions. FPCB can be bent twice. Because the bending portion of the connecting substrate 1600 must maintain its shape without large driving displacement, the spring or GND may be wider than other locations. The bending angle of the connecting substrate 1600 may be 80 to 100 degrees. A second embodiment of the present invention may comprise an actuator that connects a circuit signal to the main PCB using the connecting substrate 1600 of the sensor shift. In a second embodiment of the present invention, a spring may be added to a portion of the interposer. The interposer may be electrically connected to ground (GND). The primary resonance frequency may be within 40 to 150 Hz. The rotation mode is located between the primary resonance frequency and the tilt mode, and the rotation frequency may be more than 1 times the primary resonance frequency. The interval between the first resonance frequency and the third resonance frequency may be 100 Hz or more. For the spring constant K in X, Y, and Z directions of the connecting member, which is a combination of the connecting substrate 1600 and the metal plate 1650, the K in Z direction may be more than 50 times higher.

In a second embodiment of the present invention, the first resonance point may be located within 60 to 80 Hz, the second resonance point may be located within 150 to 170 Hz, and the third resonance point may be located within 290 to 310 Hz. The gain value may be higher at the primary resonance point than at the secondary resonance point, and may be higher at the secondary resonance point than at the tertiary resonance point. For reference, when the voltage forming the x-axis direction force is applied as a sine wave, the point where the output voltage is generated more than the input voltage may be the primary resonance point. The point where rotation occurs may be the secondary resonance point. The point where tilt occurs may be the third resonance point. When measuring the resonance point, the waveform may be a sine wave. The frequency may be 5 Hz to 10 KHz. The sweep may be 300 steps/sweep. The power source may be 0 Vdc, 100 mV p-p. The lens weight may be 0.097 grams.

Hereinafter, driving of a camera device according to a second embodiment of the present invention will be described with reference to the drawings.

FIG. 60 is a diagram for explaining the driving of the auto focus function of a camera device according to a second embodiment of the present invention.

When power is applied to the first coil 1430 of a camera device 1010 according to a second embodiment of the present invention, an electromagnetic field is formed in the first coil 1430, and the first coil 1430 may move in an optical axis direction (z-axis direction) through electromagnetic interaction with the driving magnet 1410. At this time, the first coil 1430 may move in an optical axis direction together with the first moving part 1200 comprising the lens 1220. In this case, since the lens 1220 moves away from or closer to the image sensor 1330, the focus of the subject can be adjusted. Any one or more of current and voltage may be applied to apply power to the first coil 1430.

When a current in a first direction is applied to the first coil 1430 of the camera device 1010 according to a second embodiment of the present invention, the first coil 1430 may move in an upper direction of the optical axis direction through electromagnetic interaction with the driving magnet 1410 (refer to a in FIG. 60). At this time, the first coil 1430 may move the lens 1220 in an upward direction of the optical axis so as to be away from the image sensor 1330.

When a current in a second direction opposite to a first direction is applied to the AF coil 1430 of the camera device 1010 according to a second embodiment of the present invention, the AF coil 1430 can move in a lower direction (refer to b in FIG. 60) of an optical axis direction through electromagnetic interaction with the driving magnet 1410. At this time, the AF coil 1430 can move the lens 1220 in a lower direction of the optical axis to be closer to the image sensor 1330.

FIGS. 61 to 63 are diagrams for explaining an operation of the handshake correction function of a camera device according a second embodiment of the present invention.

When power is applied to the second coil 1440 of the camera device 1010 according to a second embodiment of the present invention, an electromagnetic field is formed in the second coil 1440, and the second coil 1440 may move in a direction perpendicular to the optical axis direction through electromagnetic interaction with the driving magnet 1410. In addition, the second coil 1440 can rotate about an optical axis through electromagnetic interaction with the driving magnet 1410. At this time, the second coil 1440 can move or rotate together with the second moving part 1300 comprising the image sensor 1330. In a second embodiment of the present invention, the second coil 1440 can move the image sensor 1330 so that the shaking of the camera device 1010 detected by the gyro sensor 1490 is compensated.

FIG. 61 is a diagram for explaining driving in which an image sensor of a camera device according to a second embodiment of the present invention is shifted along the x-axis.

When a current in a first direction is applied to the second-first coil 1441 of the camera device 1010 according to a second embodiment of the present invention, the second-first coil 1441 can move in one direction (refer to a in FIG. 61) among first directions (x-axis direction) perpendicular to the optical axis direction through electromagnetic interaction with the driving magnet 1410. At this time, the second-first coil 1441 can move the image sensor 1330 in one direction among first directions perpendicular to the optical axis direction. Conversely, when a current in a second direction opposite to the first direction is applied to the second-first coil 1441, the second-first coil 1441 can move in the other direction among first directions (x-axis direction) perpendicular to the optical axis direction through electromagnetic interaction with the driving magnet 1410. At this time, the second-first coil 1441 can move the image sensor 1330 in the other direction among first directions perpendicular to an optical axis direction.

FIG. 62 is a view for explaining driving in which the image sensor of the camera device according to a second embodiment of the present invention is shifted along the y-axis.

When the current in a first direction is applied to the second-second coil 1442 of the camera device 1010 according to the present embodiment, the second-second coil 1442 can move in one direction (refer to b in FIG. 62) among second directions (y-axis direction) perpendicular to the optical axis direction through electromagnetic interaction with the driving magnet 1410. At this time, the second-second coil 1442 can move the image sensor 1330 in one direction among second directions perpendicular to the optical axis direction. Conversely, when a current in a second direction opposite to the first direction is applied to the second-second coil 1442, the second-second coil 1442 can move in the other direction among second directions (y-axis direction) perpendicular to the optical axis direction through electromagnetic interaction with the driving magnet 1410. At this time, the second-second coil 1442 can move the image sensor 1330 in the other direction among second directions perpendicular to the optical axis direction.

FIG. 63 is a diagram for explaining driving in which an image sensor of a camera device according to a second embodiment of the present invention rolls about the z-axis.

When a current in a first direction is applied to the second-first coil 1441 and the second-second coil 1442 of a camera device 1010 according to a second embodiment of the present invention, the second-first coil 1441 and the second-second coil 1442 can rotate in one direction about an optical axis through electromagnetic interaction with the driving magnet 1410 (refer to c in FIG. 63). At this time, the second-first coil 1441 and the second-second coil 1442 can rotate the image sensor 1330 in one direction about the optical axis. At this time, one direction may be counterclockwise. Conversely, when a current in a second direction opposite to the first direction is applied to the second-first coil 1441 and the second-second coil 1442, the second-first coil 1441 and the second-second coil 1442 can rotate in other directions about an optical axis through electromagnetic interaction with the drive magnet 1410. At this time, the second-first coil 1441 and the second-second coil 1442 can rotate the image sensor 1330 in the other direction about the optical axis. At this time, the other direction may be a clockwise direction.

Hereinafter, an optical device according to a second embodiment of the present invention will be described with reference to the drawings.

FIG. 64 is a perspective view of an optical device according to a second embodiment of the present invention, and FIG. 65 is a perspective view of an optical device according to a second embodiment of the present invention viewed from a direction different from that of FIG. 64.

The optical device 1001 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical device 1001 may comprise any device for photographing images or photos.

The optical device 1001 may comprise a main body 1020. The optical device 1001 may comprise a camera device 1010. The camera device 1010 may be disposed on the main body 1020. The camera device 1010 can photograph a subject. The optical device 1001 may comprise a display 1030. The display 1030 may be disposed in the main body 1020. The display 1030 can output any one or more of images and images photographed by the camera device 1010. The display 1030 may be disposed on a first surface of the main body 1020. The camera device 1010 may be disposed on at least one of a first surface of the main body 1020 and a second surface opposite to the first surface.

Although the embodiments of the present invention have been described above by dividing them into the first and second embodiments, some components of the first embodiment may be replaced with corresponding components of the second embodiment. In addition, some components of the second embodiment may be replaced with corresponding configurations of the first embodiment. The third embodiment of the present invention may comprise some components of the first embodiment and some components of the second embodiment. In particular, the metal plate 650 of the first embodiment can be applied to the second embodiment. In addition, the elastic member 1500 of the second embodiment may be applied to the first embodiment.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
   a fixed part;
   a first moving part disposed in the fixed part and comprising a lens;
   a second moving part comprising an image sensor;
   a first driving part configured to move the first moving part with respect to the fixed part;
   a second driving part configured to move the second moving part with respect to the fixed part;
   a connecting member movably connecting the second moving part to the fixed part; and
   a ball disposed between the fixed part and the second moving part,
   wherein the connecting member is configured to press the second moving part toward the ball,
   wherein the connecting member comprises a connecting substrate and a metal plate coupled with the connecting substrate,
   wherein the connecting substrate comprises an extension part that is perpendicular to an upper surface of the image sensor, and the connecting substrate comprises a portion extending in a direction in parallel to the upper surface of the image sensor, and
   wherein the metal plate is coupled with the extension part.

2. The camera device of claim 1, wherein the fixed part comprises a first substrate,
   wherein the second moving part comprises a second substrate electrically connected with the image sensor, and
   wherein the connecting substrate connects the first substrate and the second substrate.

3. The camera device of claim 1, wherein the metal plate has elasticity.

4. The camera device of claim 1, wherein a thickness of the metal plate is equal to a thickness of the connecting substrate or greater than the thickness of the connecting substrate.

5. The camera device of claim 1, wherein the connecting substrate comprises a connecting portion connected with the second moving part, the extension part extending from the connecting portion, and a terminal portion connected with the extension part and comprising a terminal, and
   wherein at least a portion of the metal plate is disposed on the extension part of the connecting substrate.

6. The camera device of claim 5, wherein at least a portion of the metal plate has a length equal to a length of the extension part in an optical axis direction.

7. The camera device of claim 5, wherein the extension part comprises a bending region bent in a direction perpendicular to an optical axis direction, and wherein the metal plate is disposed on the bending region.

8. The camera device of claim 7, wherein the metal plate comprises a hole, and wherein at least a portion of the hole of the metal plate is disposed in the bending region.

9. The camera device of claim 7, wherein the metal plate comprises a first portion and a second portion formed to be shorter than the first portion in an optical axis direction, and wherein at least a portion of the second portion of the metal plate is disposed on the bending region.

10. A camera device comprising:

a fixed part;

a first moving part disposed in the fixed part and comprising a lens;

a second moving part comprising an image sensor;

a first driving part configured to move the first moving part with respect to the fixed part;

a second driving part configured to move the second moving part with respect to the fixed part;

a connecting member movably connecting the second moving part to the fixed part; and a ball disposed between the fixed part and the second moving part, wherein the connecting member comprises a connecting substrate and a metal plate coupled with the connecting substrate, wherein the connecting substrate comprises an extension part that is perpendicular to an upper surface of the image sensor, and the connecting substrate comprises a portion extending in a direction in parallel to the upper surface of the image sensor, and wherein the metal plate is coupled with the extension part.

11. The camera device of claim 7, wherein the metal plate comprises a plurality of grooves concavely formed in an optical axis direction, and wherein the plurality of grooves of the metal plate are not disposed on the bending region.

12. The camera device of claim 5, wherein the extension portion part comprises a bending region bent in a direction perpendicular to an optical axis direction, and wherein the metal plate is not disposed on the bending region.

13. The camera device of claim 5, wherein the terminal portion of the connecting substrate is fixed to the first substrate, and wherein an upper end of the extension part slopes downward from the connecting portion toward the terminal portion.

14. The camera device of claim 2, wherein the second moving part comprises a holder coupled with the second substrate, and wherein the ball is disposed between the holder and the first substrate.

15. The camera device of claim 2, wherein the image sensor is disposed between the first moving part and the first substrate.

16. The camera device of claim 14, wherein the first driving part comprises a magnet disposed on the fixed part and a first coil disposed on the first moving part at a position corresponding to the magnet, and wherein the second driving part comprises a second coil disposed on the second moving part at a position corresponding to the magnet.

17. The camera device of claim 16, wherein the second coil is disposed on the holder, and wherein the holder comprises a portion disposed between the second coil and the ball in an optical axis direction.

18. An optical device comprising:

a main body;

the camera device of claim 1 disposed on the main body; and a display disposed on the main body and configured to output a video or image photographed by the camera device.

19. The camera device of claim 10, wherein the fixed part comprises a first substrate, and wherein the connecting substrate electrically connects the first substrate and the second moving part.

20. A camera device comprising:

a first substrate;

a housing disposed on the first substrate;

a bobbin disposed in the housing;

a lens coupled with the bobbin;

a second substrate disposed below the bobbin;

an image sensor electrically connected with the second substrate;

a holder coupled with the second substrate;

a first driving part configured to move the lens with respect to the first substrate;

a second driving part configured to move the image sensor with respect to the first substrate;

a connecting substrate connecting the first substrate and the second substrate;

a metal plate coupled with the connecting substrate; and a ball disposed between the first substrate and the holder, wherein the metal plate is configured to press the holder toward the first substrate, wherein the connecting substrate comprises an extension part that is perpendicular to an upper surface of the image sensor, and the connecting substrate comprises a portion extending in a direction in parallel to the upper surface of the image sensor, and wherein the metal plate is coupled with the extension part.

* * * * *